United States Patent
Masuyama et al.

(10) Patent No.: US 11,642,873 B2
(45) Date of Patent: May 9, 2023

(54) INTERLAYER FILM FOR LAMINATED GLASS, LAMINATED GLASS, AND IMAGE DISPLAY SYSTEM

(71) Applicant: SEKISUI CHEMICAL CO., LTD., Osaka (JP)

(72) Inventors: Yoshikazu Masuyama, Takatsuki (JP); Yuusuke Oota, Koka (JP); Kazuhiko Nakayama, Koka (JP); Kazuhiro Tomura, Dusseldorf (DE)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/640,936

(22) PCT Filed: Nov. 26, 2020

(86) PCT No.: PCT/JP2020/044128
§ 371 (c)(1),
(2) Date: Mar. 7, 2022

(87) PCT Pub. No.: WO2021/107062
PCT Pub. Date: Jun. 3, 2021

(65) Prior Publication Data
US 2022/0347976 A1    Nov. 3, 2022

Related U.S. Application Data

(60) Provisional application No. 63/029,036, filed on May 22, 2020.

(30) Foreign Application Priority Data

Nov. 28, 2019    (JP) .............................. JP2019-215868

(51) Int. Cl.
*B32B 17/10* (2006.01)
*B32B 27/08* (2006.01)
(Continued)

(52) U.S. Cl.
CPC .. *B32B 17/10761* (2013.01); *B32B 17/10036* (2013.01); *B32B 17/10605* (2013.01);
(Continued)

(58) Field of Classification Search
CPC ........ B32B 17/10761; B32B 17/10036; B32B 17/10605; B32B 17/10623;
(Continued)

(56) References Cited

U.S. PATENT DOCUMENTS

2008/0137204 A1* 6/2008 Yoshinari ............. G02B 5/0294
428/212
2015/0251385 A1* 9/2015 Oota .................. G02B 27/0101
428/441

(Continued)

FOREIGN PATENT DOCUMENTS

| CN | 101124176 | 2/2008 |
| CN | 105473528 | 4/2016 |

(Continued)

OTHER PUBLICATIONS

International Search Report (ISR) dated Jan. 19, 2021 in International (PCT) Application No. PCT/JP2020/044128.

(Continued)

*Primary Examiner* — Clayton E. LaBalle
*Assistant Examiner* — Kevin C Butler
(74) *Attorney, Agent, or Firm* — Wenderoth, Lind & Ponack, L.L.P.

(57) ABSTRACT

An interlayer film for laminated glass of the present invention is an interlayer film for laminated glass, comprising one or two or more resin layers, and comprising a first resin layer comprising a resin and a light diffusion particle, in which any resin layer in the interlayer film for laminated glass comprises a colorant.

18 Claims, 17 Drawing Sheets

(51) Int. Cl.
*B32B 27/20* (2006.01)
*B32B 27/22* (2006.01)
*B32B 27/30* (2006.01)
*G02B 5/02* (2006.01)
*G03B 21/62* (2014.01)

(52) U.S. Cl.
CPC .. *B32B 17/10623* (2013.01); *B32B 17/10651* (2013.01); *B32B 27/08* (2013.01); *B32B 27/20* (2013.01); *B32B 27/22* (2013.01); *B32B 27/306* (2013.01); *G02B 5/0242* (2013.01); *G03B 21/62* (2013.01); *B32B 2264/104* (2013.01); *B32B 2264/108* (2013.01); *B32B 2307/4026* (2013.01); *B32B 2307/414* (2013.01); *B32B 2307/732* (2013.01); *B32B 2457/20* (2013.01)

(58) Field of Classification Search
CPC ... B32B 17/10651; B32B 27/08; B32B 27/20; B32B 27/22; B32B 27/306; B32B 2264/104; B32B 2264/108; B32B 2307/4026; B32B 2307/414; B32B 2307/732; B32B 2457/20; G02B 5/0242; G03B 21/62
USPC ........................................................ 359/453
See application file for complete search history.

(56) References Cited

U.S. PATENT DOCUMENTS

2017/0205701 A1   7/2017  Ide et al.
2021/0316532 A1*  10/2021 Nakayama ........ B32B 17/10036

FOREIGN PATENT DOCUMENTS

| | | | |
|---|---|---|---|
| CN | 107077058 | 8/2017 | |
| CN | 111406232 A * | 7/2020 | ........... B32B 17/068 |
| JP | 2005-24942 | 1/2005 | |
| JP | 2007-57906 | 3/2007 | |
| JP | 2010-24061 | 2/2010 | |
| JP | 2010-250288 | 11/2010 | |
| JP | 2017-198807 | 11/2017 | |
| JP | 2019-101433 | 6/2019 | |
| JP | 2019-200392 | 11/2019 | |
| JP | 6654515 B2 * | 2/2020 | ....... B32B 17/10036 |
| WO | 03/093000 | 11/2003 | |
| WO | 2006/082800 | 8/2006 | |
| WO | 2016/068087 | 5/2016 | |
| WO | WO-2016068087 A1 * | 5/2016 | ............ G02B 5/003 |
| WO | 2016/082800 | 6/2016 | |
| WO | 2016/104055 | 6/2016 | |
| WO | 2016/143566 | 9/2016 | |
| WO | 2017/154583 | 9/2017 | |
| WO | 2018/012433 | 1/2018 | |
| WO | 2019/004289 | 1/2019 | |
| WO | 2019/111825 | 6/2019 | |
| WO | WO-2019189736 A1 * | 10/2019 | ........... B32B 15/082 |

OTHER PUBLICATIONS

International Preliminary Report on Patentability dated Jul. 7, 2021 in International (PCT) Application No. PCT/JP2020/044128, together with English translation thereof.

Extended European Search Report dated Sep. 14, 2022 in corresponding European Patent Application No. 20891434.1.

* cited by examiner

INTERLAYER FILM FOR LAMINATED GLASS, LAMINATED GLASS, AND IMAGE DISPLAY SYSTEM

TECHNICAL FIELD

The present invention relates to an interlayer film for laminated glass and a laminated glass which are suitably used in, for example, an image display screen, and also relates to an image display system comprising laminated glass.

BACKGROUND ART

Laminated glass is widely used in window glass for various conveyances such as automobiles, railway vehicles, airplanes and marine vessels, and window glass for buildings and the like, because laminated glass is less prone to causing glass fragments to scatter even if it is subjected to an external impact and then broken, and is thus safe. Such laminated glass as is widely known is commonly one obtained by interposing an interlayer film for laminated glass configured from, for example, a thermoplastic resin, between paired sheets of glass, and then integrating the sheets of glass with the interlayer film.

An interlayer film for laminated glass is known which is made opaque white by compounding calcium carbonate and/or silica in order to allow for light penetration, but not to allow any person or object present behind the glass to be viewed for the purpose of enhancement in privacy protection performance (see, for example, PTL 1).

A technique for producing an image projected from a projector on a transparent screen is in practical use. Such a transparent screen commonly used is a transparent film comprising, for example, a light diffusion layer comprising a light diffusible fine particle (see, for example, PTLs 2 and 3).

In recent years, there has been increased a need for projection and display of advertising and the like on, for example, window glass for vehicles such as automobiles, and window glass for buildings such as partitions and show windows, and laminated glass has been tried to be used for transparent screens. For example PTLs 4 to 6 each disclose a laminate such as laminated glass, in which an interlayer film is placed between two transparent base materials such as glass plates and the interlayer film comprises a light diffusible fine particle.

CITATION LIST

Patent Literature

PTL 1: WO 2016/082800
PTL 2: WO 2016/104055
PTL 3: WO 2018/012433
PTL 4: WO 2016/143566
PTL 5: JP 2007-57906 A
PTL 6: WO 2019/111825

SUMMARY OF INVENTION

Technical Problem

However, a laminated glass comprising a conventional interlayer film for laminated glass has the problem of being incapable of imparting a sufficiently high contrast in image display even by compounding of a light diffusible fine particle in the interlayer film as described above.

An object of the present invention is to provide an interlayer film for laminated glass and a laminated glass, in which image display at a high contrast can be realized even in use of the laminated glass in an image display screen.

Solution to Problem

The present inventors have made intensive studies, and as a result, have found that the above problems can be solved by not only allowing an interlayer film for laminated glass to comprise a first resin layer comprising a resin and a light diffusion particle, but also allowing any resin layer in the interlayer film for laminated glass, or any glass member constituting laminated glass to be colored by a colorant, leading to completion of the present invention below. The gist of the present invention is as follows.

[1] An interlayer film for laminated glass, comprising one or two or more resin layers,
wherein the interlayer film comprises a first resin layer comprising a resin and a light diffusion particle, and
any resin layer in the interlayer film for laminated glass comprises a colorant.
[2] The interlayer film for laminated glass according to [1], comprising: a resin layer other than the first resin layer, comprising a resin and the colorant.
[3] The interlayer film for laminated glass according to [2], wherein the first resin layer is placed at a side on which light from a light source apparatus is incident, as compared with the resin layer other than the first resin layer.
[4] The interlayer film for laminated glass according to [1], wherein the first resin layer comprises a resin, a light diffusion particle and a colorant.
[5] The interlayer film for laminated glass according to any one of [1] to [4], wherein a total light transmittance according to JIS R3106 (2019), of laminated glass in which the interlayer film is sandwiched between two sheets of clear glass according to JIS R3202 (2011), is less than 70%.
[6] The interlayer film for laminated glass according to any one of [1] to [5], wherein the first resin layer has a thickness of 150 μm or less.
[7] The interlayer film for laminated glass according to any one of [1] to [6], wherein a relationship according to the following expression (1):

$$500 \leq C \times T \leq 3600 \quad (1)$$

is satisfied, wherein a concentration of the light diffusion particle in the first resin layer is C (% by mass) and a thickness of the first resin layer is T (μm).
[8] The interlayer film for laminated glass according to any one of [1] to [7], wherein a concentration of the light diffusion particle in the first resin layer is 10% by mass or more.
[9] The interlayer film for laminated glass according to any one of [1] to [8], wherein the light diffusion particle comprises calcium carbonate.
[10] The interlayer film for laminated glass according to any one of [1] to [9], comprising:
second and third resin layers each comprising a resin, wherein
the first resin layer is placed between the second and third resin layers.
[11] The interlayer film for laminated glass according to [10], wherein any of the first to third resin layers comprises a colorant.

[12] The interlayer film for laminated glass according to [10], further comprising:
a fourth resin layer comprising a resin, wherein
the fourth resin layer is placed on an outer side of a laminated structure comprising the first to third resin layers, and the fourth resin layer comprises a colorant.

[13] The interlayer film for laminated glass according to any one of [1] to [12], for use in an image display screen.

[14] The interlayer film for laminated glass according to [13], for use in a rear-projection image display screen.

[15] A laminated glass comprising paired glass members and the interlayer film for laminated glass according to any one of [1] to [14], wherein the interlayer film for laminated glass is placed between the paired glass members.

[16] A laminated glass comprising paired glass members and an interlayer film for laminated glass, the interlayer film being placed between the paired glass members and comprising one or two or more resin layers, comprising:
a first resin layer comprising a resin and a light diffusion particle,
at least any of the paired glass members being colored by a colorant.

[17] The laminated glass according to [16], wherein at least any of the paired glass members contains the colorant, or has on its surface, a colored layer comprising the colorant.

[18] An image display system comprising the laminated glass according to any one of [15] to [17], and a light source apparatus for light irradiation on one surface of the laminated glass.

Advantageous Effects of Invention

According to the present invention, there can be provided an interlayer film for laminated glass, and laminated glass, in which image display can be realized at a high contrast.

DESCRIPTION OF EMBODIMENTS

Figure 1:
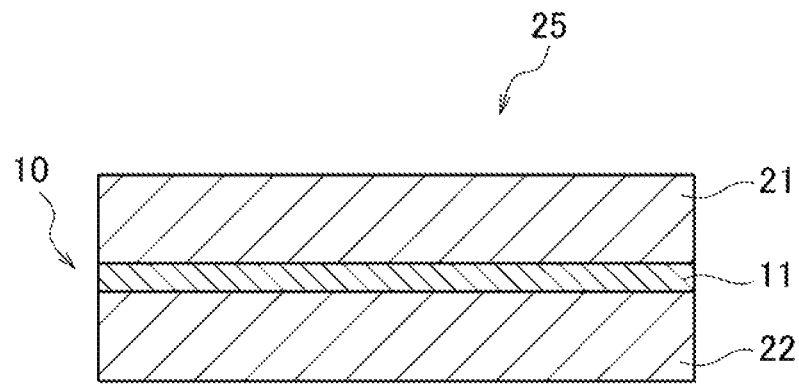
FIG. 1 A schematic cross-sectional view illustrating one embodiment of the interlayer film for laminated glass and the laminated glass of the present invention.

Hereinafter, the present invention is described in detail with reference to embodiments.

<Interlayer Film for Laminated Glass>

The interlayer film for laminated glass of the present invention (hereinafter, simply referred to as "interlayer film") has one or two or more resin layers, and comprises a first resin layer comprising a resin and a light diffusion particle, in which any resin layer in the interlayer film for laminated glass comprises a colorant.

The interlayer film of the present invention, in which the first resin layer can allow incident light to be scattered by the light diffusion particle and thus allow an image to be displayed depending on the light incident, can allow the contrast of the image displayed to be increased and allow the image to be clearly displayed due to the above-mentioned configuration. Although the principle is not clear, it is presumed that, while light-scattering by the light diffusion particle in the first resin layer, when serves as multiple-scattering, partially leads to stray light and causes a reduction in contrast, such stray light occurring by the multiple-scattering is effectively absorbed by a colorant to thereby enable image display at a high contrast to be realized in the present invention.

(Total Light Transmittance)

The total light transmittance (TvD) of laminated glass produced by using the interlayer film of the present invention and standard glass is preferably less than 70%. If the total light transmittance is less than 70%, light-scattering sufficiently occurs in the interlayer film and an image at a high contrast is easily displayed. When the total light transmittance is 70% or less, an object such as a light source apparatus which is placed at an opposite side with the interlayer film being interposed and which is for use in image display, is hardly viewed and furthermore, for example, privacy protection performance can also be enhanced.

The total light transmittance (TvD) of laminated glass produced by using the interlayer film of the present invention and standard glass is more preferably 50% or less, further preferably 45% or less, still further preferably 38% or less. When the total light transmittance is, for example, 50% or less, not only light-scattering appropriately occurs in the interlayer film, but also the effect of an increase in contrast by a colorant is easily exerted.

Although it is not particularly limited, the interlayer film has the total light transmittance (TvD) of 10% or more for example, preferably 20% or more, more preferably 28% or more. When the total light transmittance (TvD) is equal to or more than the lower limit value, a certain transparency is imparted to the interlayer film, and the interlayer film is easily applied to, for example, window glass.

In the present invention, the total light transmittance (TvD) is the value measured according to JISR3106 (2019). In the present invention, the value obtained by sandwiching the interlayer film between two sheets of clear glass according to JIS R3202 (2011) (namely, two sheets of standard glass) to thereby produce laminated glass, and measuring the total light transmittance (TvD) of the laminated glass is defined as the total light transmittance (TvD) of laminated glass produced by using the interlayer film and standard glass. The standard glass here used is clear glass having a thickness of 2.5 mm. The clear glass here used may be one having a visible light transmittance of 90.4%.

The total light transmittance is here commonly an index different from the visible light transmittance. The visible light transmittance is measured with parallel beam without any consideration of reflected light and scattered light. On the other hand, the total light transmittance is an index obtained in consideration of reflected light and scattered light, and both reflected light and scattered light are subjected to measurement as indicated in a measurement method described below.

In a case where the first resin layer is provided on a partial region of the interlayer film as described below, the above total light transmittance (TvD) and the total light transmittance (TvD) of laminated glass described below are each the total light transmittance (TvD) of a region where the first resin layer is provided. Furthermore, in a case where a colored resin layer (or, for example, a colored layer or a glass member colored, described below) is partially provided, the total light transmittance may be in the above range in a region where both the first resin layer and the colored resin layer or the like are provided.

The total light transmittance may differ with respect to each position due to, for example, placement of a region where the thickness of the first resin layer is gradually changed as described below. In such a case, the total light transmittance of at least a partial region may be in the range, and that of a region exhibiting the lowest total light transmittance is preferably in the above-mentioned numerical value range. For example, when a region where the thickness of the first resin layer is constant is present, the total light transmittance of such a region is preferably in the range.

The haze of laminated glass produced by using the interlayer film of the present invention and standard glass is preferably 35% or more. The haze is more preferably 45% or more, further preferably 55% or more, particularly preferably 65% or more. With such laminated glass produced by using standard glass having a haze in the range, image display at a high contrast is allowed to be facilitated when the interlayer film of the present invention is used in an image display screen.

In a case where the first resin layer is provided on a partial region of the interlayer film as described below, the above haze and the haze of laminated glass described below are each the haze of a region where the first resin layer, which has a thickness in a range described below, is provided. The haze may differ with respect to each position due to, for example, placement of a region where the thickness of the first resin layer is gradually changed as described below. In such a case, the haze of at least a partial region may be in the range, and that of a region exhibiting the lowest haze is preferably in the numerical value range. For example, when a region where the thickness of the first resin layer is constant is present, the haze of such a region is preferably in the range.

The haze can be here measured according to JIS K6714.

The L* of the color tone L*a*b* in measurement of the total light transmittance of laminated glass formed as described above is preferably 65 or less, more preferably 50 or less. When the L* is equal to or less than the upper limit, such laminated glass is darkened and image display at a much higher contrast can be realized. The color tone L*a*b* can be measured according to JIS Z 8781-4.

[Layer Configuration]

The interlayer film of the present invention comprises one or two or more resin layers each comprising a resin, and any of the resin layers comprises a colorant. Accordingly, the first resin layer comprising a light diffusion particle may or may not comprise a colorant. In a case where the interlayer film comprises resin layer(s) other than the first resin layer, such resin layer(s) other than the first resin layer may or may not comprise a colorant, and in a case where the first resin layer does not comprise a colorant, at least one of such resin layer(s) other than the first resin layer comprises a colorant.

More specifically, in a case where the interlayer film of the present invention has a single layer of the resin layer (first resin layer) as a resin layer, the first resin layer comprises a colorant. In a case where the interlayer film has two resin layers (first and second resin layers) as resin layers, the first resin layer may comprise a colorant or the second resin layer may comprise a colorant. In a case where the interlayer film has three resin layers (first, second and third resin layers) as resin layers, the first resin layer may comprise a colorant or any of the second and third resin layers may comprise a colorant.

In a case where the interlayer film has four resin layers (first, second, third and fourth resin layers) as resin layers, the first resin layer may comprise a colorant or any of the second, third and fourth resin layers may comprise a colorant.

Similarly, in a case where the interlayer film has five or more, n resin layers (provided that n is an integer of 5 or more) as resin layers, the first resin layer may comprise a colorant or any of such resin layers (second, . . . and the $n^{th}$ resin layers) other than the first resin layer may comprise a colorant.

In the present invention, in a case where the interlayer film has three or more resin layers as resin layers, the first resin layer can be placed between the second and third resin layers. In a case where four or more layers are comprised as resin layers, the fourth resin layer is a resin layer placed on an outer side of a laminated structure configured from the first to third resin layers, and is, for example, a layer provided on a surface of the second resin layer, the surface being opposite to a surface thereof on which the first resin layer is provided. The fifth resin layer is a layer provided in a case where five or more layers are comprised as resin layers, and may be a layer placed on a further outer side of the fourth resin layer.

Hereinafter, a specific example of the layer configuration of the interlayer film is described in more detail with reference to the drawings. FIG. 1 illustrates an interlayer film 10 having a single resin layer as a resin layer. The interlayer film 10 is composed of a first resin layer 11, and both surfaces of the first resin layer 11 may adhere to glass members 21 and 22 for constituting laminated glass 25. In the interlayer film 10, the first resin layer 11 may comprise a colorant.

Figure 2:
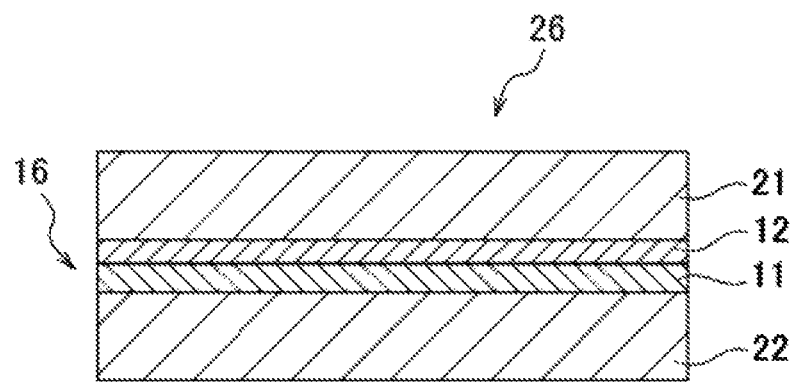
FIG. 2 A schematic cross-sectional view illustrating one embodiment of the interlayer film for laminated glass and the laminated glass of the present invention.

FIG. 2 illustrates an interlayer film 16 having two resin layers as resin layers. The interlayer film 16 comprises a second resin layer 12 in addition to the first resin layer 11, as illustrated in FIG. 2. The second resin layer 12 is provided on one surface of the first resin layer 11. In the interlayer film 16, a surface of the second resin layer 12, located opposite to the first resin layer 11 side, and a surface of the first resin layer 11, located opposite to the second resin layer 12 side, may serve as adhesion surfaces for adhesion to glass members 21 and 22 for constituting laminated glass 26. In the interlayer film 16, at least any one of the first and second resin layers 11 and 12 may comprise a colorant.

Figure 3:
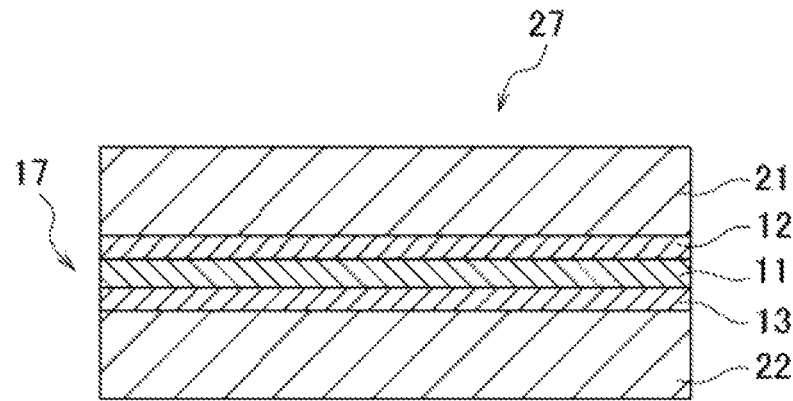
FIG. 3 A schematic cross-sectional view illustrating one embodiment of the interlayer film for laminated glass and the laminated glass of the present invention.

FIG. 3 illustrates an interlayer film 17 having three resin layers as resin layers. The interlayer film 17 comprises a third resin layer 13 in addition to the first resin layer 11 and the second resin layer 12. The third resin layer 13 is provided on a surface (other surface) of the first resin layer 11, located opposite to the one surface on which the second resin layer 12 is provided. In other words, the first resin layer 11 is placed between the second resin layer 12 and the third resin layer 13. In the interlayer film 17, respective outside surfaces (namely, respective surfaces located opposite to surfaces on which the first resin layer 11 is provided) of the second resin layer 12 and the third resin layer 13 may serve as surfaces for adhesion to the glass members 21 and 22 for constituting laminated glass 27. In the interlayer film 17, any of the first resin layer 11, the second resin layer 12 and the third resin layer 13 may comprise a colorant.

Figure 4:
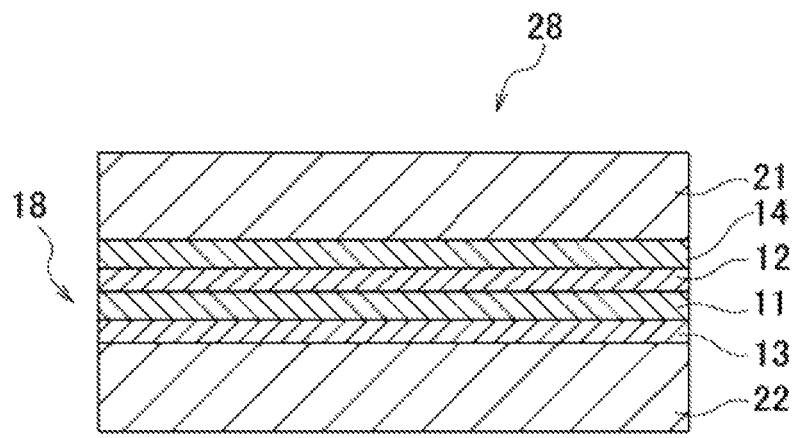
FIG. 4 A schematic cross-sectional view illustrating one embodiment of the interlayer film for laminated glass and the laminated glass of the present invention.

FIG. 4 illustrates an interlayer film 18 having four resin layers as resin layers. The interlayer film 18 comprises a fourth resin layer 14 in addition to the first to third resin layers 11, 12 and 13. The interlayer film 18 has a laminated structure where the first resin layer 11 is placed between the second resin layer 12 and the third resin layer 13, as in the interlayer film 17. The fourth resin layer 14 is placed on an outer side of such a laminated structure configured from the first to third resin layers 11, 12 and 13, and, for example, the fourth resin layer 14 may be provided on an outer side of the second resin layer 12, as illustrated in FIG. 4.

Also, in the interlayer film 18, any of the first to fourth resin layers 11 to 14 comprises a colorant, and the fourth resin layer 14 preferably comprises a colorant, as described below.

Figure 5:
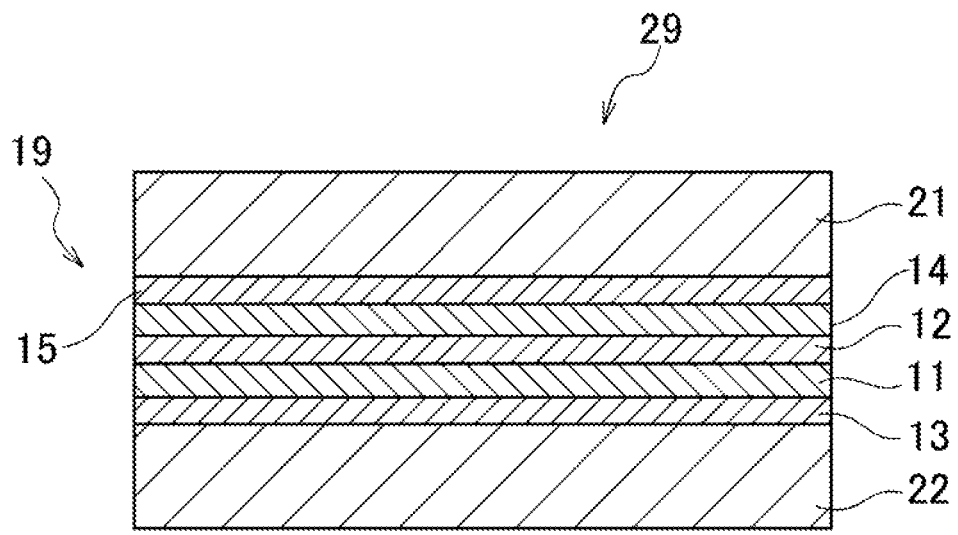
FIG. 5 A schematic cross-sectional view illustrating one embodiment of the interlayer film for laminated glass and the laminated glass of the present invention.

FIG. 5 illustrates an interlayer film 19 having five resin layers as resin layers. The interlayer film 19 comprises a fifth resin layer 15 in addition to first to fourth resin layers 11, 12, 13 and 14. The interlayer film 19 has a laminated structure where the first resin layer 11 is placed between the second resin layer 12 and the third resin layer 13, as in the interlayer film 18, and the fourth resin layer 14 is placed on an outer side of such a laminated structure configured from the first to third resin layers 11, 12 and 13. For example, the fourth resin layer 14 may be provided on an outer side of the second resin layer 12 and the fifth resin layer 15 may be provided on a further outer side of the fourth resin layer 14, as illustrated in FIG. 5.

Also, in the interlayer film 19, any of the first to fifth resin layers 11 to 15 comprises a colorant, and the fourth resin layer 14 preferably comprises a colorant, as described below.

The interlayer film preferably has at least two resin layers (namely, first and second resin layers 11 and 12), as in the interlayer films 16 to 19. By having at least the first and second resin layers 11 and 12, image display at a higher contrast can be realized in use in an image display screen. Although the principle is not clear, it is presumed that image display at a high contrast can be made due to not only appropriate light propagation in a resin layer other than the first resin layer, but also light-scattering concentrically occurring in a restricted region (first resin layer) by the light diffusion particle. The interlayer film, which comprises a resin layer (second resin layer) other than the first resin layer, thus can adhere to a glass member constituting laminated glass with such a resin layer other than the first resin layer comprising the light diffusion particle being interposed, and therefore the interlayer film is easily enhanced in adhesiveness thereof to such a glass member.

The interlayer film more preferably has at least three resin layers (namely, first to third resin layers 11, 12 and 13) as in the interlayer films 17, 18 and 19, and also more preferably has at least four resin layers (first to fourth resin layers 11, 12, 13 and 14). According to these embodiments, such other resin layers are respectively provided on both surfaces of the first resin layer 11, and thus adhesiveness of the interlayer film to the glass members 21 and 22 can be more improved even if a large amount of the light diffusion particle is comprised in the first resin layer 11. The interlayer film is composed of three resin layers, four resin layers or five resin layers, and thus the adhesiveness can be improved without any resin layer excessively provided. A resin layer in which a large amount of the light diffusion particle is compounded is not placed as the outermost layer, and thus a forming apparatus such as an extruder can be prevented from being contaminated due to the light diffusion particle in formation of the interlayer film.

The interlayer film may here comprise a layer other than the above resin layers, and, for example, any other layer such as an adhesion layer or a barrier layer may be placed between the resin layers. Such any other layer such as an adhesion layer may also be placed between each of the glass members and each of the resin layers.

It is noted that the second resin layer 12 and the first resin layer 11 are preferably directly laminated each other and the first resin layer 11 and the third resin layer 13 are preferably directly laminated each other. In the interlayer film 18, the fourth resin layer 14 is preferably directly laminated on the second resin layer 12. In the interlayer film 19, the fifth resin layer 15 is preferably directly laminated on the fourth resin layer 14. Similarly, in each interlayer film, the glass members 21 and 22 are also preferably directly laminated on the resin layers.

In a case where the interlayer film is used in an image display screen, light from a light source apparatus such as a projector is incident through one surface and the light is scattered in the first resin layer to thereby form an image. In a case where a colorant is comprised in a resin layer other than the first resin layer, the first resin layer is preferably placed on one surface side, as compared with such a resin layer (hereinafter, also referred to as "colored resin layer") other than the first resin layer, comprising a colorant, the one surface being a surface through which light from a light source apparatus is incident. Such placement can allow light from a light source apparatus to be incident on the first resin layer without being absorbed by the colored resin layer, resulting in efficient image display. The colored resin layer is provided and thus light-shielding ability can also be ensured.

A rear-projection image display screen is preferable as described below, and an image formed by light from a light source apparatus is preferably observed from other surface of the interlayer film. Accordingly, in a case where the first resin layer is placed closer to a light source apparatus than the colored resin layer, as described above, light scattered in the first resin layer is observed by an observer via the colored resin layer and thus such light where stray light occurring by multiple-scattering is sufficiently absorbed is observed by an observer. Thus, an image observed by an observer can be much more enhanced in contrast.

More specifically, in a case where the second resin layer 12 in the interlayer film 16 having two resin layers, illustrated in FIG. 2, comprises a colorant, light from a light source apparatus is preferably incident through a surface of the interlayer film 16, the surface being at the first resin layer 11 side (glass member 22 side), and rear-projection one is more preferable and the light is more preferably observed from a surface at the second resin layer 12 side (glass member 21 side).

For example, in a case where the second resin layer 12 in the interlayer film 17 comprising three resin layers, illustrated in FIG. 3, comprises a colorant, light from a light source apparatus is preferably incident through a surface of the interlayer film 17, the surface being at the third resin layer 13 side (glass member 22 side), and rear-projection one is more preferable and the light is more preferably observed from a surface at the second resin layer 12 side (glass member 21 side).

For example, in a case where the fourth resin layer 14 in the interlayer film 18 comprising four layers, illustrated in FIG. 4, comprises a colorant, light from a light source apparatus is preferably incident through a surface of the interlayer film 18, the surface being at the third resin layer 13 side (glass member 22 side), and rear-projection one is more preferable and the light is more preferably observed from a surface at the fourth resin layer 14 side (glass member 21 side).

For example, in a case where the fourth resin layer 14 in the interlayer film 19 comprising five layers, illustrated in FIG. 5, comprises a colorant, light from a light source apparatus is preferably incident through a surface of the interlayer film 19, the surface being at the third resin layer 13 side (glass member 22 side), and rear-projection one is more preferable and the light is more preferably observed from a surface at the fifth resin layer 15 side (glass member 21 side).

A resin layer other than the first resin layer is also preferably provided on one surface side of the interlayer film, the one surface being a surface through which light from a light source apparatus is incident. Such a configuration allows light from a light source apparatus to be incident on the first resin layer via such a resin layer other than the first resin layer, thereby allowing image display at a higher contrast to be facilitated. In this case, such a resin layer other than the first resin layer, provided on the one surface side, preferably comprises substantially no colorant, as described below, the one surface being surface through which light from a light source apparatus is incident.

Accordingly, in a case where the first resin layer 11 in the interlayer film 16 having two resin layers, illustrated in FIG. 2, comprises a colorant, light from a light source apparatus is preferably incident through a surface of the interlayer film 16, the surface being at the second resin layer 12 side (glass member 21 side).

In a case where the first resin layer 11 or the second resin layer 12 in the interlayer film 17 having three resin layers comprises a colorant, light from a light source apparatus is preferably incident through a surface of the interlayer film 17, the surface being at the third resin layer 13 side (glass member 22 side), as described above. Similarly, in a case where the fourth resin layer 14 in the interlayer film 18 having four resin layers comprises a colorant, light from a light source apparatus is preferably incident through a surface of the interlayer film 18, the surface being at the third resin layer 13 side (glass member 22 side), as described above. Similarly, in a case where the fourth resin layer 14 in the interlayer film 19 having five resin layers comprises a colorant, light from a light source apparatus is preferably incident through a surface of the interlayer film 19, the surface being at the third resin layer 13 side (glass member 22 side), as described above.

The first resin layer comprising a light diffusion particle may be formed on the entire surface of the interlayer film for laminated glass, or may be formed on a partial region thereof. For example, in a case where the interlayer film comprises the first to third resin layers 11, 12 and 13 as in FIGS. 3, 4 and 5, the first resin layer 11 may be provided on a partial region of the interlayer film for laminated glass and no first resin layer 11 may be provided on other regions. In other words, a portion composed of two layers of the second and third resin layers 12 and 13 and a portion composed of three layers of the first to third resin layers 11, 12 and 13 may be provided in the interlayer film 17 in the configuration illustrated in FIG. 3. A portion composed of three layers of the second to fourth resin layers 12, 13 and 14 and a portion composed of four layers of the first to fourth resin layers 11, 12, 13 and 14 may be provided in the interlayer film 18 in the configuration illustrated in FIG. 4.

Similarly, a portion composed of four layers of the second to fifth resin layers 12, 13, 14 and 15 and a portion composed of five layers of the first to fifth resin layers 11, 12, 13, 14 and 15 may be provided in the configuration illustrated in FIG. 5. In a case where not only the first resin layer 11, but also the fourth resin layer 14 is provided on a partial region of the interlayer film, as described below, a region where the first resin layer 11 is provided and a region where the fourth resin layer 14 is provided may be overlapped. Accordingly, a portion composed of three layers of the second, third and fifth resin layers 12, 13 and 15 and a portion composed of five layers of the first to fifth resin layers 11, 12, 13, 14 and 15 may be provided in the configuration illustrated in FIG. 5. Furthermore, a portion composed of four layers of the first, second, third and fifth resin layers 11, 12, 13 and 15 and a portion composed of five layers of the first to fifth resin layers 11, 12, 13, 14 and 15 may be provided in the configuration illustrated in FIG. 5.

In a case where the first resin layer 11 is provided on a partial region of the interlayer film for laminated glass, as described above, the region where the first resin layer 11 is provided may be irradiated with light for image display.

The interlayer film may have one of a region where the thickness of the first resin layer is constant and a region where the thickness is gradually changed (for example, a region where the thickness is gradually decreased from the region where the thickness is constant), may have only one thereof, or may have both the region where the thickness is constant and the region where the thickness is gradually changed. The region where the thickness is constant is preferably at least provided in order to stabilize the contrast of an image.

The colored resin layer may be formed on the entire surface of the interlayer film for laminated glass, or may be formed on a partial region thereof. For example, in a case where the first to fifth resin layers 11 to 15 are comprised and the fourth resin layer 14 corresponds to the colored resin layer as in the interlayer film 19, the fourth resin layer 14 may be provided on a partial region of the interlayer film for laminated glass and no fourth resin layer 14 may be provided on other regions. In such a configuration, a region where both the first resin layer 11 and the fourth resin layer 14 (colored resin layer) are provided may be irradiated with light for image display. Such a region is used as an image display region described below.

The interlayer film may have at least one of a region where the thickness of the colored resin layer (for example, fourth resin layer) is constant and a region where the thickness thereof is gradually changed (for example, a region where the thickness thereof is gradually decreased from the region where the thickness thereof is constant), may have only one thereof, or may have both the region where the thickness is constant and the region where the thickness thereof is gradually changed. The region where the thickness of the colored resin layer is constant is preferably at least provided in order to stabilize the contrast of an image.

For example, in a case where the first resin layer 11 is provided on a partial region of the interlayer film for laminated glass, the colored resin layer (for example, fourth resin layer 14) may also be provided on such a partial region of the interlayer film for laminated glass, and in this case, a region where the first resin layer 11 is provided and a region where the colored resin layer (for example, fourth resin layer 14) is provided may be overlapped. Such regions overlapped are provided and thus these regions overlapped are irradiated with light for image display to thereby allow image display to be appropriately performed. Such regions overlapped can also allow for appropriate light-shielding. On the other hand, a region where neither the first resin layer 11 nor the colored resin layer is provided is high in total light transmittance and can also ensure viewability. Thus, suitable use in, for example, a front glass of an automobile can also be made.

A region where the thickness of the colored resin layer (for example, fourth resin layer) is constant and a region where the thickness of the first resin layer is constant are preferably overlapped in order to stabilize the contrast of an image, and such regions overlapped may be irradiated with light for image display.

[First Resin Layer]
(Light Diffusion Particle)

The first resin layer comprises a resin and a light diffusion particle, as described above. The light diffusion particle for use in the present invention is not particularly limited as long as it is a compound which can scatter light incident into the interlayer film, and specific examples thereof include inorganic substances such as calcium carbonate, silica, titanium oxide, glass flake, mica, alumina and aluminum. Such compounds may be used singly or in combinations of two or more thereof. The shape of the light diffusion particle may be any shape, and may be any of a spherical shape, a broken shape, an amorphous shape, a multangular shape and a flat plate shape.

In particular, a flat plate-shaped particle of calcium carbonate, silica, titanium oxide or the like is preferable, and calcium carbonate is more preferable, from the viewpoint of, for example, light-scattering ability.

The average particle size of the light diffusion particle is, for example, 0.1 µm or more and 50 µm or less, preferably 0.5 µm or more and 50 µm or less. When the average particle size is in such a range, light incident into the interlayer film is easily anisotropically scattered and therefore an image displayed is easily high in contrast. The average particle size of the light diffusion particle is more preferably 1 µm or more, further preferably 1.5 µm or more, and more preferably 30 µm or less, further preferably 15 µm or less, from such a viewpoint.

The median size means intermediate diameter, and means the particle size (=D50) at which the accumulation of frequency (namely, number of particles) reaches 50%. The median size can be measured, specifically, with a light-scattering measurement apparatus according to a dynamic light-scattering method with an Ar laser as a light source. Examples of the light-scattering measurement apparatus include "DLS-6000AL" manufactured by Otsuka Electronics Co., Ltd.

The concentration of the light diffusion particle in the first resin layer is, for example, 2% by mass or more, preferably 6% by mass or more, more preferably 10% by mass or more. When the concentration of the light diffusion particle is 6% by mass or more, light incident is scattered and the contrast of an image displayed in use of the interlayer film in an image display screen is improved. When the concentration is 10% by mass or more, light-scattering ability is enhanced and the contrast of an image is easily increased. Moreover, an object placed at a rear side with the interlayer film being interposed, such as a light source apparatus, is hardly viewed, and furthermore, for example, privacy protection performance is also easily enhanced. The concentration of the light diffusion particle in the first resin layer is further preferably 15% by mass or more, still further preferably 20% by mass or more, from the above viewpoints.

The concentration of the light diffusion particle in the first resin layer is, for example, 75% by mass or less, preferably 50% by mass or less, more preferably 34% by mass or less, further preferably 30% by mass or less. When the content is equal to or less than the upper limit value, light from a light source apparatus used for image display is prevented from being excessively shielded in the first resin layer and an image displayed is easily high in brightness and high in contrast. Such light is also prevented from being excessively shielded by the light diffusion particle, and appropriate use in, for example, window glass can be made.

The concentration of the light diffusion particle in the first resin layer can be herein measured by, for example, the following method. First, the interlayer film is cut to a proper size, and thereafter a resin layer other than the first resin layer is peeled, to obtain 1 g of a sample of only the first resin layer. To 1 g of the sample obtained, 18 mL of an aqueous nitric acid solution (concentration 70% by mass) is added, and the resultant solution is kept at 200° C. for 30 minutes to be subjected to heating and decomposition by use of a microwave sample pretreatment apparatus ("ETHOS One" manufactured by Milestone General K.K.), and thereafter prepared to a fixed volume with ultrapure water having a specific resistance of 18.2 MΩcm under a condition of 25° C., to thereby obtain a test liquid. Next, a metal element or silicon constituting the light diffusion particle in the test liquid is quantitatively analyzed with a high frequency inductive coupling plasma emission analyzer ("ICPE-9000" manufactured by Shimadzu Corporation). For example, in a case where the light diffusion particle is calcium carbonate, the content of calcium carbonate is calculated under the assumption that all calcium comprised corresponds to calcium carbonate.

A relationship according to the following expression (1):

$$500 \leq C \times T \leq 3600 \quad (1)$$

is preferably satisfied, wherein the concentration of the light diffusion particle in the first resin layer is C (% by mass) and the thickness of the first resin layer is T (μm).

When the above relational expression is satisfied, the contrast of an image displayed in the case of use of the interlayer film in an image display screen can be more certainly increased. Moreover, an object placed at a rear side with the interlayer film being interposed, such as a light source apparatus, is hardly viewed, and furthermore, for example, privacy protection performance is also easily enhanced. Furthermore, certain light easily penetrates and a suitable application to window glass can be made.

The interlayer film of the present invention more preferably satisfies a relationship according to the following expression (2), further preferably satisfies a relationship according to the following expression (3), particularly preferably satisfies a relationship according to the following expression (4), and most preferably satisfies a relationship according to the following expression (5), from the above viewpoints.

$$1000 \leq C \times T \leq 3200 \quad (2)$$

$$1450 \leq C \times T \leq 3200 \quad (3)$$

$$1500 \leq C \times T \leq 3200 \quad (4)$$

$$1550 \leq C \times T \leq 2500 \quad (5)$$

In a case where the first resin layer is provided on a partial region of the interlayer film or the thickness thereof is changed, such a partial region of the interlayer film for laminated glass may satisfy at least any of the expressions (1) to (5), preferably 15% or more and 100% or less, more preferably 30% or more and 100% or less, further preferably 50% or more and 100% or less of the entire region of the interlayer film may satisfy at least any of expressions (1) to (5) (preferably the expression (1), more preferably expression (2), further preferably expression (3), particularly preferably expression (4), and most preferably expression (5)). When a region where the thickness of the first resin layer is constant is present, a region satisfying at least any of expressions (1) to (5) may be a region where the thickness of the first resin layer is constant, from the viewpoint of stabilization of the contrast.

In a case where the thickness of the first resin layer is changed and the interlayer film is used in an image display screen, an image display region described below may preferably satisfy the expression (1), more preferably expression (2), further preferably expression (3), particularly preferably expression (4), most preferably expression (5).

The concentration of the light diffusion particle in the entire interlayer film is preferably 0.5% by mass or more. When the concentration of the light diffusion particle in the entire interlayer film is equal to or more than the lower limit value, the contrast of the image is easily much further increased. Moreover, an object placed at a rear side with the interlayer film being interposed, such as a light source apparatus, is hardly viewed, and furthermore, for example, privacy protection performance is also easily enhanced. The concentration of the light diffusion particle in the entire interlayer film is more preferably 1% by mass or more, further preferably 1.5% by mass or more, from the above viewpoints.

The concentration of the light diffusion particle in the entire interlayer film is preferably 7% by mass or less. When the concentration of the light diffusion particle in the entire interlayer film is equal to or less than the upper limit value, light from the light source apparatus is prevented from being excessively shielded in the interlayer film and an image displayed is easily high in brightness and high in contrast. The interlayer film can also be appropriately used in, for example, window glass. The concentration of the light diffusion particle in the entire interlayer film is more preferably 5% by mass or less, further preferably 4% by mass or less, from the above viewpoints.

In the present invention, the thickness of the first resin layer comprising the light diffusion particle is preferably 250 μm or less, more preferably 150 μm or less. If the thickness of the first resin layer is 250 μm or less, light-scattering does not excessively occur and image display at a high contrast is facilitated in use in an image display screen along with comprising of a colorant in the interlayer film or the like. The first resin layer, which has a thickness of 150 μm or less, hardly causes light incident into the interlayer film to be multiply scattered in the thickness direction, and allows image display at a high contrast to be facilitated in use in an image display screen. The thickness of the first resin layer is further preferably 120 μm or less, still further preferably 100 μm or less, still further preferably 90 μm or less from the viewpoint that image display at a high contrast is easily realized.

The thickness of the first resin layer is preferably 20 μm or more, more preferably 40 μm or more, further preferably 70 μm or more from the viewpoint that light-scattering in a certain amount or more is easily allowed to occur in the interlayer film.

The thickness of the first resin layer may be constant in the interlayer film, but may also be changed as described below. In a case where the thickness is changed, the thickness of the first resin layer in a partial region of the interlayer film for laminated glass may be in the range.

In a case where the thickness of the first resin layer is changed and use in an image display screen is made, the thickness of the first resin layer may mean the thickness in an image display region. In other words, the first resin layer is present in the image display region and a suitable range of the thickness of the first resin layer is as described above. Incidentally, the image display region is a region which is to be irradiated with light from a light source apparatus to allow an image to be displayed on laminated glass. The image display region, which comprises the first resin layer and has a thickness in the above suitable range, may have a total light transmittance in the above suitable range.

Herein, in order that the contrast of an image is high in a certain region or more, for example, the first resin layer may be present and the thickness of the first resin layer may be in the range, in a region corresponding to, for example, 15% or more and 100% or less, preferably 30% or more and 100% or less, more preferably 50% or more and 100% or less of the entire region of the interlayer film.

When a region where the thickness of the first resin layer is constant is present, a region where the first resin layer is present and has a thickness which is in the above range and is constant may be present from the viewpoint of stabilization of the contrast. The region where the first resin layer is present and has a thickness which is in the above range and is constant may correspond to an image display region.

The method for measuring the thickness of the first resin layer of the interlayer film is as described below.

In other words, the interlayer film is cut by a sharp leather blade so that respective cross sections of the first resin layer and other resin layer(s) are exposed. Thereafter, the cross sections exposed of the interlayer film are observed with a digital microscope ("DSX500" manufactured by Olympus Corporation), to measure the thicknesses of the interlayer film and each of the layers with a microgauge.

The first resin layer comprises a resin as described above, and the light diffusion particle is dispersed in the resin in the first resin layer. The resin for use in the first resin layer is preferably a thermoplastic resin. A thermoplastic resin is used in the first resin layer, and thus the first resin layer is allowed to easily adhere to other resin layer, a glass member, and the like. In the following description, the thermoplastic resin for use in the first resin layer may be described as a thermoplastic resin (1).

The thermoplastic resin (1) for use in the first resin layer is not particularly limited, and examples thereof include a polyvinyl acetal resin, an ethylene-vinyl acetate copolymer resin, an ionomer resin, a polyurethane resin and a thermoplastic elastomer. Such a resin is used, and thus adhesiveness of the first resin layer to other resin layer, a glass member, and the like is easily ensured. In particular, the thermoplastic resin (1) is preferably a polyvinyl acetal resin. A polyvinyl acetal resin is used, and thus adhesiveness to a glass member, in particular, adhesiveness in the case of inorganic glass as the glass member is easily improved. In addition, characteristics necessary for laminated glass, such as penetration resistance and noise barrier performance, are easily obtained.

The thermoplastic resin for use as the thermoplastic resin (1) in the first resin layer may be adopted singly or in combinations of two or more thereof. The detail of the thermoplastic resin for use in the first resin layer is described below.

The first resin layer in the present invention preferably further comprises a plasticizer. The plasticizer comprised in the first resin layer may be referred to as "plasticizer (1)". The first resin layer comprises the plasticizer (1), and thus is flexible, and as a result, allows laminated glass to be enhanced in flexibility and easily enhanced in penetration resistance and noise barrier performance. By comprising the light diffusion particle and the plasticizer, the contrast of an image displayed, in use of the interlayer film in an image display screen, can be much further increased. Such an increase is due to an increase in difference in refractive index between the first resin layer and the light diffusion particle by inclusion of the plasticizer. The light diffusion particle is dispersed in the plasticizer and then compounded in the thermoplastic resin, and thus the light diffusion particle can be uniformly dispersed to thereby suppress image unevenness in projection of a screen image.

Furthermore, adhesiveness to, for example, a glass member forming laminated glass, or other resin layer forming the interlayer film can be enhanced. The plasticizer (1) is particularly effective when comprised in the case of use of a polyvinyl acetal resin (1) as the thermoplastic resin (1). The detail of the plasticizer (1) is described below.

The content (hereinafter, sometimes designated as "content (1)") of the plasticizer (1) in the first resin layer based on 100 parts by mass of the thermoplastic resin (1) is, for example, 20 parts by mass or more, preferably 30 parts by mass or more, more preferably 40 parts by mass or more. When the content (1) is each equal to or more than the lower limit, the interlayer film is enhanced in flexibility and the interlayer film is easily handled. The content (1) is preferably higher from the viewpoint of noise barrier performance, and the content (1) is further preferably 55 parts by mass or more, still further preferably 60 parts by mass or more from such a viewpoint. In a case where the content (1) is thus 55 parts by mass or more, the interlayer film preferably comprises the second resin layer, further preferably comprises the second and third resin layers.

The content (1) of the plasticizer (1) is preferably 100 parts by mass or less, more preferably 90 parts by mass or less, further preferably 85 parts by mass or less, particularly preferably 80 parts by mass or less. When the content (1) is equal to or less than the upper limit, laminated glass is much more enhanced in penetration resistance.

The first resin layer may comprise a colorant, as described above. The colorant here used is not particularly limited and can be any color matter conventionally compounded in interlayer films for laminated glass, and any color matter of, for example, blue, yellow, red, green, purple, black and white can be used. The color matter here used can be, for example, a pigment or a dye. The interlayer film for laminated glass, in which a colorant is used, thus can impart coloration of laminated glass, and can allow image display at a high contrast to be realized when used in an image display screen, as described above.

Examples of the pigment include copper phthalocyanine pigments such as Pigment Blue, phthalocyanine-based pigments such as a cobalt phthalocyanine pigment, anthraquinone-based pigments, perylene pigments, diketopyrrolopyrrole-based pigments, quinacridone-based pigments, perinone-based pigments, thioindigo-based pigments, isoindoline-based pigments, isoindolinone-based pigments, quinophthalone-based pigments, threne-based pigments, titanium oxide-based pigments, carbonaceous materials such as carbon black including Pigment Black 7 or the like, graphene and carbon nanotube.

Examples of the dye include an azo dye, a cyanine dye, a triphenylmethane dye, a phthalocyanine dye, an anthraquinone dye, a naphthoquinone dye, a quinoneimine dye, a methine dye, an azomethine dye, a squarylium dye, an acridine dye, a styryl dye, a coumarin dye, a quinolone dye and a nitro dye. The dye may also be a dispersive dye.

In particular, carbon black, a phthalocyanine-based pigment or a perylene pigment is preferable as the pigment because of being high in affinity with the thermoplastic resin and being hardly bled out. The dye is preferably an azo dye or an anthraquinone-based dye.

The colorant may be used singly or in combinations of two or more thereof.

The colorant in the present invention preferably comprises a carbonaceous material. By comprising a carbonaceous material, stray light is effectively absorbed and the contrast in image display is much more easily increased. In addition, excellent light-shielding ability is easily achieved. The carbonaceous material is preferably carbon black.

The colorant used may be a combination of the carbonaceous material such as carbon black and other color matter than the carbonaceous material. Such a colorant combination can not only increase the contrast in image display, but also color the laminated glass to a desired color and enhance design ability.

The above pigment and dye constituting the colorant may be compounded with a resin constituting the resin layer, as they are, or may be formed into an ink or toner and then compounded with the resin. In this case, the concentration of the colorant means the mass of the pigment and dye by themselves. The colorant may be dispersed in a plasticizer and then compounded with the resin. For example, the colorant may be added to a plasticizer, and dispersed in the plasticizer with further addition of a dispersant or the like, and the resultant mixture may be mixed with the resin.

In a case where the first resin layer comprises a colorant, the concentration of the colorant in the first resin layer is preferably 0.005% by mass or more and 0.4% by mass or less. When the concentration of the colorant is equal to or more than the lower limit value, stray light occurring by multiple-scattering is appropriately absorbed and the contrast in image display is easily increased. When the concentration of the colorant is the equal to or less than the upper limit value, light scattered by the light diffusion particle in the interlayer film is prevented from being excessively absorbed and excellent projection ability can be imparted to laminated glass. The concentration of the colorant in the first resin layer is more preferably 0.01% by mass or more, further preferably 0.05% by mass or more, and more preferably 0.3% by mass or less, further preferably 0.2% by mass or less, still further preferably 0.15% by mass or less, from the above viewpoints.

In a case where two or more resin layers are comprised and the first resin layer comprises a colorant, resin layer(s) other than the first resin layer may comprise a colorant, but preferably comprise(s) substantially no colorant. Such other resin layer(s) comprise(s) substantially no colorant, and thus the total light transmittance is increased and the interlayer film is easily enhanced in transparency. Herein, the "resin layer comprising substantially no colorant" means that no colorant is purposely comprised in the resin layer, and the concentration of the colorant in each of the resin layer(s) in this case is, for example, less than 0.005% by mass, preferably less than 0.001% by mass, more preferably 0% by mass.

While the total content of the thermoplastic resin and the plasticizer in the first resin layer is, for example, 25% by mass or more, the thermoplastic resin, or the thermoplastic resin and the plasticizer preferably serve(s) as main component(s). Specifically, the total amount of the thermoplastic resin and the plasticizer is preferably 50% by mass or more, more preferably 60% by mass or more, further preferably 65% by mass or more and less than 100% by mass based on the total amount of the first resin layer.

[Resin Layer(s) Other than First Resin Layer]

Each of the resin layer(s) other than the first resin layer in the interlayer film is a layer comprising a resin, and the resin for use in each of the resin layer(s) is preferably a thermoplastic resin. By using a thermoplastic resin as the resin in each of the resin layer(s), the resin layer(s) are allowed to easily adhere to other resin layer(s), a glass member, and the like.

Accordingly, in a case where the interlayer film comprises the first and second resin layers, both the respective resins forming the first and second resin layers are preferably thermoplastic resins. Similarly, in a case where the interlayer film comprises the first, second and third resin layers, all the respective resins forming the first, second and third resin layers are preferably thermoplastic resins. In a case where the interlayer film comprises the first, second, third and fourth resin layers, all the respective resins forming the first, second, third and fourth resin layers are preferably thermoplastic resins. In a case where the interlayer film comprises the first, second, third, fourth and fifth resin layers, all the respective resins forming the first, second, third, fourth and fifth resin layers are preferably thermoplastic resins.

In the following description, the respective thermoplastic resins for use in the second, third, fourth and fifth resin layers may be sometimes referred to as "thermoplastic resin (2)", "thermoplastic resin (3)", "thermoplastic resin (4)" and "thermoplastic resin (5)".

The thermoplastic resin (for example, thermoplastic resins (2), (3), (4) or (5)) for use in each of the resin layer(s) other than the first resin layer is not particularly limited, and can be appropriately selected from those listed as resins usable in, for example, the thermoplastic resin (1), and thus used. In particular, a polyvinyl acetal resin is preferable. A polyvinyl acetal resin is used, and thus adhesiveness to a glass member, in particular, adhesiveness in the case of inorganic glass as the glass member is easily improved. In addition, characteristics necessary for laminated glass, such as penetration resistance and noise barrier performance, are easily obtained.

The thermoplastic resin for use in each of the resin layer(s) other than the first resin layer may be used singly or in combinations of two or more thereof in such resin layer(s).

The type of the thermoplastic resin (2) is preferably the same as that of the thermoplastic resin (1), for example, from the viewpoint of an enhancement in adhesiveness. Accordingly, in a case where the interlayer film comprises the first and second resin layers and the thermoplastic resin (1) is a polyvinyl acetal resin, the thermoplastic resin (2) is also preferably a polyvinyl acetal resin. The type of the thermoplastic resin (3) is preferably the same as those of the thermoplastic resin (1) and the thermoplastic resin (2). Accordingly, in a case where the interlayer film comprises the first to third resin layers and the thermoplastic resin (1) is a polyvinyl acetal resin, both the thermoplastic resins (2) and (3) are preferably polyvinyl acetal resins. Furthermore, the type of the thermoplastic resin (4) is preferably the same as those of the thermoplastic resin (1), the thermoplastic resin (2) and the thermoplastic resin (3). Accordingly, in a case where the interlayer film comprises the first to fourth resin layers and the thermoplastic resin (1) is a polyvinyl acetal resin, all the thermoplastic resins (2), (3) and (4) are preferably polyvinyl acetal resins. The type of the thermoplastic resin (5) is preferably the same as those of the thermoplastic resin (1), the thermoplastic resin (2), the thermoplastic resin (3) and the thermoplastic resin (4). Accordingly, in a case where the interlayer film comprises the first to fifth resin layers and the thermoplastic resin (1) is a polyvinyl acetal resin, all the thermoplastic resins (2), (3), (4) and (5) are preferably polyvinyl acetal resins.

The detail of the thermoplastic resin for use in each of the resin layer(s) other than the first resin layer is described below.

Each of the resin layer(s) other than the first resin layer in the interlayer film also preferably comprises a plasticizer. In other words, the second resin layer in the interlayer film preferably comprises a plasticizer. The third resin layer preferably comprises a plasticizer. The fourth resin layer preferably comprises a plasticizer. The fifth resin layer preferably comprises a plasticizer. In other words, in a case where the interlayer film comprises a plurality of resin layers, both the first and second resin layers preferably each comprise a plasticizer. In a case where the interlayer film comprises the first, second and third resin layers, all the first, second and third resin layers further preferably each comprise a plasticizer. In a case where the first to fourth resin layers are comprised, all the first to fourth resin layers further preferably each comprise a plasticizer. In a case where the first to fifth resin layers are comprised, all the first to fifth resin layers further preferably each comprise a plasticizer.

The respective plasticizers comprised in the second, third, fourth and fifth resin layers may be sometimes referred to as "plasticizer (2)", "plasticizer (3)", "plasticizer (4)" and "plasticizer (5)".

The content of the plasticizer (2) based on 100 parts by mass of the thermoplastic resin (2) in the second resin layer is sometimes designated as "content (2)", and the content of the plasticizer (3) based on 100 parts by mass of the thermoplastic resin (3) in the third resin layer is sometimes designated as "content (3)". Furthermore, the content of the plasticizer (4) based on 100 parts by mass of the thermoplastic resin (4) in the fourth resin layer is sometimes designated as "content (4)". Furthermore, the content of the plasticizer (5) based on 100 parts by mass of the thermoplastic resin (5) in the fifth resin layer is sometimes designated as "content (5)".

The interlayer film is flexible by each of the above resin layers respectively comprising the plasticizers, and as a result, allows laminated glass to be enhanced in flexibility and also enhanced in penetration resistance. Furthermore, high adhesiveness to a glass member such as a glass plate or such other resin layer(s) in the interlayer film can also be exhibited. In a case where each polyvinyl acetal resin is used as the thermoplastic resin in each of the resin layer(s) other than the first resin layer, the plasticizer is particularly effectively comprised. The plasticizers (for example, plasticizers (2), (3), (4) and (5)) for use in the resin layers other than the first resin layer may be each the same as or different from that of the plasticizer (1). The plasticizers (for example, plasticizers (2), (3), (4) and (5)) for use in the resin layers other than the first resin layer may be the same as or different from one another.

The plasticizer for use in each of the resin layers other than the first resin layer may be used singly or in combinations of two or more thereof.

The content (for example, each of the contents (2), (3), (4) and (5)) of the plasticizer based on 100 parts by mass of the resin in each of the resin layers other than the first resin layer is preferably 10 parts by mass or more. When the content of the plasticizer is equal to or more than the lower limit, the interlayer film is enhanced in flexibility and the interlayer film is easily handled. The content of each of the plasticizers is more preferably 15 parts by mass or more, further preferably 20 parts by mass or more, particularly preferably 24 parts by mass or more, from the above viewpoints.

The content (for example, each of the contents (2), (3), (4) and (5)) of the plasticizer in each of the resin layers other than the first resin layer is preferably 60 parts by mass or less, more preferably 50 parts by mass or less, further preferably 40 parts by mass or less. When each of the above contents is equal to or less than the upper limit, the interlayer film is improved in mechanical characteristics such as flexural rigidity.

The content (1) of the plasticizer in the first resin layer is preferably higher than the content of the plasticizer in each of the resin layers other than the first resin layer in order to enhance noise barrier performance of laminated glass. In other words, the content (1) of the plasticizer is preferably higher than the content (2), and the content (1) is preferably higher than the content (3) and is preferably higher than the content (4). The content (1) is more preferably higher than the content (5).

In a case where the interlayer film comprises the first to third resin layers, the content (1) is further preferably higher than both the contents (2) and (3), and in a case where the fourth resin layer is further provided, the content (1) is further preferably higher than all the contents (2), (3) and (4). In a case where the fifth resin layer is further provided, the content (1) is further preferably higher than all the contents (2), (3), (4) and (5).

In a case where the content (1) is higher than the content of the plasticizer in each of the resin layer(s), the absolute value of the difference between the content (1) and the content (for example, the content (2), (3), (4) or (5)) of each of the resin layer(s) other than the first resin layer is preferably 10 parts by mass or more, more preferably 15 parts by mass or more, further preferably 25 parts by mass or more. When the absolute value of the difference in content is larger, noise barrier performance of laminated glass is much more easily enhanced. The absolute value of the difference is preferably 80 parts by mass or less, more preferably 70 parts by mass or less, further preferably 60 parts by mass or less.

The thermoplastic resin, or the thermoplastic resin and the plasticizer serve(s) as main component(s) in each of the resin layer(s) other than the first resin layer, and the total amount of the thermoplastic resin and the plasticizer is preferably 70% by mass or more, more preferably 80% by mass or more, further preferably 90% by mass or more based on the total amount of each of the resin layer(s).

While each of the resin layers (for example, the second resin layer, the third resin layer, the fourth resin layer, and the fifth resin layer) other than the first resin layer may or may not comprise the light diffusion particle, the concentration of the light diffusion particle in the interlayer film may be designed so as to be in the above range. Accordingly, it is preferable that the second resin layer is low in content of the light diffusion particle even if comprising the light diffusion particle, or comprises no light diffusion particle, and it is more preferable that the second resin layer comprises no light diffusion particle. It is preferable that the third resin layer is also low in content of the light diffusion particle even if comprising the light diffusion particle, or comprises no light diffusion particle, and it is more preferable that the third resin layer comprises no light diffusion particle. Similarly, it is preferable that the fourth resin layer is also low in content of the light diffusion particle even if comprising the light diffusion particle, or comprises no light diffusion particle, and it is more preferable that the fourth resin layer comprises no light diffusion particle. It is preferable that the fifth resin layer is also low in content of the light diffusion particle even if comprising the light diffusion particle, or comprises no light diffusion particle, and it is more preferable that the fifth resin layer comprises no light diffusion particle.

In the case where each of the resin layers other than the first resin layer comprises no light diffusion particle, or is low in content of the light diffusion particle even if comprising the light diffusion particle, as described above, almost no light-scattering is caused in each of the resin layers. Thus, the contrast of an image displayed in use of the interlayer film in an image display screen can be increased. A specific concentration of the light diffusion particle in each of the resin layers (for example, each resin layer of the second resin layer, the third resin layer and the fourth resin layer) other than the first resin layer is not particularly limited, and is, for example, 1% by mass or less, preferably 0.5% by mass or less, more preferably 0.1% by mass or less, further preferably 0% by mass.

In a case where the interlayer film comprises two or more resin layers, as described above, at least one of the resin layers other than the first resin layer may comprise a colorant and serve as a colored resin layer. The interlayer film comprises a colored resin layer, and thus allows the contrast in image display to be easily increased, along with comprising of the light diffusion particle in the first resin layer, when applied to an image display screen.

For example, the second or third resin layer may comprise a colorant and serve as a colored resin layer in the interlayer film having the first and second resin layers or the interlayer film having the first to third resin layers.

In a case where the interlayer film has the first to fourth resin layers, the fourth resin layer preferably comprises a colorant and serves as a colored resin layer, as described above. The fourth resin layer comprises a colorant and thus the contrast in image display is easily increased, along with comprising of the light diffusion particle in the first resin layer, in a case where the interlayer film is used in an image display screen. The interlayer film which comprises the colored resin layer can be obtained only by further laminating the colored resin layer on a laminate having the first to third resin layers, and thus such forming is relatively easy.

Also, in a case where the interlayer film has the first to fifth resin layers, the fourth resin layer preferably comprises a colorant and serves as a colored resin layer, as described above.

The concentration of the colorant in the colored resin layer (for example, the second, third, fourth resin layer or fifth resin layer) is preferably 0.005% by mass or more and 0.4% by mass or less as in that in the first resin layer. The concentration of the colorant in the colored resin layer is more preferably 0.01% by mass or more, further preferably 0.05% by mass or more, and more preferably 0.3% by mass or less, further preferably 0.2% by mass or less, further preferably 0.15% by mass or less.

In a case where one resin layer other than the first resin layer serves as the colored resin layer, each resin layer constituting the interlayer film, other than the colored resin layer, may comprise a colorant, but preferably comprises substantially no colorant. When each resin layer other than the colored resin layer comprises substantially no colorant, the total light transmittance is increased and the interlayer film is easily enhanced in transparency.

For example, in a case where the second resin layer comprises a colorant, resin layer(s) (for example, the first resin layer in a case where two resin layers are comprised, or the first and third resin layers in a case where three resin layers are comprised.) other than the second resin layer may comprise a colorant, but preferably comprise(s) substantially no colorant.

Each of the resin layers constituting the interlayer film may, if necessary, appropriately comprise additive(s) other than the above, such as an infrared absorber, an ultraviolet absorber, an antioxidant, a light stabilizer, a fluorescent whitener, a crystal nucleator, a carboxylic acid metal salt and/or a heat shield material.

(Thickness of Interlayer Film)

The thickness of the interlayer film (namely, the thickness of the entire interlayer film) is not particularly limited, and is preferably 100 μm or more and 3.0 mm or less. When the thickness of the interlayer film is 100 μm or more, for example, adhesiveness of the interlayer film and penetration resistance of laminated glass can be improved. When the thickness is 3.0 mm or less, the thickness of the interlayer film is prevented from being excessively large and transparency is also easily ensured. The thickness of the interlayer film is more preferably 200 μm or more, further preferably 400 μm or more. The thickness is more preferably 2.0 mm or less, further preferably 1.5 mm or less.

(Thickness of Resin Layer Other than First Resin Layer)

The thickness of the second resin layer, or the respective thicknesses of the second and third resin layers is/are not particularly limited, and is/are preferably 50 μm or more and 1.3 mm or less. When these thicknesses are each 50 μm or more, for example, adhesiveness of the interlayer film and penetration resistance of laminated glass can be improved. In addition, the contrast of an image can also be enhanced. When these thicknesses are each 1.3 mm or less, the thickness of the interlayer film is prevented from being excessively large and transparency is also easily ensured. The thickness of the second resin layer, or the respective thicknesses of the second and third resin layers is/are more preferably 100 μm or more, further preferably 150 μm or more, and more preferably 1 mm or less, further preferably 500 μm or less, from the above viewpoints. The respective thicknesses of the second and third resin layers may be each constant or changed over the entire interlayer film, and when the thicknesses are changed, the thickness of any region may be in the above range when changed. Herein, the thickness of a region where the thickness of the first resin layer is in the above preferable range (namely, 20 μm or more and 250 μm or less, more preferably 40 μm or more and 150 μm or less, further preferably 70 μm or more and 90 μm or less) may be in the above range. Such a region may serve as an image display region. It is also preferable in a region where each of the thicknesses of the second and third resin layers is constant that the thicknesses be each in the above range. This also applies to the following respective thicknesses of the fourth and fifth resin layers.

The thickness of the second resin layer, or the respective thicknesses of the second and third resin layers is/are preferably more than the thickness of the first resin layer. These resin layers are increased in thickness, and thus the contrast in image display is easily increased and adhesiveness of the interlayer film to a glass member is also easily enhanced. Each ratio of the thickness of the second resin layer, or the respective thicknesses of the second and third resin layers, relative to the thickness of the first resin layer, is preferably 1.2 or more, more preferably 1.4 or more, further preferably 2 or more, and preferably 10 or less, more preferably 8 or less, further preferably 5 or less, from the above viewpoints.

While the respective thicknesses of the first, second and third resin layers may be changed, the above ratio of the thicknesses may be in the range in any region, or may be more preferably in the range in a region where the thickness of the first resin layer is in the above preferable range (namely, 20 μm or more and 250 μm or less, more preferably 40 μm or more and 150 μm or less, further preferably 70 μm or more and 90 μm or less). This also applies to the ratio of other thicknesses. The region may serve as an image display region.

The thickness of the fourth resin layer is not particularly limited, and is preferably 50 μm or more and 1.3 mm or less. When the thickness is 50 μm or more, for example, adhesiveness of the interlayer film and penetration resistance of laminated glass can be improved. The fourth resin layer comprises a colorant, and thus the contrast in image display is easily increased. When the thickness is 1.3 mm or less, the thickness of the interlayer film is prevented from being excessively large and transparency is also easily ensured. The thickness of the fourth resin layer is more preferably 100 μm or more, further preferably 150 μm or more, still further preferably 250 μm or more, and more preferably 1 mm or less, further preferably 750 μm or less, still further preferably 500 μm or less, from the above viewpoints. The thickness of the fourth resin layer may be constant or changed over the entire interlayer film.

The thickness of the fourth resin layer is preferably more than the thickness of the first resin layer. The fourth resin layer is increased in thickness, and thus adhesiveness of the interlayer film to a glass member is easily enhanced in a case where the fourth resin layer adheres to a glass member. In a case where the fourth resin layer comprises a colorant, the contrast in image display is easily increased. The ratio of the thickness of the fourth resin layer to the thickness of the first resin layer is preferably 1.2 or more, more preferably 1.4 or more, further preferably 2 or more, and preferably 10 or less, more preferably 9 or less, further preferably 6 or less, from the above viewpoints.

The thickness of the fifth resin layer is not particularly limited, and is preferably 50 μm or more and 1.3 mm or less. When the thickness is 50 μm or more, for example, adhesiveness of the interlayer film and penetration resistance of laminated glass can be improved. When the thickness is 1.3 mm or less, the thickness of the interlayer film is prevented from being excessively large and transparency is also easily ensured. The thickness of the fifth resin layer is more preferably 100 μm or more, further preferably 150 μm or more, and more preferably 1 mm or less, further preferably 500 μm or less, from the above viewpoints. The thickness of the fifth resin layer may be constant or changed over the entire interlayer film.

The thickness of the fifth resin layer is preferably more than the thickness of the first resin layer. The fifth resin layer is increased in thickness, and thus, for example, adhesiveness of the interlayer film to a glass member is easily enhanced. The ratio of the thickness of the fifth resin layer to the thickness of the first resin layer is preferably 1.2 or more, more preferably 1.4 or more, further preferably 2 or more, and preferably 10 or less, more preferably 8 or less, further preferably 5 or less, from the above viewpoint.

(Polyvinyl Acetal Resin)

Hereinafter, the details of the respective polyvinyl acetal resins for use in the resin layers are described. In the following description, the configuration common to the respective polyvinyl acetal resins for use in the resin layers is described simply in terms of "polyvinyl acetal resin". Respective individual configurations of the polyvinyl acetal resins for use in the first, second, third, fourth and fifth resin layers are described in terms of "polyvinyl acetal resin (1)", "polyvinyl acetal resin (2)", "polyvinyl acetal resin (3)", "polyvinyl acetal resin (4)" and "polyvinyl acetal resin (5)".

The polyvinyl acetal resin is obtained by acetalization of polyvinyl alcohol (PVA) with aldehyde. In other words, the polyvinyl acetal resin is preferably an acetalized product of polyvinyl alcohol (PVA). Polyvinyl alcohol (PVA) is obtained by saponification of, for example, polyvinyl ester such as polyvinyl acetate. The degree of saponification of polyvinyl alcohol is generally 70 to 99.9% by mol. The polyvinyl acetal resin may be used singly or in combinations of two or more thereof. Herein, respective PVAs for obtaining the polyvinyl acetal resins (1), (2), (3), (4) and (5) may be described as PVAs (1), (2), (3), (4) and (5) in the following description.

The average degree of polymerization of PVA is preferably 200 or more, more preferably 500 or more, further preferably 1000 or more, still further preferably 1500 or more. When the average degree of polymerization is equal to or more than the lower limit, penetration resistance of laminated glass is enhanced. The average degree of polymerization of PVA is preferably 5000 or less, more preferably 4000 or less, further preferably 3500 or less, still further preferably 2500 or less. When the average degree of polymerization is equal to or less than the upper limit, the interlayer film is easily formed.

In a case where the content of the plasticizer is increased, the average degree of polymerization of PVA is preferably increased. Accordingly, in a case where the content (1) of the plasticizer in the first resin layer is, for example, 55 parts by mass or more, the average degree of polymerization of PVA (1) is suitably 2000 or more.

The average degree of polymerization of PVA (1) may be lower than, the same as, or higher than the average degrees of polymerization of PVAs (for example, PVAs (2), (3), (4) and (5)) for forming other resin layers. The average degree of polymerization of PVA (1) is herein preferably equal to or more than the average degrees of polymerization of PVAs for forming other resin layers. Thus, in a case where the average degree of polymerization of PVA (1) is increased, various performances are easily kept, for example, even if the content of the plasticizer in the first resin layer is increased.

The average degree of polymerization of polyvinyl alcohol is determined by a method according to JIS K6726 "polyvinyl alcohol test method".

The aldehyde for use in acetalization is not particularly limited, an aldehyde having 1 to 10 carbon atoms is suitably used, an aldehyde having 3 to 5 carbon atoms is more preferable, an aldehyde having 4 or 5 carbon atoms is further preferable, and an aldehyde having 4 carbon atoms is particularly preferable.

The aldehyde having 1 to 10 carbon atoms is not particularly limited, and examples thereof include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde and benzaldehyde. In particular, acetaldehyde, propionaldehyde, n-butyraldehyde, isobutyraldehyde, n-hexylaldehyde or n-valeraldehyde is preferable, propionaldehyde, n-butyraldehyde, isobutyraldehyde or n-valeraldehyde is more preferable, n-butyraldehyde or n-valeraldehyde is further preferable, and n-butyraldehyde is most preferable. The aldehyde may be used singly or in combinations of two or more thereof.

The number of carbon atoms in an acetal group contained in the polyvinyl acetal resin is not particularly limited, and is preferably 1 to 10, more preferably 3 to 5, further preferably 4 or 5, particularly preferably 4. A specific acetal group is particularly preferably a butyral group, and accordingly, the polyvinyl acetal resin is preferably a polyvinyl butyral resin. In other words, in the present invention, the thermoplastic resin (1) in the first resin layer is preferably a polyvinyl butyral resin, and both the thermoplastic resins (1) and (2) in the first and second resin layers are more preferably polyvinyl butyral resins. In a case where the first to third resin layers are comprised, all the thermoplastic resins (1), (2) and (3) in the first, second and third resin layers are preferably polyvinyl butyral resins. In a case where the first to fourth resin layers are comprised, all the thermoplastic resins (1) to (4) in the first to fourth resin layers are preferably polyvinyl butyral resins. In a case where the first to fifth resin layers are comprised, all the thermoplastic resins (1) to (5) in the first to fifth resin layers are preferably polyvinyl butyral resins. In a case where the interlayer film comprises a plurality of resin layers, the respective thermoplastic resins in all the resin layers are preferably polyvinyl butyral resins.

The content rate (amount of hydroxyl group) of a hydroxyl group in the polyvinyl acetal resin (1) is preferably 17% by mol or more, more preferably 20% by mol or more, and is, for example, 38% by mol or less, preferably 34% by mol or less. When the content rate of the hydroxyl group is equal to or more than the lower limit, the interlayer film is much more increased in adhesion force. The content rate is more preferably 30% by mol or less, further preferably 27% by mol or less, from the viewpoint that the polyvinyl acetal resin (1) absorbs the plasticizer to enhance noise barrier performance of laminated glass. The content rate of a hydroxyl group in the polyvinyl acetal resin (1) is 20% by mol or more, resulting in a high reaction efficiency and excellent productivity.

The respective content rates of hydroxyl groups in the polyvinyl acetal resins (for example, the polyvinyl acetal resins (2), (3), (4) and (5)) for use in the resin layers other than the first resin layer are, for example, 20% by mol or more, preferably 25% by mol or more, more preferably 28% by mol or more. When the content rates of the hydroxyl groups are each equal to or more than the lower limit, not only noise barrier performance is kept, but also flexural rigidity can be more enhanced. The respective content rates of hydroxyl groups in the polyvinyl acetal resins (for example, the polyvinyl acetal resins (2), (3), (4) and (5)) for use in the resin layers other than the first resin layer are each preferably 38% by mol or less, more preferably 36% by mol or less, further preferably 34% by mol or less. By keeping the content rates of the hydroxyl groups equal to or less than the upper limit, the polyvinyl acetal resin is easily precipitated in synthesis of the polyvinyl acetal resin.

The content rate of a hydroxyl group in the polyvinyl acetal resin (1) is preferably lower than the respective content rates of hydroxyl groups in the polyvinyl acetal resins for use in the resin layers other than the first resin layer, from the viewpoint of a much more enhancement in noise barrier performance. Accordingly, the content rate of a hydroxyl group in the polyvinyl acetal resin (1) is lower than the content rate of a hydroxyl group in the polyvinyl acetal resin (2). The content rate of a hydroxyl group in the polyvinyl acetal resin (1) is lower than the content rate of a hydroxyl group in the polyvinyl acetal resin (3). The content rate of a hydroxyl group in the polyvinyl acetal resin (1) is lower than the content rate of a hydroxyl group in the polyvinyl acetal resin (4). The content rate of a hydroxyl group in the polyvinyl acetal resin (1) is lower than the content rate of a hydroxyl group in the polyvinyl acetal resin (5).

In a case where the content rate of a hydroxyl group in the polyvinyl acetal resin (1) is lower than the respective content rates of hydroxyl groups in the polyvinyl acetal resins for use in the resin layers other than the first resin layer, the absolute value of the difference between these content rates is preferably 1% by mol or more. Thus, noise barrier performance can be much more enhanced. The absolute value of the difference between these content rates of the hydroxyl groups is more preferably 5% by mol or more, from the above viewpoints. The absolute value of the difference between these content rates of the hydroxyl groups is preferably 20% by mol or less.

The content rate of a hydroxyl group in the polyvinyl acetal resin is the value obtained by expressing a molar fraction as a percentage, the molar fraction being determined by dividing the amount of an ethylene group to which a hydroxyl group is bound, by the amount of the entire ethylene group in a main chain. The amount of an ethylene group to which a hydroxyl group is bound can be measured according to, for example, JIS K6728 "polyvinyl butyral test method".

The degree of acetalization of the polyvinyl acetal resin (1) is preferably 47% by mol or more, more preferably 55% by mol or more, further preferably 60% by mol or more, and preferably 85% by mol or less, more preferably 80% by mol or less, further preferably 75% by mol or less. When the degree of acetalization is equal to or more than the lower limit, compatibility between the polyvinyl acetal resin (1) and the plasticizer is enhanced. When the degree of acetalization is equal to or less than the upper limit, the amount of the remaining aldehyde in the resin can be decreased. The degree of acetalization means the degree of butyralization in a case where the acetal group is a butyral group and the polyvinyl acetal resin (1) is a polyvinyl butyral resin.

The respective degrees of acetalization (the respective degrees of butyralization in the case of polyvinyl butyral resins) in the polyvinyl acetal resins (for example, the polyvinyl acetal resins (2). (3), (4) and (5)) for use in the resin layers other than the first resin layer are each preferably 55% by mol or more, more preferably 60% by mol or more, further preferably 63% by mol or more, and is preferably 85% by mol or less, more preferably 80% by mol or less, further preferably 75% by mol or less. When the degrees of acetalization are each equal to or more than the lower limit, compatibility between the polyvinyl acetal resin and the plasticizer is enhanced. When the degrees of acetalization are each equal to or less than the upper limit, the amount of the remaining aldehyde in the resin can be decreased.

Each of the degrees of acetalization is the value obtained by expressing a molar fraction as a percentage, the molar fraction being determined by dividing the value obtained by subtracting the amount of an ethylene group to which a hydroxyl group is bound and the amount of an ethylene group to which an acetyl group is bound, from the amount of the entire ethylene group in a main chain, by the amount of the entire ethylene group in a main chain. The degree of acetalization (degree of butyralization) may be calculated from the result measured by a method according to JIS K6728 "polyvinyl butyral test method".

The degree of acetylation (amount of acetyl group) of the polyvinyl acetal resin (1) is preferably 0.01% by mol or more, more preferably 0.1% by mol or more. The degree of acetylation is further preferably 7% by mol or more, particularly preferably 9% by mol or more, from the viewpoint that compatibility between the polyvinyl acetal resin and the plasticizer is enhanced and a large amount of the plasticizer is easily compounded. The degree of acetylation of the polyvinyl acetal resin (1) is preferably 30% by mol or less, more preferably 25% by mol or less, further preferably 24% by mol or less, particularly preferably 20% by mol or less. When the degree of acetylation is equal to or less than the upper limit, the interlayer film and laminated glass are enhanced in moisture resistance.

The respective degrees of acetylation in the polyvinyl acetal resins (for example, the polyvinyl acetal resins (2), (3), (4) and (5)) for use in the resin layers other than the first resin layer are each preferably 10% by mol or less, more preferably 2% by mol or less. When the degrees of acetylation are each equal to or less than the upper limit, the interlayer film and the laminated glass are enhanced in moisture resistance. The degrees are not particularly limited, and are each preferably 0.01% by mol or more, more preferably 0.1% by mol or more. The degree of acetylation is the value obtained by expressing a molar fraction as a percentage, the molar fraction being determined by dividing the amount of an ethylene group to which an acetyl group is bound, by the amount of the entire ethylene group in a main chain. The amount of an ethylene group to which an acetyl group is bound can be measured according to, for example, JIS K6728 "polyvinyl butyral test method".

(Ethylene-Vinyl Acetate Copolymer Resin)

The ethylene-vinyl acetate copolymer resin may be a non-crosslinked ethylene-vinyl acetate copolymer resin or a high-temperature crosslinked ethylene-vinyl acetate copolymer resin. The ethylene-vinyl acetate copolymer resin here used can also be an ethylene-vinyl acetate-modified resin such as a saponified product of an ethylene-vinyl acetate copolymer or a hydrolyzed product of ethylene-vinyl acetate.

The content of vinyl acetate in the ethylene-vinyl acetate copolymer resin, as measured according to JIS K 6730 "ethylene-vinyl acetate resin test method", is preferably 10 to 50% by mass, more preferably 20 to 40% by mass. When the content of vinyl acetate is equal to or more than the lower limit value, adhesiveness to, for example, a glass plate is improved and furthermore penetration resistance of laminated glass is easily improved. When the content of vinyl acetate is equal to or less than the upper limit value, rupture strength of the interlayer film is increased and impact resistance of laminated glass is improved.

(Ionomer Resin)

An ionomer resin is not particularly limited, and various ionomer resins can be used. Specific examples include an ethylene-based ionomer, a styrene-based ionomer, a perfluorocarbon-based ionomer, a telechelic ionomer and a polyurethane ionomer. In particular, an ethylene-based ionomer is preferable from the viewpoint that laminated glass is improved in, for example, mechanical strength, durability and/or transparency and from the viewpoint that, when a glass plate is inorganic glass, adhesiveness to such a glass plate is excellent.

An ionomer of an ethylene-unsaturated carboxylic acid copolymer is suitably used as the ethylene-based ionomer because of being excellent in transparency and toughness. The ethylene-unsaturated carboxylic acid copolymer is a copolymer having at least an ethylene-derived structural unit and an unsaturated carboxylic acid-derived structural unit, and may have other monomer-derived structural unit.

Examples of the unsaturated carboxylic acid include acrylic acid, methacrylic acid and maleic acid, and acrylic acid and methacrylic acid are preferable. Examples of such other monomer include acrylate, methacrylate and 1-butene.

The ethylene-unsaturated carboxylic acid copolymer preferably has 75 to 99% by mol of an ethylene-derived structural unit and preferably has 1 to 25% by mol of an unsaturated carboxylic acid-derived structural unit, under the assumption that all structural units in the copolymer correspond to 100% by mol. The ionomer of the ethylene-unsaturated carboxylic acid copolymer is an ionomer resin obtained by at least partially neutralizing or crosslinking a carboxyl group in the ethylene-unsaturated carboxylic acid copolymer by a metal ion, and the degree of neutralization of the carboxyl group is usually 1 to 90%, preferably 5 to 85%.

Examples of an ion source in the ionomer resin include alkali metals such as lithium, sodium, potassium, rubidium and cesium, and polyvalent metals such as magnesium, calcium and zinc, and sodium and zinc are preferable.

The ionomer resin is not particularly limited in terms of the production method, and can be produced by a conventionally known production method. For example, in a case where the ionomer of the ethylene-unsaturated carboxylic acid copolymer is used as the ionomer resin, for example, ethylene and unsaturated carboxylic acid are radically copolymerized at a high temperature and at a high pressure, and thus the ethylene-unsaturated carboxylic acid copolymer is produced. The ethylene-unsaturated carboxylic acid copolymer and a metal compound comprising the ion source are reacted, and thus the ionomer of the ethylene-unsaturated carboxylic acid copolymer can be produced.

(Polyurethane Resin)

Examples of the polyurethane resin include polyurethane obtained by reacting an isocyanate compound and a diol compound, and polyurethane obtained by reacting an isocyanate compound, a diol compound, and a chain extender such as polyamine. The polyurethane resin may contain a sulfur atom. In this case, the diol may be partially or fully one selected from polythiol and sulfur-containing polyol. The polyurethane resin can improve adhesiveness to organic glass. Thus, the polyurethane resin is suitably used in a case where a glass plate is organic glass.

(Thermoplastic Elastomer)

Examples of the thermoplastic elastomer include a styrene-based thermoplastic elastomer and an aliphatic polyolefin. The styrene-based thermoplastic elastomer is not particularly limited, and known one can be used. The general styrene-based thermoplastic elastomer generally has a polymer block of a styrene monomer, serving as a hard segment, and a polymer block of a conjugated diene compound, or a hydrogenated block thereof, serving as a soft segment. Specific examples of the styrene-based thermoplastic elastomer include a styrene-isoprene diblock copolymer, a styrene-butadiene diblock copolymer, a styrene-isoprene-styrene triblock copolymer, a styrene-butadiene/isoprene-styrene triblock copolymer, a styrene-butadiene-styrene triblock copolymer, and hydrogenated products thereof.

The aliphatic polyolefin may be a saturated aliphatic polyolefin or an unsaturated aliphatic polyolefin. The aliphatic polyolefin may be a polyolefin with a linear olefin as a monomer, or a polyolefin with a cyclic olefin as a monomer. The aliphatic polyolefin is preferably a saturated aliphatic polyolefin, from the viewpoint that the interlayer film is effectively enhanced in storage stability and noise barrier performance.

Examples of the material of the aliphatic polyolefin include ethylene, propylene, 1-butene, trans-2-butene, cis-2-butene, 1-pentene, trans-2-pentene, cis-2-pentene, 1-hexene, trans-2-hexene, cis-2-hexene, trans-3-hexene, cis-3-hexene, 1-heptene, trans-2-heptene, cis-2-heptene, trans-3-heptene, cis-3-heptene, 1-octene, trans-2-octene, cis-2-octene, trans-3-octene, cis-3-octene, trans-4-octene, cis-4-octene, 1-nonene, trans-2-nonene, cis-2-nonene, trans-3-nonene, cis-3-nonene, trans-4-nonene, cis-4-nonene, 1-decene, trans-2-decene, cis-2-decene, trans-3-decene, cis-3-decene, trans-4-decene, cis-4-decene, trans-5-decene, cis-5-decene, 4-methyl-1-pentene and vinyl cyclohexane.

(Plasticizer)

Hereinafter, the details of the respective plasticizers for use in the resin layers are described. In the following description, the respective plasticizers (for example, plasticizers (1) to (4)) for use in the resin layers are collectively described.

Examples of the respective plasticizers for use in the resin layers include organic ester plasticizers such as a monobasic organic acid ester and a polybasic organic acid ester, and phosphorus plasticizers such as an organic phosphate plasticizer and an organic phosphite plasticizer. In particular, an organic ester plasticizer is preferable. The plasticizer is preferably a liquid plasticizer. The liquid plasticizer is a plasticizer which is liquid at ordinary temperature (23° C.) and ordinary pressure (1 atm).

Examples of the monobasic organic acid ester include an ester of glycol and monobasic organic acid. Examples of the glycol include polyalkylene glycol where each alkylene unit has 2 to 4 carbon atoms, preferably 2 or 3 carbon atoms, and the number of such alkylene units repeated is 2 to 10, preferably 2 to 4. The glycol may also be a monoalkylene glycol where the number of carbon atoms is 2 to 4, preferably 2 or 3, and the number of repeating units is 1.

Specific examples of the glycol include ethylene glycol, diethylene glycol, triethylene glycol, tetraethylene glycol, propylene glycol, dipropylene glycol, tripropylene glycol, tetrapropylene glycol and butylene glycol.

Examples of the monobasic organic acid include an organic acid having 3 to 10 carbon atoms, and specifically include butyric acid, isobutyric acid, caproic acid, 2-ethylbutyric acid, 2-ethylpentanoic acid, heptylic acid, n-octylic acid, 2-ethylhexylic acid, n-nonylic acid and decylic acid.

A preferable monobasic organic acid ester is, for example, a compound represented by the following formula (1):

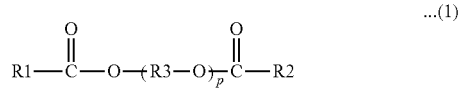

...(1)

wherein R1 and R2 each represent an organic group having 2 to 10 carbon atoms, R3 represents an ethylene group, an isopropylene group or a n-propylene group, and p represents an integer of 3 to 10, and wherein R1 and R2 each preferably have 5 to 10 carbon atoms, more preferably 6 to 10 carbon atoms. The organic groups in R1 and R2 are each preferably a hydrocarbon group, more preferably an alkyl group.

Specific examples of the glycol ester include ethylene glycol di-2-ethylbutyrate, 1,2-propylene glycol di-2-ethylbutyrate, 1,3-propylene glycol di-2-ethylbutyrate, 1,4-butylene glycol di-2-ethylbutyrate, 1,2-butylene glycol di-2-ethylbutyrate, diethylene glycol di-2-ethylbutyrate, diethylene glycol dicaprylate, diethylene glycol di-2-ethylhexanoate, dipropylene glycol di-2-ethylbutyrate, triethylene glycol di-2-ethylhexanoate, triethylene glycol dicaprylate, triethylene glycol di-2-ethylpentanoate, triethylene glycol di-n-heptanoate, triethylene glycol di-2-ethylbutyrate, triethylene glycol di-2-ethyl propanoate, tetraethylene glycol di-n-heptanoate, tetraethylene glycol di-2-ethylhexanoate and tetraethylene glycol di-2-ethylbutyrate.

Examples of the polybasic organic acid ester include an ester compound of a dibasic organic acid having 4 to 12 carbon atoms, such as adipic acid, sebacic acid or azelaic acid, and an alcohol having 4 to 10 carbon atoms. The alcohol having 4 to 10 carbon atoms may be straight, may have a branched structure, or may have a cyclic structure.

Specific examples include dibutyl sebacate, dioctyl azelate, dihexyl adipate, dioctyl adipate, hexylcyclohexyl adipate, diisononyl adipate, heptylnonyl adipate, di-(2-butoxyethyl) adipate, dibutylcarbitol adipate and mixed adipate. For example, oil-modified sebacic acid alkyd may also be adopted. Examples of the mixed adipate include an adipate produced from two or more alcohols selected from an alkyl alcohol having 4 to 9 carbon atoms and a cyclic alcohol having 4 to 9 carbon atoms.

Examples of the organic phosphate plasticizer include phosphoric acid esters such as tributoxyethyl phosphate, isodecylphenyl phosphate and triisopropyl phosphate.

The plasticizer may be used singly or in combinations of two or more thereof.

The plasticizer is, in particular, preferably selected from di-(2-butoxyethyl) adipate (DBEA), triethylene glycol di-2-ethylhexanoate (3GO), triethylene glycol di-2-ethylbutyrate (3GH) and triethylene glycol di-2-ethylpropanoate, more preferably selected from triethylene glycol di-2-ethylhexanoate (3GO), triethylene glycol di-2-ethylbutyrate (3GH) and triethylene glycol di-2-ethylpropanoate, further preferably selected from triethylene glycol di-2-ethylhexanoate and triethylene glycol di-2-ethylbutyrate, particularly preferably triethylene glycol di-2-ethylhexanoate.

[Method for Producing Interlayer Film]

The interlayer film can be produced by obtaining a resin composition for formation each of the layers, forming each of the layers (for example, first resin layer, second resin layer, third resin layer, and fourth resin layer) constituting the interlayer film, from the resin composition, and laminating the layers for integration. The interlayer film can also be produced by forming each of the layers constituting the interlayer film, by co-extrusion and also laminating the layers for integration.

The resin composition for formation each of the layers may be obtained by mixing components constituting the resin composition, for example, a resin such as the thermoplastic resin, and the light diffusion particle, the plasticizer, the colorant and other additive(s) if necessary compounded, in a kneading apparatus or the like by a known method. For example, in a case where each layer constituting the interlayer film is formed using an extruder such as a co-extruder, the components constituting the resin composition may be mixed in the extruder.

<Laminated Glass>

The present invention further provides a laminated glass. The laminated glass of the present invention comprises paired glass members and the interlayer film placed between the paired glass members. The paired glass members may be bonded each other through the interlayer film. The laminated glass of the present invention preferably has a total light transmittance (TvD) according to JIS R3106 (2019), of less than 70%. The total light transmittance (TvD) of the laminated glass of the present invention is more preferably 50% or less, further preferably 45% or less, still further preferably 38% or less, is not particularly limited, and is, for example, 10% or more, preferably 20% or more, more preferably 28% or more, as in the interlayer film of the present invention, described above. The configuration of the interlayer film in the laminated glass is as described above, and the description thereof is omitted.

The L* of the color tone L*a*b* in measurement of the total light transmittance of the laminated glass is preferably 65 or less, more preferably 50 or less. When the L* is equal to or less than the upper limit, the laminated glass is darkened and image display at a much higher contrast can be realized.

The haze of the laminated glass of the present invention is preferably 35% or more. The haze is more preferably 45% or more, further preferably 55% or more, particularly preferably 65% or more. When the haze of the laminated glass is in the range, image display at a high contrast is facilitated in use in an image display screen.

As illustrated in FIGS. 1 to 5, glass members 21 and 22 are respectively laminated on both surfaces of an interlayer film 10 in laminated glass 25 to 29. For example, in the case of an interlayer film 10 having a first resin layer 11 as a single layer, as illustrated in FIG. 1, the glass members 21 and 22 may be respectively laminated on both surfaces of the first resin layer 11. In the case of an interlayer film 10 having a first resin layer 11 and a second resin layer 12, as illustrated in FIG. 2, one glass member 21 may be laminated on the second resin layer 12 and other glass member 22 may be laminated on the first resin layer 11. In the case of an interlayer film 17 having first to third resin layers 11, 12 and 13, as illustrated in FIG. 3, one glass member 21 may be laminated on the second resin layer 12 and other glass member 22 may be laminated on the third resin layer 13. For example, in the case of an interlayer film 18 having first to fourth resin layers 11, 12, 13 and 14, as illustrated in FIG. 4, one glass member 21 may be laminated on the fourth resin layer 14 and other glass member 22 may be laminated on the third resin layer 13. For example, in the case of an interlayer film 18 having first to fifth resin layers 11, 12, 13, 14 and 15, as illustrated in FIG. 5, one glass member 21 may be laminated on the fifth resin layer 15 and other glass member 22 may be laminated on the third resin layer 13.

(Glass Member)

The glass member for use in the laminated glass may be a glass plate. The glass plate may be either inorganic glass or organic glass, and inorganic glass is preferable. The inorganic glass is not particularly limited, and examples thereof include clear glass, clear float glass, float plate glass, reinforced glass, colored glass, polished plate glass, figured glass, meshed plate glass, wired plate glass, ultraviolet absorption plate glass, infrared reflection plate glass, infrared absorption plate glass and green glass.

The organic glass here used is one generally called resin glass and is not particularly limited, and examples thereof include organic glass formed from, for example, a polycarbonate plate, a polymethyl methacrylate plate or a polyester plate.

The respective materials forming such paired glass members may be the same as or different from each other. For example, one thereof may be inorganic glass and the other thereof may be organic glass, and preferably both the paired glass members are inorganic glass or organic glass.

The respective thicknesses of the glass members are not particularly limited, and are each preferably 0.5 mm or more and 5 mm or less, more preferably 0.7 mm or more and 3 mm or less.

The method for producing the laminated glass is not particularly limited. For example, the interlayer film is sandwiched between the two glass members, and these members are allowed to pass through a pressing roll or are placed in a rubber bag and evacuated under reduced pressure, to thereby allow air remaining between the two glass members and the interlayer film to be degassed. Thereafter, the glass members are preliminarily bonded with the interlayer film at about 70 to 110° C., to obtain a laminate. Next, the laminate is placed in an autoclave or pressed, and then is compression bonded at about 120 to 150° C. and at a pressure of 1 to 1.5 MPa. Thus, the laminated glass can be obtained. In production of the laminated glass, the laminated glass may also be produced with a plurality of resin layers being laminated for integration to thereby form the interlayer film.

(Laminated Glass According to Another Embodiment)

A laminated glass according to another embodiment of the present invention comprises paired glass members and an interlayer film placed between the paired glass members, in which the interlayer film comprises one or two or more resin layers, the interlayer film for laminated glass comprises a first resin layer comprising a resin and a light diffusion particle, and at least any of the paired glass members is colored by a colorant.

The laminated glass which has such a configuration allows an image to be displayed due to light-scattering by the light diffusion particle in the first resin layer, and the image is displayed at a high contrast. Although the principle is not clear, it is presumed that, while such light-scattering by the light diffusion particle in the first resin layer, when serves as multiple-scattering, partially leads to stray light and causes a reduction in contrast, such stray light occurring by multiple-scattering is efficiently absolved by a colorant to thereby enable an image to be displayed at a high contrast.

The total light transmittance (TvD) according to JIS R3106 (2019) of the laminated glass according to another embodiment of the present invention is preferably less than 70%, more preferably 50% or less, further preferably 45% or less, still further preferably 38% or less, is not particularly limited, and is, for example, 10% or more, preferably 20% or more, more preferably 28% or more, as in the above laminated glass.

The configuration of the interlayer film in the laminated glass according to another embodiment of the present invention is as described above, and thus the detail thereof is omitted. Herein, any of one or two or more resin layers in the interlayer film may comprise a colorant as described above in detail, but all the resin layers preferably comprise substantially no colorant.

In the laminated glass according to another embodiment of the present invention, such a glass member by itself, which constitutes the laminated glass, may contain a colorant. For example, in a case where such a glass member contains a colorant, a known configuration may be adopted and, in the case of inorganic glass, a known colorant such as a metal ion may be compounded with the inorganic glass. In the case of organic glass, for example, the pigment and/or the dye, described above, may be compounded with the organic glass. In a case where such a glass member by itself contains a colorant, for example, at least one glass member of the glass members may contain a colorant.

Accordingly, for example, the glass member 21 may contain a colorant in laminated glass 25, 26, 27, 28 and 29 illustrated in FIG. 1 to 5. In this case, light from a light source apparatus is preferably incident through a surface at the glass member 22 (namely, a glass member different from the glass member 21 containing a colorant) side in each laminated glass 25, 26, 27, 28 and 29, and it is more preferable that it is rear-projection one and the light is observed from a surface at the glass member 21 side.

A colored layer comprising a colorant may be formed on a surface of any glass member of the paired glass members in the laminated glass according to another embodiment of the present invention.

Figure 6:
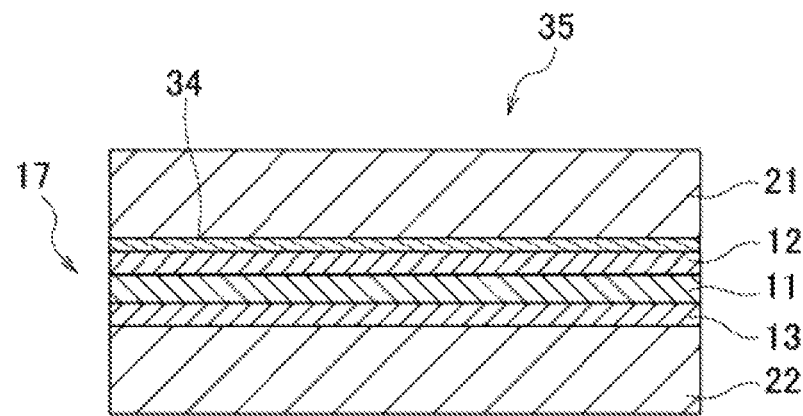
FIG. 6 A schematic cross-sectional view illustrating one embodiment of the laminated glass of the present invention.
Figure 7:
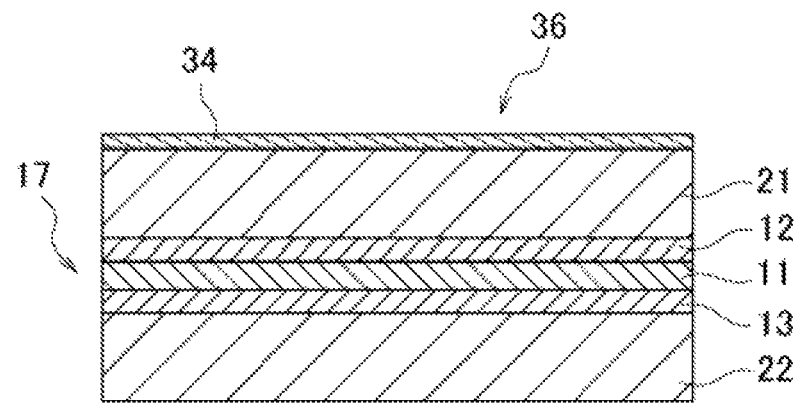
FIG. 7 A schematic cross-sectional view illustrating one embodiment of the laminated glass of the present invention.

Accordingly, for example, a colored layer 34 may be comprised on any surface of the glass member 21 as in laminated glass 35 and laminated glass 36 illustrated in FIGS. 6 and 7. The colored layer 34 may be provided on a surface (inside surface) of the glass member 21, the surface being at the interlayer film 17 side, as illustrated in FIG. 6, or may be provided on a surface (outside surface) of the glass member 21, the surface being opposite to the interlayer film 17 side, as illustrated in FIG. 7.

The colored layer 34 is a coating film formed on a surface of such any glass member, and may be any one as long as it comprises a colorant, and the coating film may comprise, if necessary, a binder component such as a thermosetting resin or a thermoplastic resin, and may further appropriately comprise additive(s).

Each of the laminated glass 35 and laminated glass 36 preferably allows light from a light source apparatus to be incident through a surface at the glass member 22 (namely, glass member different from the glass member 21 comprising a colorant) side, and it is more preferable that it is rear-projection one and the light is observed from a surface at the glass member 21 side.

The interlayer film 17 having the first to third resin layers 11, 12 and 13, as illustrated in FIGS. 6 and 7, is described above as an example of the interlayer film in the laminated glass comprising the colored layer. The interlayer film is herein not limited to such a configuration, may be any of the interlayer film 10 comprising a single resin layer, the interlayer film 17 having the first and second resin layers 11 and 12, and the interlayer film 18 having the first to fourth resin layers 11, 12, 13 and 14, as illustrated in FIGS. 1, 2 and 4, and may be an interlayer film having any configuration as long as there does not depart from the effects of the present invention. Herein, the interlayer film is not required to comprise a resin layer comprising a colorant, in any configuration.

One of the paired glass members may be colored by a colorant, and other thereof may be colored by a colorant, but is preferably not colored by a colorant.

The interlayer film for use in the laminated glass according to another embodiment of the present invention preferably has at least two resin layers (first and second resin layers). The interlayer film has at least two resin layers, and thus allows image display at a higher contrast to be easily realized, as described above, when used in an image display screen. The interlayer film 17 having the first to third resin layers 11, 12 and 13 as illustrated in FIGS. 3, 6 and 7 is preferable. An interlayer film having such a configuration can allow adhesiveness of the interlayer film to the glass members 21 and 22 to be improved without any excessive increase in thickness, even if a large amount of the light diffusion particle is comprised in the first resin layer 11.

The laminated glass according to another embodiment of the present invention may be produced by first, producing a glass member colored by a colorant, and thereafter allowing two of such glass members to bond each other with the interlayer film, according to the above method. Such a glass member colored by a colorant may be produced by compounding the colorant in such a glass member or by forming a colored layer on such a glass member according to a known method, as described above.

In the laminated glass according to another embodiment of the present invention, the colored layer is not required to be provided in the entire region of the laminated glass and may be provided on only a partial region. Also, in a case where a colorant is contained in such a glass member by itself constituting the laminated glass to color such a glass member, only a partial region of such a glass member may be colored.

In a case where the first resin layer is here provided on only a partial region of the interlayer film (namely, laminated glass), as described above, a region where the colored layer is provided or a region colored by a colorant and a region where the first resin layer is provided may be overlapped.

[Application of Interlayer Film for Laminated Glass]

In one embodiment of the present invention, the interlayer film for laminated glass (namely, laminated glass) is used in an image display screen. Specifically, one surface of the laminated glass may be irradiated with light from a light source apparatus constituting a projector or the like, and the light for irradiation may be scattered on the interlayer film for laminated glass and displayed in the form of an image on the laminated glass.

The image display screen may be a rear-projection or front projection image display screen, and is preferably a rear-projection one. Use in the form of rear-projection allows image display at a high contrast to be easily realized.

A rear-projection image display screen is a screen for which allows one surface of the laminated glass to be irradiated with light from a light source apparatus and allows an image to be observed from other surface of the laminated glass. A front projection image display screen is a screen which allows one surface of the laminated glass to be irradiated with light from a light source apparatus and allows an image to be observed from such one surface of the laminated glass (namely, a surface irradiated with light from a light source apparatus).

The present invention also provides an image display system where the laminated glass is used as an image display screen, as described above. The image display system comprises the laminated glass and a light source apparatus for irradiation of one surface of the laminated glass with light, and displays an image on the laminated glass by light from the light source apparatus. The image display system may be either rear-projection one or front projection one, as described above, and is preferably rear-projection one.

Figure 8:
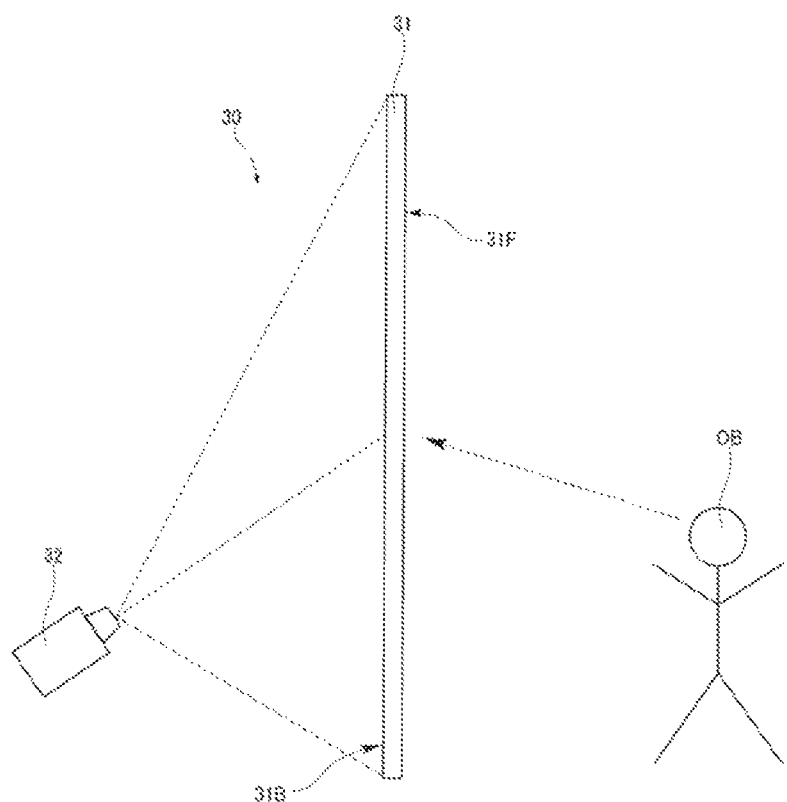
FIG. 8 A schematic view illustrating an image display system according to one embodiment of the present invention.

Hereinafter, one embodiment of the rear-projection image display system is described in detail with reference to FIG. 8.

An image display system 30 according to one embodiment of the present invention comprises laminated glass 31 and a light source apparatus 32. The laminated glass 31 may have any structure of the laminated glass described above. The image display system 30 allows one surface (rear surface 31B) of the laminated glass 31 to be irradiated with light by the light source 32 and allows an image to be displayed by the light for irradiation, from other surface (front surface 31F) of the laminated glass 31. The image at the front surface 31F side is viewed by an observer OB located in front of the laminated glass 31. The image displayed from the front surface 31F may be a screen image such as a moving image, or may be, for example, a still image, a message including a character, an icon and/or a trademark, or a logo, and is not particularly limited.

The light source apparatus 32 used can be a light source conventionally used in a rear-projection image display system, and is, for example, a projector capable of producing various images such as a screen image. The projector used is preferably, for example, a screen image display system utilizing a digital mirror device, known as a so-called DLP (registered trademark) projector.

In a case where, for example, a fixed icon or a fixed message is displayed with no change of an image produced, no projector is needed to be used and a light source apparatus for irradiating the laminated glass 31 with certain light depending on the image may be used.

The light for irradiating the laminated glass 31 in the rear-projection system is light corresponding to an image mirror-reversed relative to an image displayed. The method of irradiation with the light corresponding to the image mirror-reversed is not particularly limited, and mirror-reversing may be made by adjustment of an image signal or by use of, for example, a reversing mirror.

The light emitted from the light source apparatus 32 in the image display system 30 may be used for direct irradiation of the laminated glass 31, or for irradiation of the laminated glass 31 via an optical member such as a reflecting mirror or a reversing mirror.

The interlayer film for laminated glass and the laminated glass of the present invention can be used in various fields, and are used in, for example, various types of window glass. More specifically, these can be used in window glass for conveyances such as automobiles, railway vehicles, airplanes and marine vessels, or window glass for buildings. The interlayer film for laminated glass or the laminated glass can be used in various types of window glass, to thereby allow various images such as a screen image, a message and a logo to be displayed in window glass. The interlayer film or the laminated glass can also be used in a display for various electric instruments such as household electric instruments. In particular, the interlayer film or the laminated glass is preferably used in window glass, and is more preferably used in window glass for automobiles. The window glass for automobiles is preferably side glass or rear glass, more preferably rear glass, because the total light transmittance is less than 70% in a preferable embodiment of the interlayer film. In a case where the first resin layer is provided on a partial region of the interlayer film for laminated glass, as described above, use in front glass is also preferable.

For example, in the case of use in window glass for buildings, a light source apparatus may be disposed in each of such buildings, an inside surface of the window glass may be irradiated with light from the light source apparatus, and thus various images may be displayed on an outside surface of the window glass. Similarly, in the case of use in window glass for conveyances, a light source apparatus may be disposed in each of such conveyances and thus various images may be displayed on an outside surface of the window glass.

An outside surface of window glass for buildings or conveyances may also be irradiated with light from a light source and thus an image may also be displayed on an inside surface of the window glass. Specifically, a light source apparatus may be disposed on, for example, a bonnet or a trunk of an automobile, side glass, rear glass and/or the like may be irradiated with light from outside, and thus an image may be displayed on an inside surface of such glass.

Window glass utilizing the interlayer film or the laminated glass of the present invention can also be used as window glass high in privacy protection performance, because a person or object is hardly viewed through the window glass although light penetrates through the window glass.

<Image Display System According to Another Aspect>

Another aspect of the present invention relates to, for example, an image display system utilizing glass for conveyances, for use in various vehicles such as automobiles, and provides the following image display system. An image display system in another aspect of the present invention can, for example, send various messages and display various images toward the vehicle exterior and/or the vehicle interior, by a simple configuration.

Hereinafter, an image display system according to another aspect is described in detail.

An image display system according to another aspect of the present invention comprises display glass, and a light source apparatus for irradiating one surface of the display glass with light, and displays an image on the display glass by light from the light source apparatus. The display glass is glass for conveyances, for use in window glass for various vehicles such as automobiles.

The display glass in the image display system may comprise a layer comprising a light diffusion particle. When the display glass is irradiated with light from the light source apparatus, light-scattering occurs due to the light diffusion particle and an image is displayed on the display glass.

The layer comprising the light diffusion particle may be provided on the entire region of the display glass, or may be provided on a partial region of the display glass.

The image display system may be a projection system where the display glass is used as an image display screen, and the display glass may be used as a rear-projection image display screen. The rear-projection image display screen is a screen which allows light from the light source apparatus to be incident on one surface of the display glass and allows an image to be observed from other surface of the display glass. The light from the light source apparatus is visible light corresponding to an image to be displayed. The light for irradiation from the light source apparatus may be monochromatic light, and is preferably light obtained by combining a plurality of colors. Such a plurality of colors in the light for irradiation from the light source apparatus can be combined to also allow for display of a full color image on the display glass.

It is preferable that one surface of the display glass, on which the light from the light source apparatus is to be incident, is a surface at a vehicle interior side, other surface thereof is a surface at a vehicle exterior side, and an image is displayed toward the vehicle exterior, or vice versa. In other words, an image may be displayed on a surface of the display glass, the surface being at a vehicle interior side, the image may be displayed toward the vehicle interior, and also the light from the light source apparatus may be allowed to be incident on a surface opposite thereto.

The display glass in the image display system may comprise the light diffusion particle and thus have an opaque white color, or may be one where a colorant described below is comprised to thereby appropriately add a color to an opaque white color.

The total light transmittance (TvD) of the display glass in the image display system is, for example, less than 70%. When the total light transmittance is less than 70%, light-scattering sufficiently occurs on the display glass and image display at a high contrast can be made. Moreover, the internal portion of a vehicle is hardly viewed via the display glass, and privacy protection performance can also be enhanced. The total light transmittance (TvD) of the display glass in the image display system is preferably 50% or less, from these viewpoints. The total light transmittance (TvD) is not particularly limited, and is, for example, 10% or more, preferably 20% or more. When the total light transmittance (TvD) is equal to or more than the lower limit value, image display toward the vehicle exterior is facilitated at a high contrast. In the present invention, the total light transmittance (TvD) is the value measured according to JIS R3106 (2019).

The display glass in the image display system is low in total light transmittance, as described above, and thus is provided at a position where no high transparency is needed.

When a region (also referred to as "light diffusion region") where the layer comprising the light diffusion particle is provided is partially provided as described above, the total light transmittance (TvD) of the display glass in the image display system is the total light transmittance (TvD) of the light diffusion region. In such a case, the total light transmittance (TvD) of a region (also referred to as "transparent region") where the layer comprising the light diffusion particle (namely, the first resin layer described below) is not provided is preferably 70% or more, more preferably 75% or more, further preferably 80% or more, and practically 99% or less, preferably 97% or less. Thus, a region where the total light transmittance (TvD) is high is provided, and thus the display glass can be prevented from hindering driving even if being, for example, front glass. The light diffusion region may differ in total light transmittance with respect to each position due to placement of a region where the thickness of the first resin layer is gradually changed as described below, and in such a case, the total light transmittance of a partial region may be in the range, and that of a region exhibiting the lowest total light transmittance may be preferably in the above numerical value range.

The light source apparatus in the image display system, here used, can be a light source conventionally used in a rear-projection image display system, and is, for example, a projector capable of producing various images such as a screen image. The projector used is preferably, for example, a screen image display system using a digital mirror device, known as a so-called DLP (registered trademark) projector.

The image display system may comprise a touch sensor. The touch sensor is a sensor which senses a touch operation of, for example, a finger with the display glass. The touch operation sensed by the touch sensor is not necessarily required to be touch of, for example, a finger with the display glass. In other words, the touch sensor may be one which senses approaching of, for example, a finger to a predetermined position of the display glass. The touch sensor is not particularly limited in terms of the type thereof, and may be, for example, an IR type sensor, a gesture sensing type sensor or an ultrasonic type sensor.

The image display system may comprise a controller which is configured from, for example, a known processor and which controls operations of an automobile and various instruments attached to the automobile, display on the display glass, and/or the like, based on the input to the touch sensor. The image display system may also comprise, for example, a memory unit which is configured from, for example, a memory and which memorizes information input to the touch sensor, and a transmitter which is configured from a wireless communication instrument such as an antenna and which transmits information input to the touch sensor, to the vehicle exterior.

Hereinafter, application examples of the image display system are described in more detail with reference to embodiments of the image display system.

First Embodiment

Figure 9:
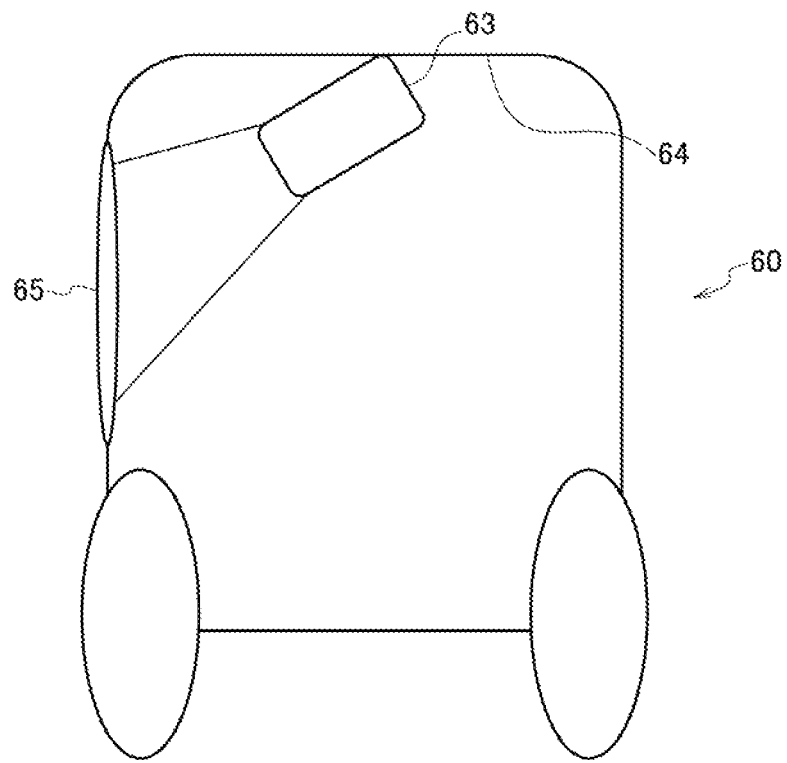
FIG. 9 A schematic view illustrating an image display system according to a first embodiment in another aspect.
Figure 10:
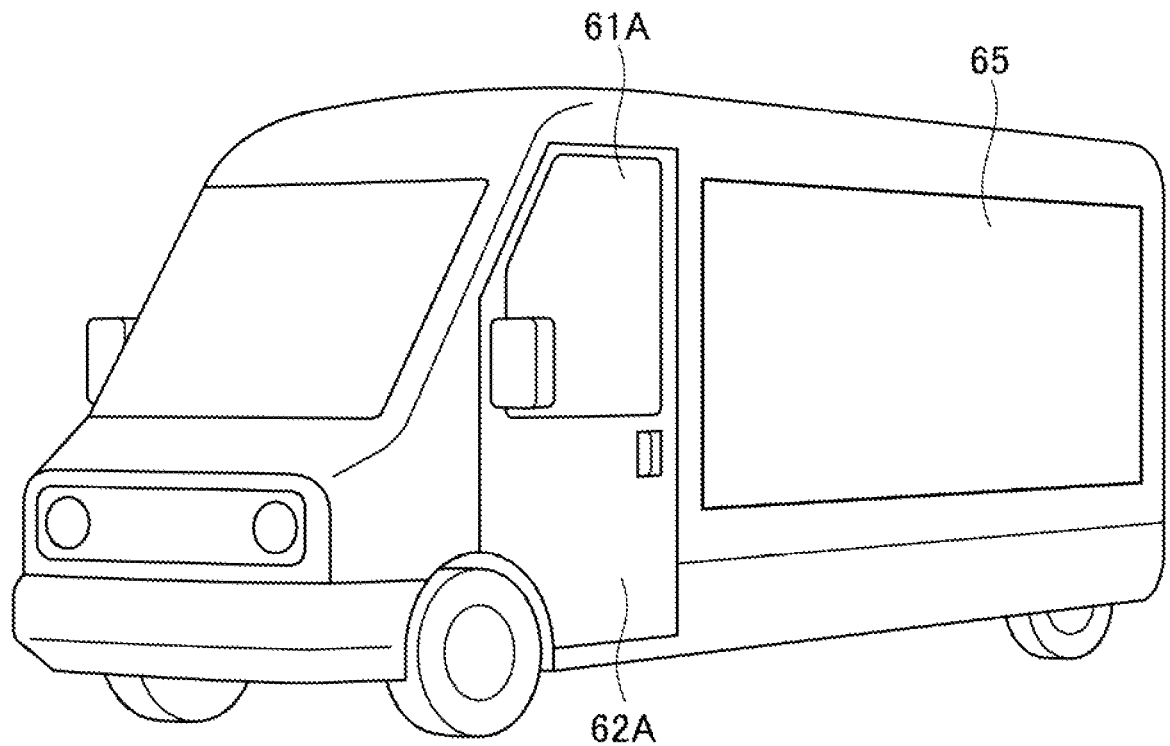
FIG. 10 A perspective view illustrating the appearance of an automobile to which an image display system according to a first embodiment in another aspect is applied.

FIGS. 9 and 10 each illustrate an image display system according to a first embodiment (hereinafter, sometimes simply referred to as "image display system 60"). In the first embodiment, the image display system 60 is applied to an automobile, and display glass is provided on a side surface portion of the automobile. The automobile in the present embodiment is a van type automobile. The internal portion of the automobile includes, for example, a front portion where a front seat is provided, and a back portion, and the back portion generally serves as a cargo space portion where a baggage is to be accommodated.

A front side door 62A provided with front side glass 61A is provided on a side surface portion of the automobile, and display glass 65 is placed backward thereof. A back side door may be provided backward of the front side door 62A and the display glass 65 may be provided on the back side door, but the back side door is not necessarily required to be provided as illustrated in FIG. 10. The display glass 65 is irradiated with light from a light source apparatus 63, and thus an image such as a screen image is displayed. The image is displayed toward the vehicle exterior, and, for example, advertising is displayed.

In the present embodiment, as illustrated in FIG. 10, the automobile is a van type automobile, and therefore the display glass can be sufficiently increased in area and thus is also suitable for advertising display. The automobile is not limited to a van type automobile, and may be any type of automobile.

The light source apparatus 63 in the present embodiment may be placed at a position where the display glass 65 can be irradiated with light, and is provided on a ceiling surface 64 of the automobile in the present embodiment, more specifically, is provided on a ceiling surface of a back portion (for example, cargo space portion) in the automobile.

Second Embodiment

Figure 11:
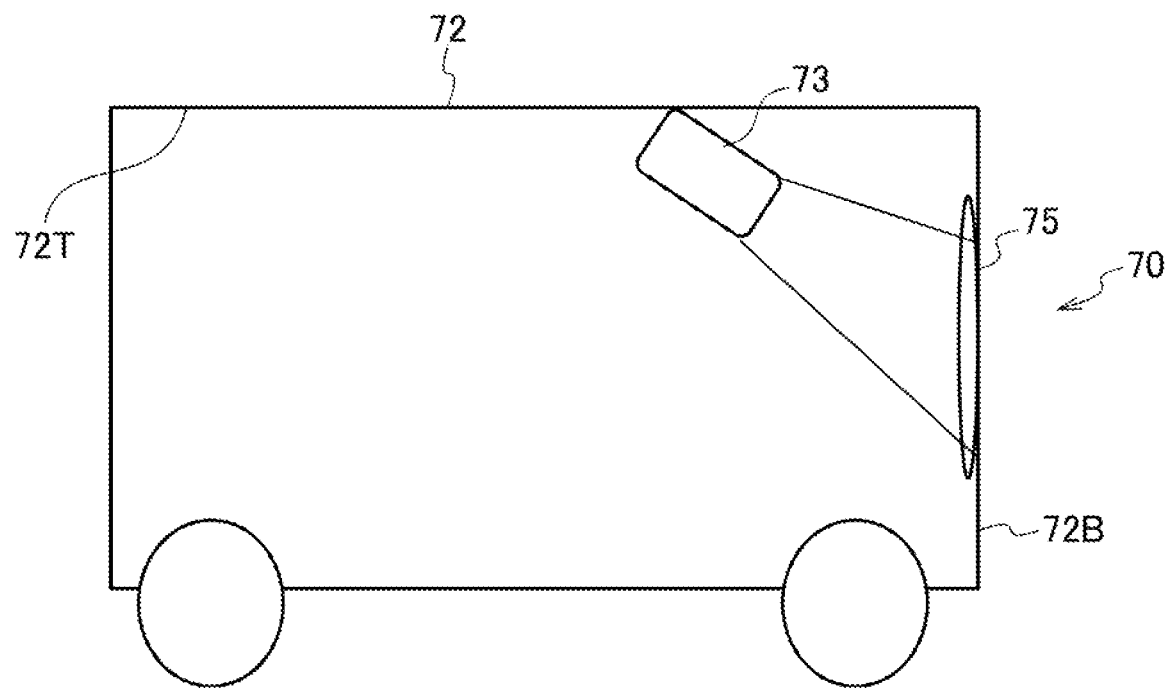
FIG. 11 A schematic view illustrating an image display system according to a second embodiment in another aspect, and illustrating a cargo space portion of an automobile.
Figure 12:
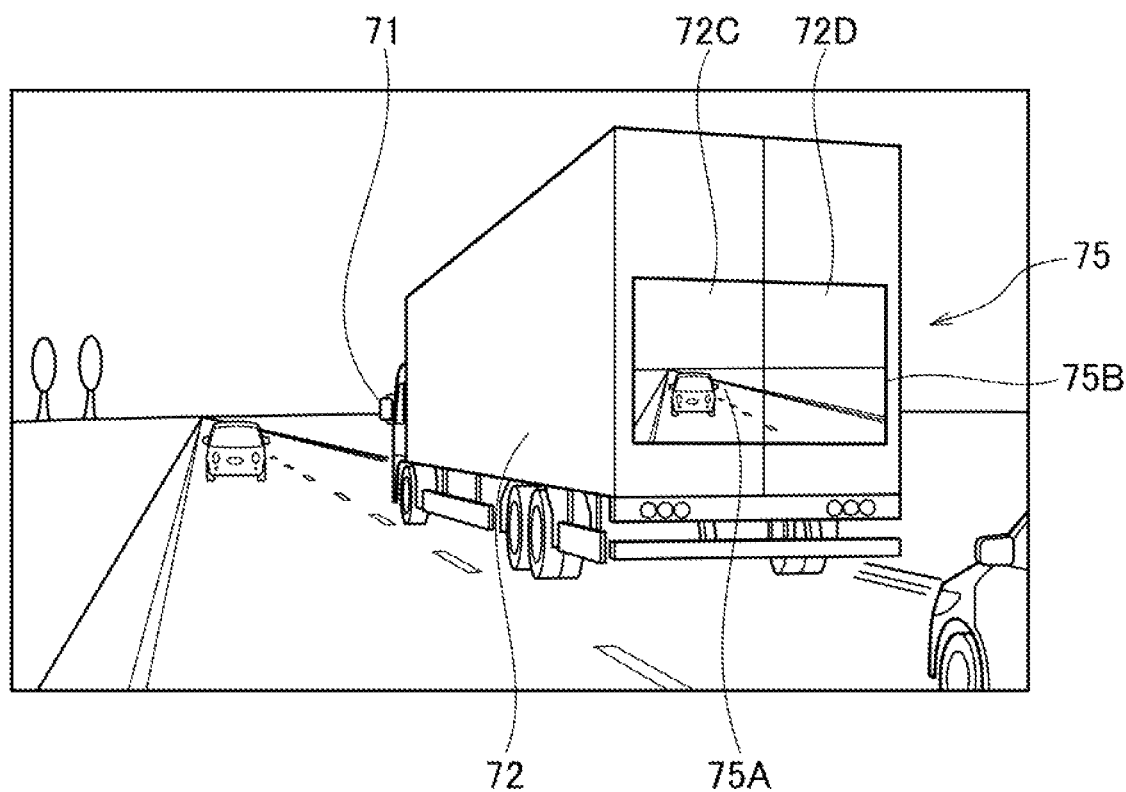
FIG. 12 A perspective view illustrating the appearance of an automobile to which an image display system according to a second embodiment in another aspect is applied.

FIGS. 11 and 12 each illustrate an image display system according to a second embodiment (hereinafter, sometimes simply referred to as "image display system 70"). In the second embodiment, the image display system 70 is applied to a truck and display glass 75 is provided on a rear surface of the truck.

Specifically, the truck comprises a cab 71 comprising, for example, a driver's seat, and a cargo space 72 located behind the cab 71. The cargo space 72 is a box comprising a roof (top surface 72T). A rear surface 72B of the cargo space 72 is at least partially constituted by the display glass 75. The rear surface 72B is constituted with, for example, as illustrated in FIG. 12, double two doors 72C and 72D. The display glass 75 is composed of two sheets of glass 75A and 75B constituting respective portions of the doors 72C and 72D, and is constituted as one screen with the two sheets of glass 75A and 75B when the doors 72C and 72 are closed, but is not limited to such an embodiment, and, for example, the display glass 75 may be provided only by one of the doors. A door of the rear surface is not required to be composed of two doors, and may be composed of one door.

A light source apparatus 73 is provided in the cargo space 72, and may be provided on, for example, the top surface 72T of the cargo space 72. The display glass 75 is irradiated with light from the light source apparatus 73, and thus an image such as a screen image is displayed. The image is displayed toward the vehicle exterior.

In the present embodiment, a photographing apparatus not illustrated is provided in a truck, and the area in front of the truck is photographed by the photographing apparatus. An image taken by the photographing apparatus is sent to the light source apparatus 73, and the light source apparatus 73 may perform irradiation with light depending on the image taken. The image taken may be displayed on the display glass 75. While a general truck is high in vehicle height and may block the visibility from, for example, an automobile backward, an image of a front visibility can be displayed on the display glass 75 as described above, to thereby eliminate poor front visibility due to the truck.

Herein, the image displayed on the display glass 75 is not limited to the image of a front visibility, and may be advertising. In the present embodiment, as illustrated in FIG. 12, the automobile is a truck, and therefore the display glass 75 can be sufficiently increased in area and thus is also suitable for advertising display.

While the present embodiment indicates a mode where the display glass 75 is provided on the rear surface 72B of the cargo space 72, the display glass may also be provided on a side surface of the cargo space 72. An image displayed on the display glass 75 on the side surface may be, for example, advertising.

Third Embodiment

Figure 13:
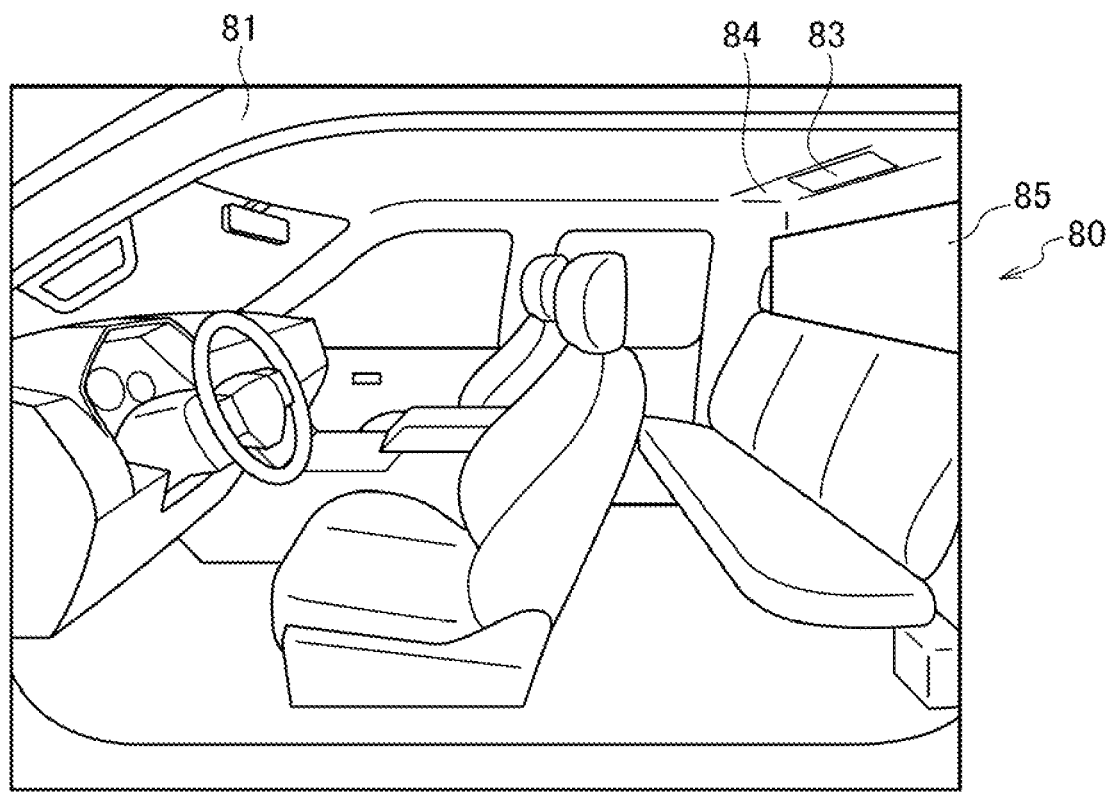
FIG. 13 A schematic view illustrating an image display system according to a third embodiment in another aspect, and illustrating the internal portion of a cab of a pickup truck.
Figure 14:
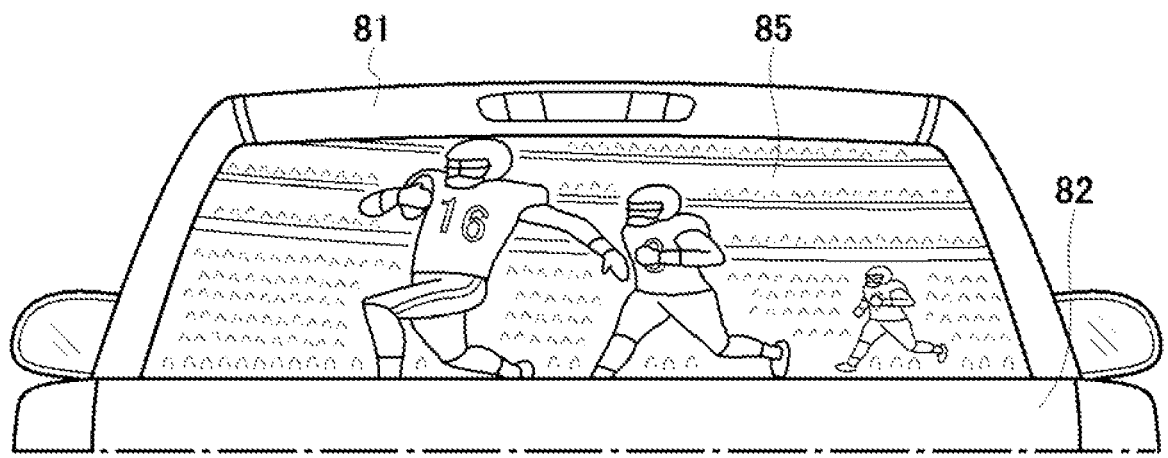
FIG. 14 A rear view illustrating the appearance of an automobile to which an image display system according to a third embodiment in another aspect is applied.

FIGS. 13 and 14 each illustrate an image display system according to a third embodiment (hereinafter, sometimes simply referred to as "image display system 80"). In the third embodiment, the image display system 80 is applied to a pickup truck, and display glass is provided on a rear surface of the pickup truck.

The pickup truck comprises a cab 81 and a cargo space 82 located behind the cab 81, and the cargo space 82 comprises no roof. In the present embodiment, rear glass 85 of the cab 81 is used in the display glass. A light source apparatus 83 is provided in the vehicle interior (namely, in the cab 81), and may be provided on a ceiling 84 of the cab 81. More specifically, the light source apparatus may be provided in the vicinity of a rear surface of the cab 81 or above a back row seat in the cab 81.

The display glass (rear glass 85) is irradiated with light from the light source apparatus 83, and thus an image such as a screen image is displayed. The image is displayed toward the vehicle exterior, various screen images are displayed, and an automobile that is high in entertainingness can be provided. For example, advertising may be displayed on the rear glass 85.

Fourth Embodiment

Figure 15:
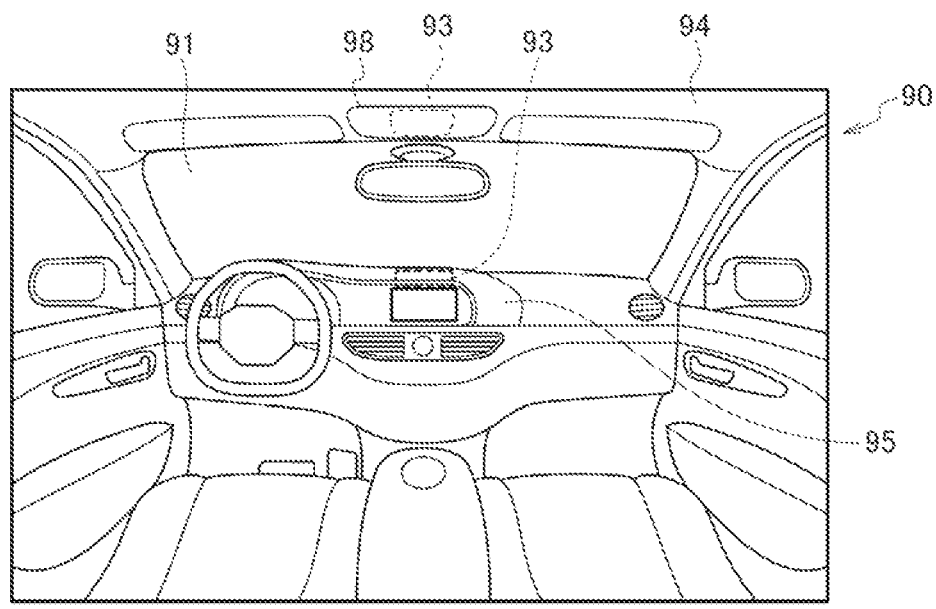
FIG. 15 A schematic view illustrating an image display system according to a fourth embodiment in another aspect.
Figure 16:
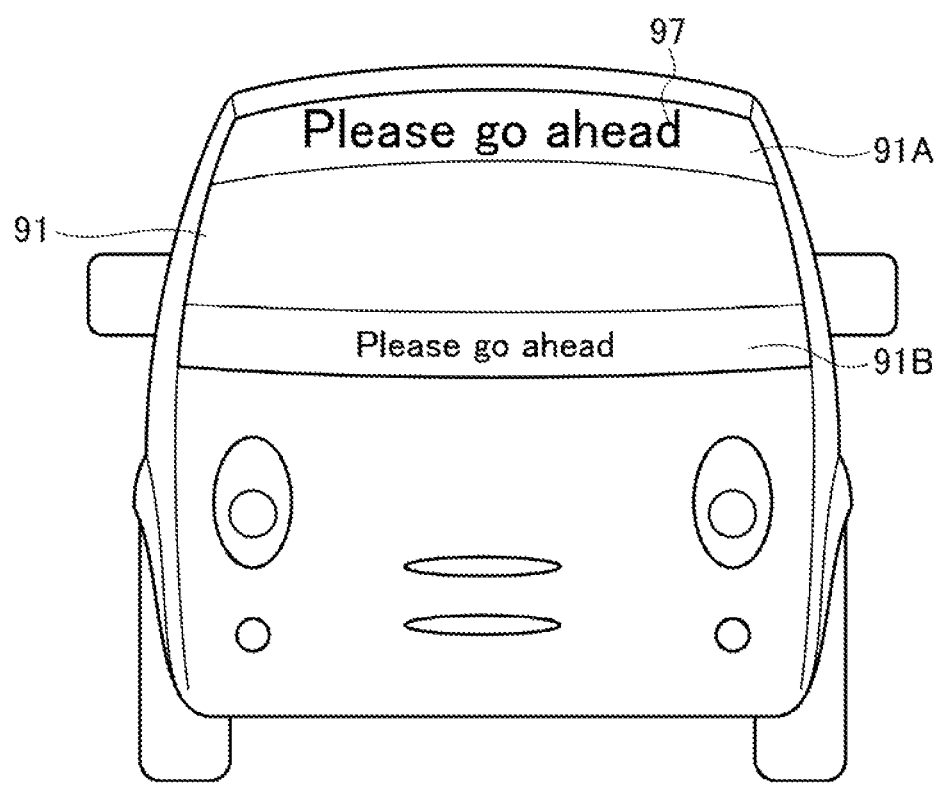
FIG. 16 A front view illustrating the appearance of an automobile to which an image display system according to a fourth embodiment in another aspect is applied.

FIGS. 15 and 16 each illustrate an image display system according to a fourth embodiment (hereinafter, sometimes simply referred to as "image display system 90"). In the fourth embodiment, the image display system 90 is applied to an automobile, and front glass 91 is used in display glass of the image display system 90.

The light source 93 is placed in the vehicle interior of the automobile, and irradiates the front glass 91 constituting the display glass, with light. The light source 93 is provided, for example, on a ceiling 94 of the automobile, in a dashboard 95, or both thereof, as illustrated in FIG. 15. The light source 93, when provided on the ceiling 94, may be provided on a lamp portion such as a map lamp portion. In other words, the light source may be provided in a lamp cover 98 which covers a lamp for illumination of the interior.

The light source 93 may be any one as long as it can irradiate an image display region described below, with light, and, for example, the light source 93 provided on the ceiling 94 may irradiate an upper end portion 91A of the front glass 91, with light, and the light source 93 provided in the dashboard 95 may irradiate a lower end portion 91B of the front glass 91, with light.

In the present embodiment, the front glass 91 displays an image by light incident from the light source 93. The region where the image is displayed (image display region) may be a region not blocking the visibility of a driver, and is specifically the upper end portion 91A of the front glass 91, the lower end portion 91B of the front glass 91, or both thereof, indicated by solid lines in FIG. 16. The upper end portion 91A and the lower end portion 91B may be each a region having a height of, for example, 5 to 35% relative to the entire height of the front glass 91.

In the front glass 91 (display glass), the image display region may serve as a light diffusion region, and the central portion between the upper end portion 91A and the lower end portion 91B may serve as at least the above transparent region. Such a configuration enables the light diffusion region provided on the front glass 91 to be prevented from disturbing driving.

Examples of the image displayed on the front glass 91 include a message 97 to the vehicle exterior. Examples of the message 97 to the vehicle exterior include messages to, for example, automobiles, pedestrians and light vehicles located therearound. Such light vehicles include bicycles and motorcycles. Specifically, a message which indicates the driving state and/or the next movement of the automobile to other automobiles, pedestrians, light vehicles and the like, for example, "Please Go Ahead" may be displayed as illustrated in FIG. 16. The message 37 is not required to be configured from a character, and may be configured from a design or may be configured from a character and a design.

The message 97 may be displayed on the display glass by, for example, calling at least one of the message candidates by a switching operation with a passenger such as a driver, one or more message candidates previously memorized in a memory provided in the automobile.

The message may also be displayed on light emission glass based on sound input from a microphone provided in the automobile. The sound input may be here displayed on the light emission glass, as it is, or one or more messages selected from a plurality of message candidates may be displayed on the light emission glass based on the sound input.

Fifth Embodiment

Figure 17:
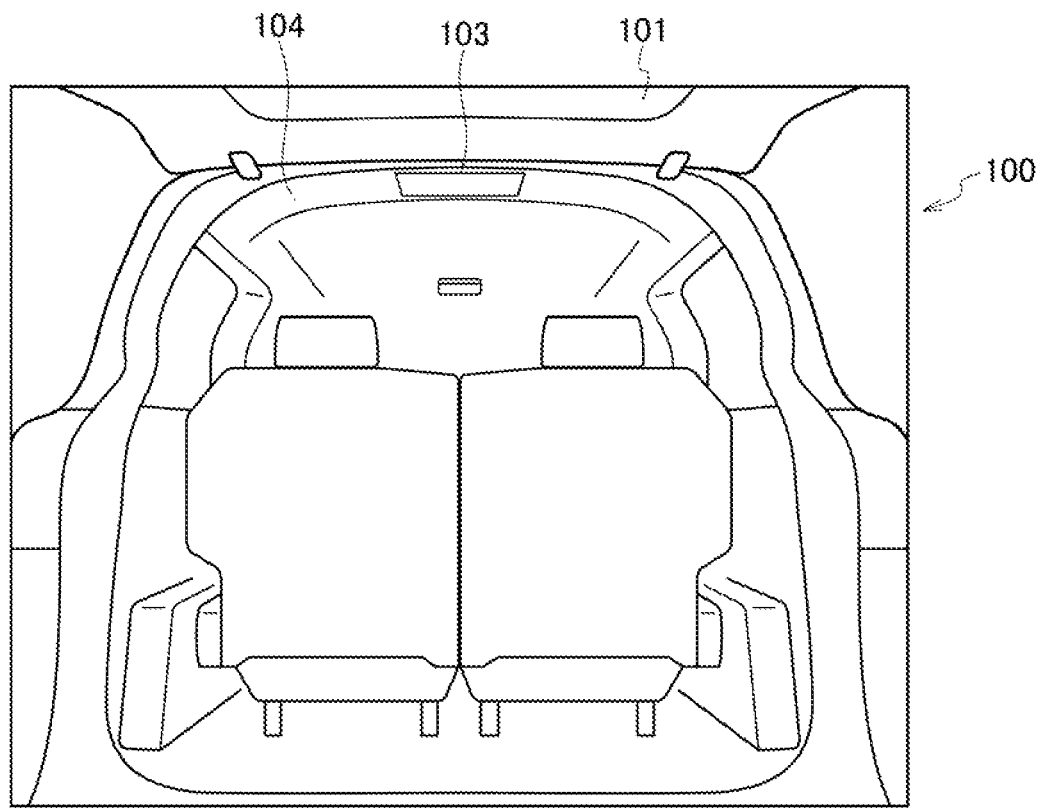
FIG. 17 A schematic view illustrating an image display system according to a fifth embodiment in another aspect.
Figure 18:
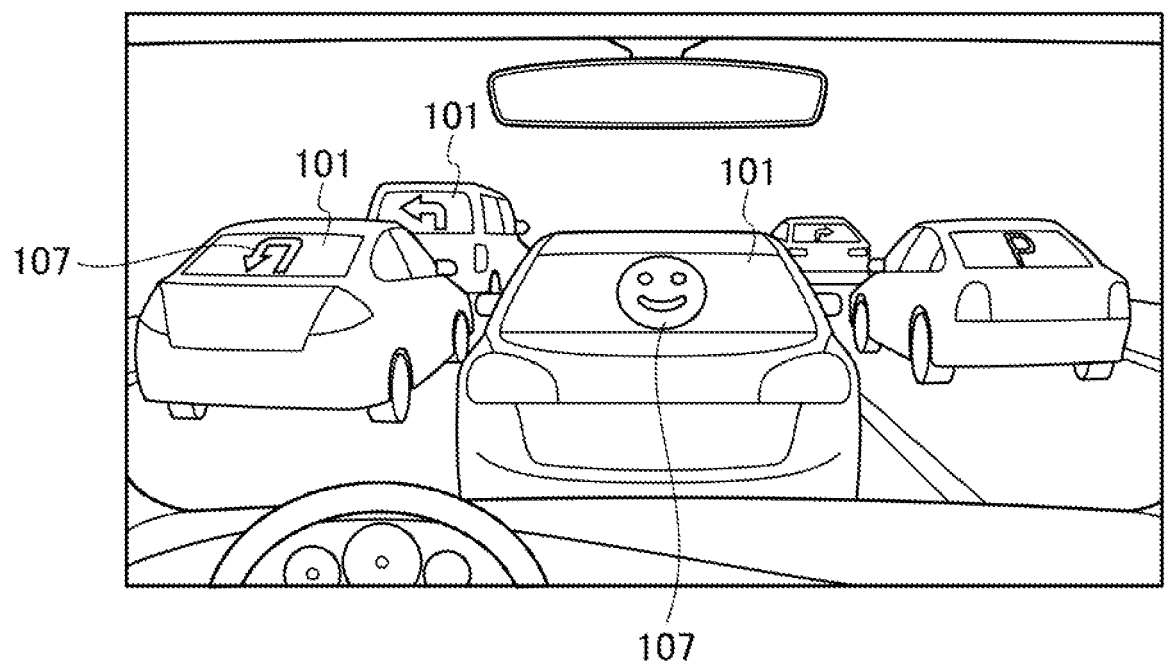
FIG. 18 A schematic view illustrating the appearance of an automobile to which an image display system according to a fifth embodiment in another aspect is applied, and illustrating a rear surface of an automobile observed from the vehicle interior of another automobile.

FIGS. 17 and 18 each illustrate an image display system according to a fifth embodiment (hereinafter, sometimes simply referred to as "image display system 100"). In the fifth embodiment, the image display system 100 is applied to an automobile, and rear glass 101 is used in display glass of the image display system 100.

A light source 103 is placed on the vehicle interior of an automobile, and irradiates the rear glass 101 constituting the display glass, with light. The light source 103 is provided on, for example, a ceiling 104 of an automobile, as illustrated in FIG. 17, and is specifically provided in the vicinity of the rear glass 101. In the present embodiment, the rear glass 101, on which light is incident from the light source 103, thus allows an image corresponding to the light to be displayed on the rear glass 101.

Examples of the image displayed on the rear glass 101 include a message 107 to the vehicle exterior. Examples of the message 107 to the vehicle exterior include messages to, for example, automobiles, pedestrians and light vehicles located therearound. Specifically, a message which indicates, for example, the driving state and/or the next movement of the automobile, and/or emergency information, to other automobiles, pedestrians, light vehicles and the like may be displayed.

The message 107 may be configured from a design or the like, as illustrated in FIG. 18, or may be configured from a character or may be configured from a combination of a character and a design, as indicated also in the fourth embodiment. The design here displayed may be a design meaning a left turn, U-turn or stopping, or may be, for example, an emoticon, as illustrated in FIG. 18. The message 107 may be displayed based on, for example, a switching operation and/or sound input, as in the fourth embodiment.

Sixth Embodiment

FIGS. 19 to 22 each illustrate an image display system according to a sixth embodiment (hereinafter, sometimes simply referred to as "image display system 110"). In the sixth embodiment, the image display system 110 is applied to an automobile, and side glass 111 is used in display glass of the image display system 110. The side glass 111 is generally provided on an upper portion of a side door 112.

Figure 20:
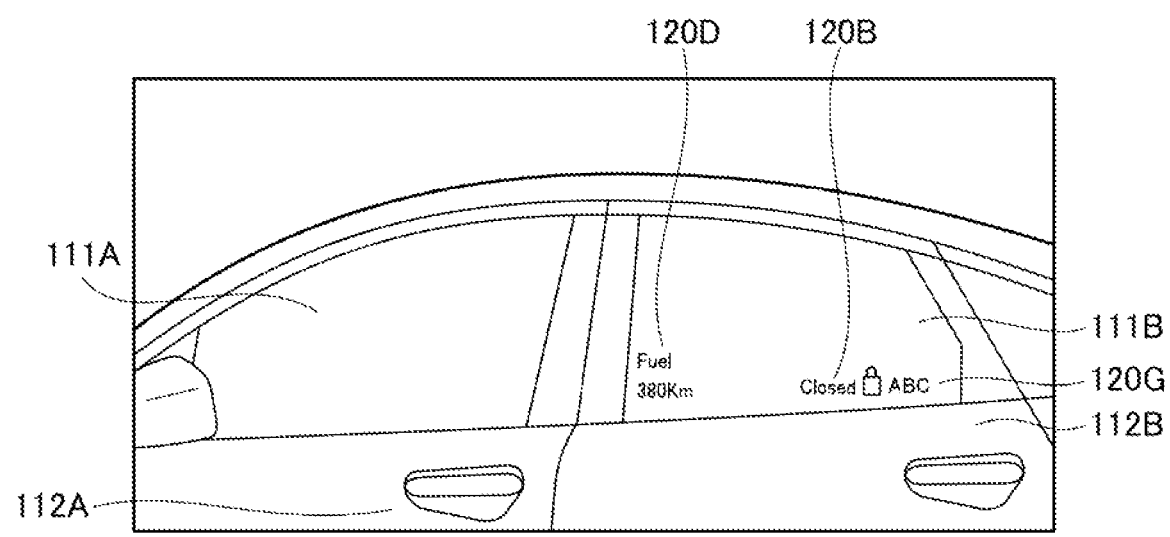
FIG. 20 A side view illustrating the appearance of an automobile to which an image display system according to a sixth embodiment in another aspect is applied.

The side glass 111 is typically, for example, front side glass 111A provided in a front side door 112A or rear side glass 111B provided in a rear side door 112B. The rear side glass 111B in the side glass 111 may serve as display glass, as illustrated in FIG. 20. The display glass in the image display system, while is low in total light transmittance as described above, is provided in the rear side glass 111B not to thereby block a driver's visibility.

Figure 19:
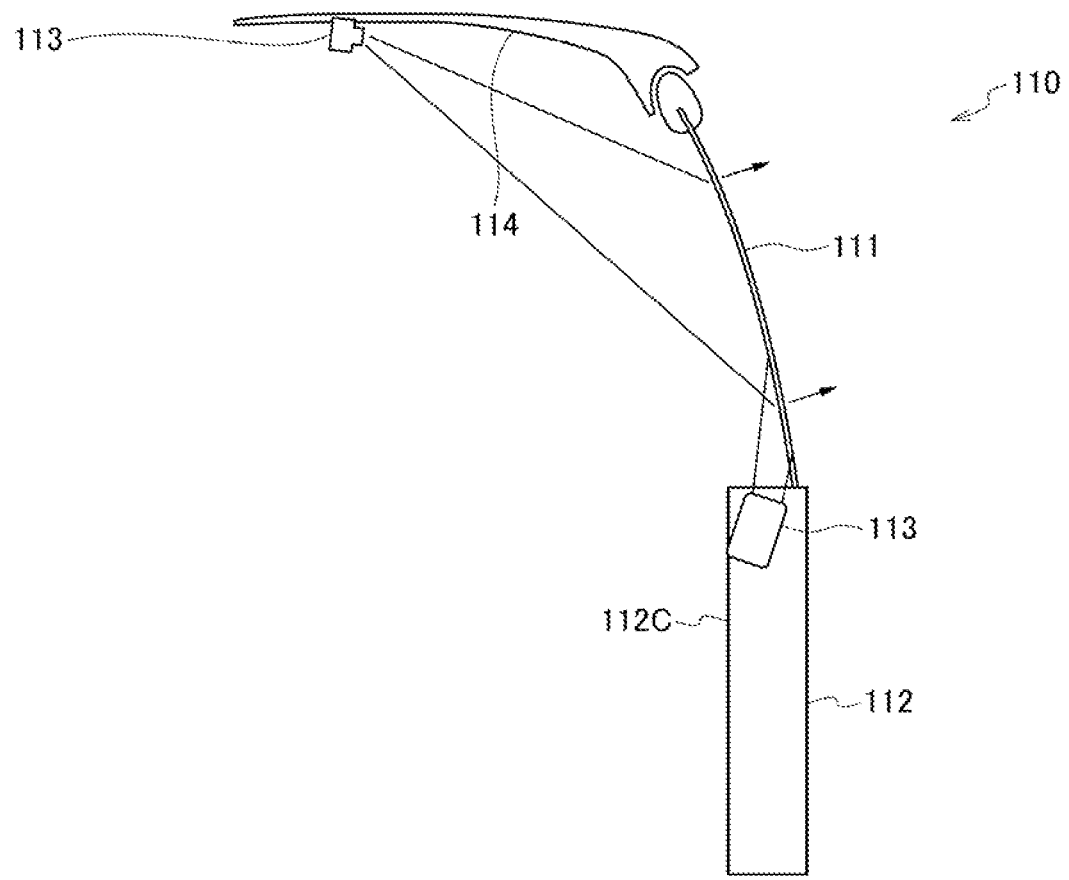
FIG. 19 A schematic view illustrating an image display system according to a sixth embodiment in another aspect.

The light source 113 is placed in the vehicle interior of the automobile, and irradiates the side glass 111 constituting the display glass, with light. The light source 113 is provided on, for example, a side door 112 or a ceiling 114 of the automobile, as illustrated in FIG. 19. While FIG. 19 illustrates a mode where the light source 113 is provided on both the side door 112 and the ceiling 114, the light source is usually provided on any one of the side door 112 and the ceiling 114. The light source 113, when provided on the ceiling 114, may be provided on, for example, a lamp portion. In other words, the light source may be provided inside a lamp cover which covers a lamp for illumination of the interior. The lamp portion may be a lamp provided above a portion (for example, back row seat) behind a front seat, called roof lamp, from the viewpoint that the rear side glass 111B is easily irradiated with light.

The light source 113, when provided on the side door 112, may be provided in, for example, a side door trim 112C, and specifically may be provided on the rear side door 112B in order to irradiate the rear side glass 111B with light.

Figure 21:
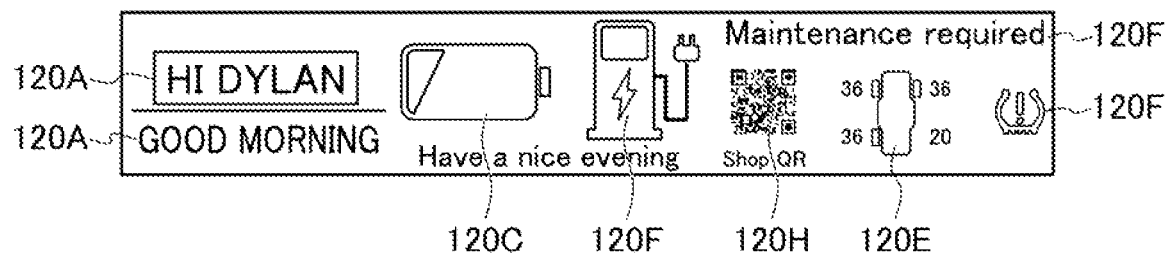
FIG. 21 A schematic view illustrating specific examples of a message and an icon for use in an image display system according to a sixth embodiment in another aspect.
Figure 22:
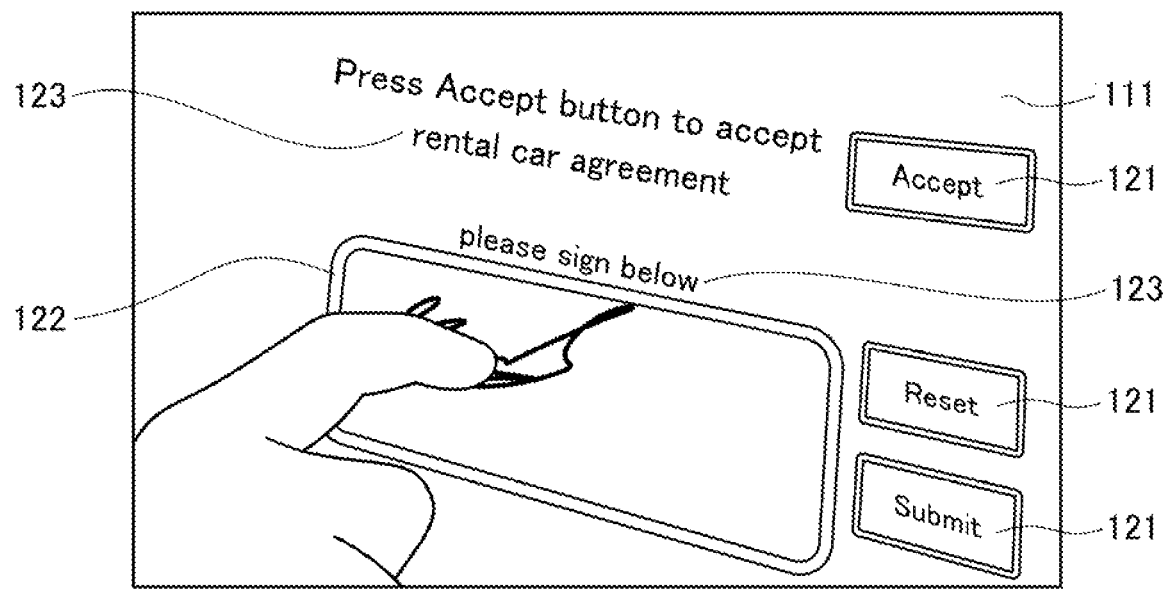
FIG. 22 A view illustrating the appearance of display glass to which an image display system according to a sixth embodiment in another aspect is applied.

An image displayed on a side door 12 is an image to be displayed toward the vehicle exterior, as illustrated in FIG. 20, and is configured from, for example, one or more characters, one or more designs, or a combination thereof, as illustrated in FIGS. 20 to 22. The characters or designs may be each, for example, a symbol, an icon, a diagram or a graphic.

Examples of the image displayed on the side door 112 more specifically include a message, an input operation key and a character input position guide.

The message in the present embodiment is a message mainly toward a passenger such as a driver before riding in the automobile or after exiting from the automobile. Examples of the message include a text, a design, and a combination of a text and a design. Specific examples include a greeting for a passenger, a message which indicates the state of the automobile, a warning message, and entertainment information. One or more of such messages may be displayed on each display glass.

Specific examples of the message include greetings 120A such as "Welcome Open", "Hi Dylan", "Good Morning" and "Have a nice evening", various messages indicating the state of the automobile, such as a message 120B indicating the opening and closing state of a door, a message 120C indicating the state of a battery, for example, the charging rate, a message 120D indicating the remaining amount of fuel, and a message 120E indicating the state of tire pressure, a warning message 120F indicating needs for maintenance, charging, and exchange of tire, a trademark 120G indicating, for example, the name of an automobile manufacturer, and code characters such as a QR code (registered trademark) 120H and a bar code (not illustrated), as illustrated in FIGS. 20 and 21. Such code characters may indicate entertainment information such as information of a nearby shop. Such entertainment information may also be indicated by any other than such code characters.

Examples of the input operation key include a key button 121, as illustrated in FIG. 22. The input operation key, although not illustrated, may be, for example, a numeric keypad or a keyboard. Examples of the character input position guide include a blank box 122 for indicating the position of a blank for input of a character such as a signature with finger movement, and the character input position guide may be, for example, an arrow or an underline, or may be indicated by a message with, for example, a character.

The operation key and the character input position guide may be used in combination with a touch sensor. In other words, a behavior of touching the operation key may be sensed by the touch sensor, and thus input information from the touch sensor may allow a behavior of the automobile to be controlled, the input information may be memorized in a memory unit in the automobile and/or the input information may be transmitted to the vehicle exterior. The input information may also allow display of the display glass to be changed, or allow behaviors of various instruments provided in the automobile to be controlled.

More specifically, the automobile may be unlocked by a password and/or a passcode input by the operation key. The automobile may be unlocked by entering a password and/or a signature in a blank whose position is indicated by the character input position guide. A touch operation to a specified operation key may be performed to thereby switch the image displayed on the display glass.

The touch sensor is not required to be used in combination with the operation key and the character input position guide, and image display may be initiated by, for example, performing a touch operation to side glass. Herein, image display on the side glass is not limited to be initiated by a touch operation, and may also be initiated by approximating an automobile key.

The operation key and the character input position guide may be displayed on the same side glass 111 (for example, rear side glass), together with a message 123, as illustrated in FIG. 22. Such a configuration can allow the message 123 to display an operation of the operation key, or information to be input to a blank indicated on the character input position guide, resulting in enhancement of usability.

For example, in a display mode in FIG. 22, not only a blank box 122, but also a message 123 indicating that a signature is to be given in such a blank in a case where the contractual coverage is acceptable is displayed, and thus a passenger may give a signature according to the message 123. The display mode illustrated in FIG. 22 may be applied to, for example, an automobile for use in a rental car or in car sharing.

Seventh Embodiment

Figure 23:
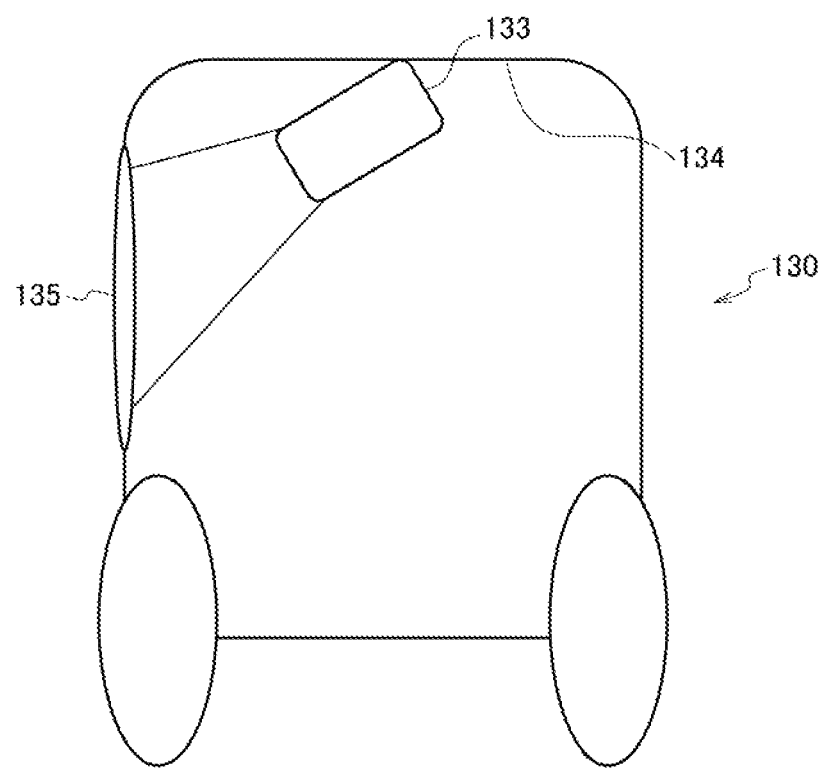
FIG. 23 A schematic view illustrating an image display system according to a seventh embodiment in another aspect.
Figure 24:
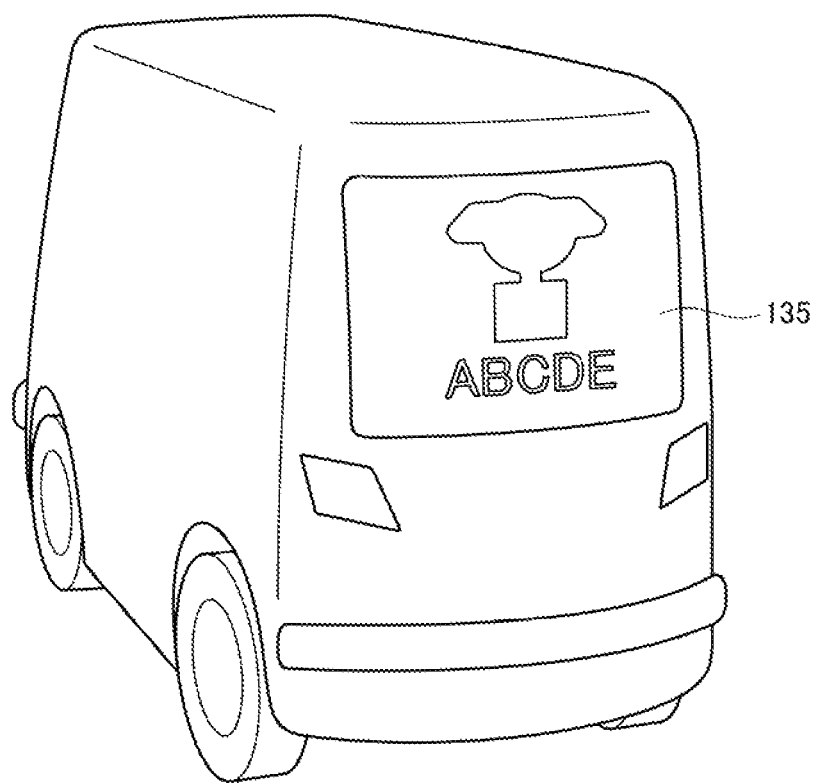
FIG. 24 A perspective view of the appearance of one example of an automobile to which an image display system according to a seventh embodiment in another aspect is applied, from an anterior view.
Figure 25:
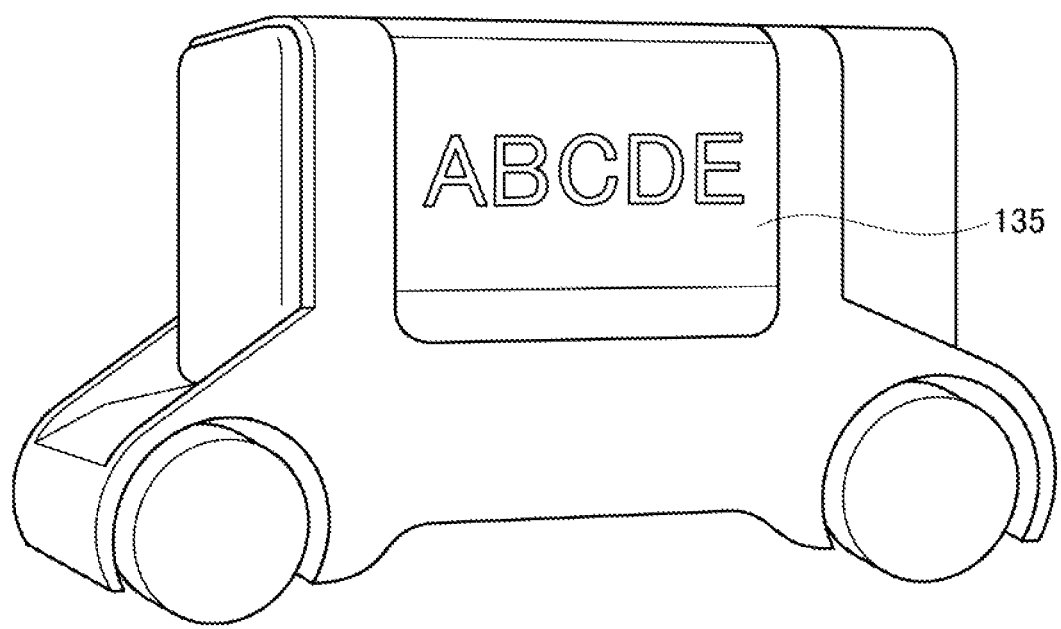
FIG. 25 A perspective view of the appearance of one example of an automobile to which an image display system according to a seventh embodiment in another aspect is applied, from a lateral view.

FIGS. 23 to 25 each illustrate an image display system according to a seventh embodiment (hereinafter, sometimes simply referred to as "image display system 130"). In the seventh embodiment, the image display system 130 is applied to a self-driving car, and display glass 135 is provided on a part of the outer periphery of the self-driving car. The display glass 135 may be front glass provided on a front surface of the self-driving car, rear glass provided on a rear surface of the self-driving car, or side glass provided on a side surface of the self-driving car. FIG. 24 illustrates a mode where the front glass is the display glass 135, and FIG. 25 illustrates a mode where the side glass is the display glass 135.

The self-driving car is used as, for example, a freight truck such as a last one mile truck, or may be a self-driving car for use in other applications.

A light source 133 is placed in the vehicle interior of the self-driving car, as illustrated in FIG. 23, and irradiates the display glass 135, with light. The light source 133 may be provided on, for example, a ceiling 134 of the self-driving car, as illustrated in FIG. 23. Also in the present embodiment, the display glass 135, on which light is incident from the light source 133, thus allows an image corresponding to the light to be displayed.

The image displayed on the display glass 135 may be, for example, a message, a screen image and/or advertising toward the vehicle exterior. The message may display, for example, the driving state during driving. A serial number, for example, the serial number of a baggage, may be displayed after arrival at destination.

The image may be, for example, an input operation key or a character input position guide, as indicated in the sixth embodiment (see FIG. 22), or may be, for example, a combination of an input operation key, or a character input position guide and a message, as described in the sixth embodiment. In a case where the input operation key or the character input position guide is displayed, the image display system 130 may further comprise a touch sensor as detailed in the sixth embodiment.

For example, in a case where the self-driving car is used as a freight truck and the input operation key or the character input position guide is displayed in the image, a key of the self-driving car may be released by inputting a passcode and/or a password by the input operation key, or inputting a signature, a passcode and/or a password according to the character input position guide. Consequently, a door of the self-driving car may be opened and a baggage can be received, for example. Such a configuration can allow a baggage to be delivered even without any deliverer, by releasing the key of the self-driving car by a baggage receiver. In a case where the baggage receiver gives a signature according to, for example, the character input position guide, the image display system 130 can save the signature information in, for example, a memory unit, or transmit it by a transmitter to the outside.

Additionally, in the present embodiment, display glass constituting window glass of the self-driving car is low in total light transmittance, and thus a load is hardly seen from the outside and privacy can be ensured.

Eighth Embodiment

Figure 26:
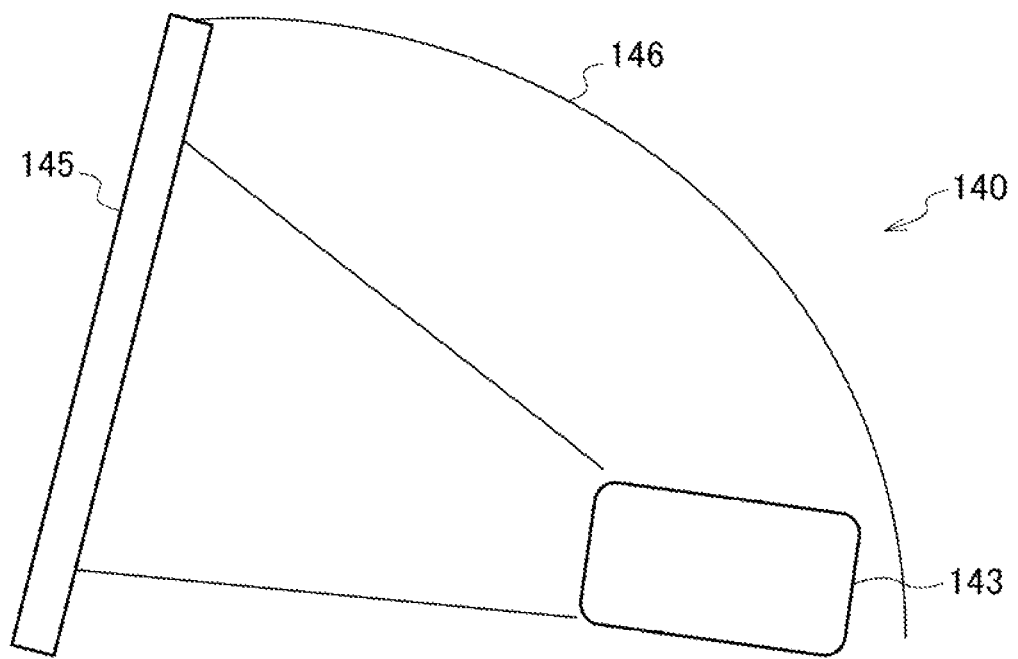
FIG. 26 A schematic view illustrating an image display system according to an eighth embodiment in another aspect.
Figure 27:
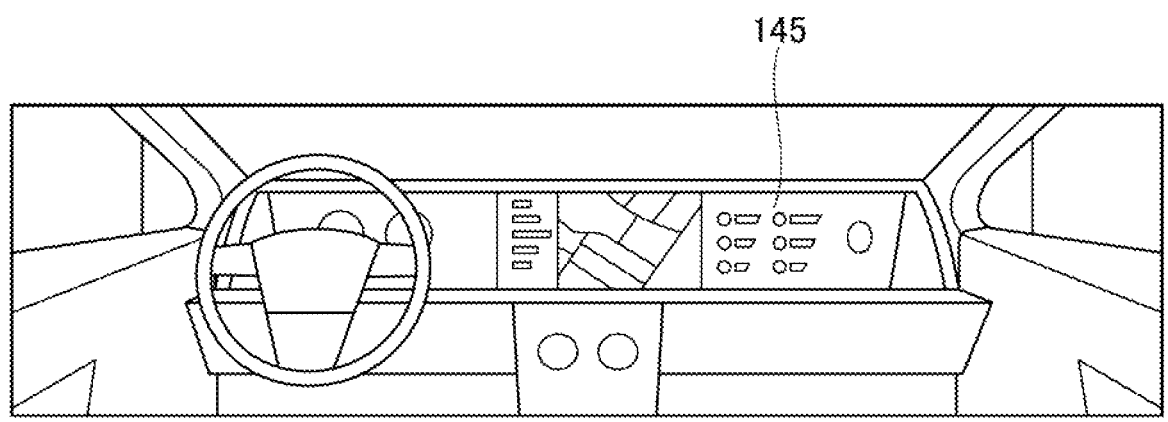
FIG. 27 A schematic view illustrating the vehicle interior of an automobile to which an image display system according to an eighth embodiment in another aspect is applied.

FIGS. 26 and 27 each illustrate an image display system according to an eighth embodiment (hereinafter, sometimes simply referred to as "image display system 140"). In the eighth embodiment, the image display system 140 is applied to an automobile, and display glass 145 may be placed in an instrument panel in front of a driver's seat of the automobile, facing the driver's seat. A light source apparatus 143 is placed further in front of the display glass 145. An accommodating unit 146 which accommodates various parts therein is provided in front of the display glass 145, and the light source apparatus 143 is also accommodated in the accommodating unit 146.

The above configuration allows light from the light source apparatus 143 to be incident on a surface of the display glass 145, the surface being opposite to a surface (namely, surface at the vehicle interior side) thereof facing the driver's seat, and an image is displayed on the surface of the display glass 145 facing the driver's seat, based on the incident light.

The image displayed on the display glass 145 may comprise images of various meters indicating the state of the automobile to the driver, and specific examples include a speed indicator, an indicator of the remaining amount of fuel, an engine speed indicator and a travel distance indicator. Moreover, displays for audios or car navigation systems of the automobile, or key buttons and the like for operating them may also be displayed. Moreover, key buttons and the like for operating, for example, on-off of, for example, a direction indicator, a defroster, a defogger and a wiper, opening and closing of window glass, and opening and closing of a door may be displayed.

The image display system 140 may comprise a touch sensor, as in the sixth embodiment, and a behavior of the automobile, or behaviors of various instruments (audios, car navigation systems, and the like) attached to the automobile may be controlled by a controller, based on the input to the touch sensor. In the present embodiment, the touch sensor is provided to result in a more enhancement in usability of the instrument panel.

The first to eighth embodiments described above merely exemplify modes of image display, and any image may be displayed on the display glass of each vehicle. The touch sensor, although shown with an example of an application to side glass or an instrument panel of an automobile, in the sixth and eighth embodiments, may be applied to other window glass such as rear glass of an automobile. The image display system may be applied to any conveyance other than an automobile and a self-driving car, and, for example, the display glass may be window glass of any vehicle other than an automobile and a self-driving car.

[Configuration of Display Glass in Image Display System]

Next, the configuration of display glass for use in an image display system according to another aspect is described in detail. The display glass in the image display system may comprise a layer comprising a light diffusion particle, and is preferably laminated glass. The laminated glass comprises two glass members and an interlayer film for laminated glass, placed between the two glass members, and the interlayer film for laminated glass allows the two glass members to adhere.

The interlayer film for laminated glass may have a single-layer structure or a multiple-layer structure, and in both cases, at least one layer may comprise the layer comprising a light diffusion particle (first resin layer).

Figure 28:
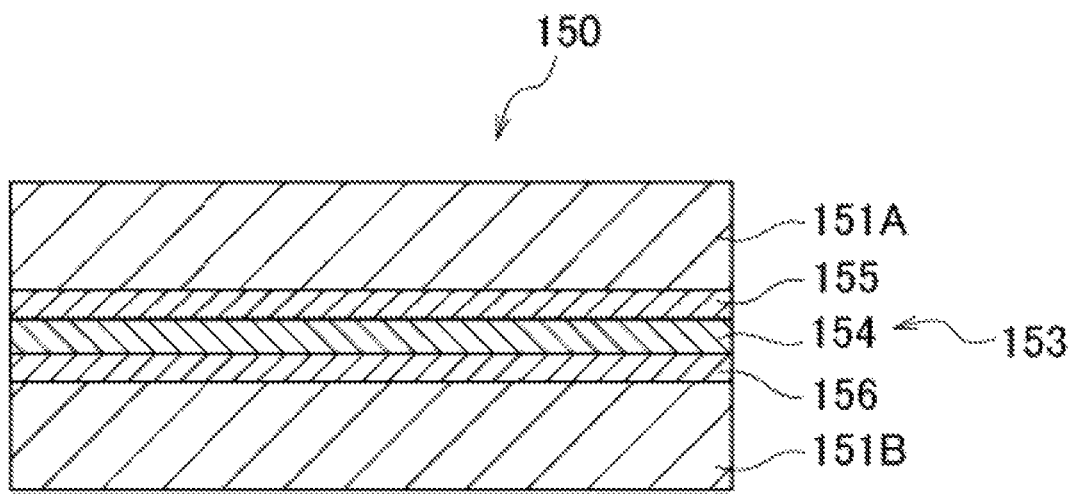
FIG. 28 A schematic cross-sectional view illustrating one example of laminated glass for use in an image display system according to another aspect.
Figure 29:
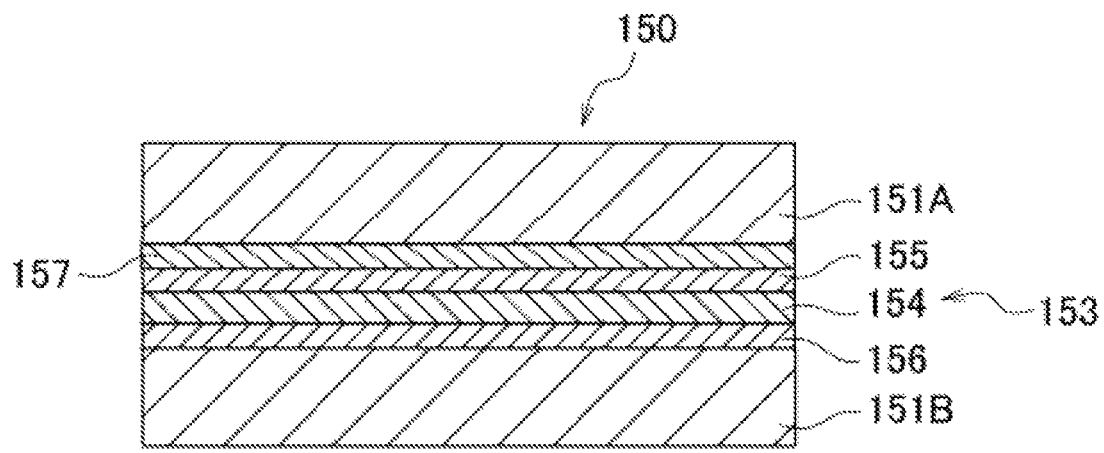
FIG. 29 A schematic cross-sectional view illustrating another example of laminated glass for use in an image display system according to another aspect.

A configuration of preferable laminated glass is illustrated in FIGS. 28 and 29. As illustrated in FIG. 28, laminated glass 150 comprises a first glass member 151A, a second glass member 151B, and an interlayer film 153 for laminated glass, placed between the glass members 151A and 151B. The interlayer film 153 for laminated glass comprises a second resin layer 155, a first resin layer 154 comprising a light diffusion particle, and a third resin layer 156 in the listed order from the first glass member 151A side, and the second and third resin layers 155 and 156 may respectively adhere to the first and second glass members 151A and 151B.

The laminated glass 150 may comprise a fourth resin layer 157 in addition to the first to third resin layers 154 to 156. In this case, the interlayer film 153 for laminated glass comprises a fourth resin layer 157, a second resin layer 155, a first resin layer 154 comprising a light diffusion particle, and a third resin layer 156 in the listed order from the first glass member 151A side, and the fourth and third resin layers 157 and 156 may respectively adhere to the first and second glass members 151A and 151B.

The interlayer film for laminated glass, although not illustrated, may have a two-layer structure, for example, the third resin layer 156 may be omitted in the configuration illustrated in FIG. 28, and in this case, the first and second resin layers 155 and 154 may respectively adhere to the first and second glass members 151A and 151B.

In the laminated glass 150, light from a light source apparatus may be incident through a surface at the second glass member 151B side, and image display may be made on a surface of the first glass member 151A.

The light diffusion particle is not particularly limited as long as it is a compound which can scatter light incident into the laminated glass (display glass), and specific examples thereof include inorganic substances such as calcium carbonate, silica, titanium oxide, glass flake, mica, alumina and aluminum. Such compounds may be used singly or in combinations of two or more thereof. In particular, calcium carbonate, silica, alumina or aluminum is preferable, and calcium carbonate is more preferable, from the viewpoint of, for example, light-scattering ability.

In the layer comprising a light diffusion particle (namely, first resin layer), the concentration of the light diffusion particle is not particularly limited, and is, for example, 6 to 50% by mass.

In the laminated glass 150 illustrated in FIG. 28, any of the resin layers 154 to 156 may comprise a colorant, and the first resin layer 154 or the second resin layer 155 preferably comprises a colorant. Also in the case of the above two-layer structure, the first resin layer 154 or the second resin layer 155 preferably comprises a colorant.

In the laminated glass 150 illustrated in FIG. 29, any of the resin layers 154 to 157 may comprise a colorant, and the fourth resin layer 157 preferably comprises a colorant.

Thus, when the first resin layer comprising a light diffusion particle, or a resin layer placed at an observation side with respect to the first resin layer comprises a colorant, an image displayed has a higher contrast and the image can be efficiently displayed.

The concentration of the colorant in each of the resin layers is, for example, 0.005 to 0.4% by mass.

The light diffusion particle and the colorant in each of the resin layers may be dispersed in and compounded with resin component(s) constituting the resin layer.

Herein, the colorant is not required to be comprised in the resin layers constituting the interlayer film for laminated glass, and, for example, a colored layer may be located on a surface of any of the glass members, or the glass member(s) used may be a glass comprising the colorant. The colored layer is preferably provided on a surface of the first glass member 151A. Such an embodiment allows the colored layer to be placed at an observation side with respect to the first resin layer, allows an image displayed to have a higher contrast, and enables the image to be efficiently displayed.

The colored layer may be provided on a surface (lower surface in FIGS. 28 and 29) of the first glass member 151A, the surface being at the interlayer film side, or may be provided on a surface (upper surface in FIGS. 28 and 29) of the glass member 151A, the surface being opposite to the surface at the interlayer film side.

The colored layer is a coating film formed on a surface of each of the glass members, and may be any one as long as it comprises a colorant, and the coating film may comprise, if necessary, a binder component such as a thermosetting resin or a thermoplastic resin, and may further appropriately comprise additive(s).

The colorant used is color matter such as a pigment or a dye, and in particular, preferably comprises a carbonaceous material. By comprising a carbonaceous material, stray light is effectively absorbed to easily result in a much more increase in contrast in image display. The carbonaceous material is preferably carbon black.

The colorant used may be a combination of the carbonaceous material such as carbon black and other color matter than the carbonaceous material. Such a colorant combination can not only increase the contrast in image display, but also color the laminated glass to a desired color and enhance design ability.

The pigment or dye for coloration of glass is preferably a metal oxide. Examples of the metal constituting the metal oxide include manganese, chromium, nickel and iron.

The resin for use in each of the resin layers may be a thermoplastic resin. Examples of the thermoplastic resin include a polyvinyl acetal resin, an ethylene-vinyl acetate copolymer resin, an ionomer resin, a polyurethane resin and a thermoplastic elastomer, and in particular, a polyvinyl acetal resin is preferable.

Each of the resin layers constituting the interlayer film for laminated glass may comprise a plasticizer. The resin layer may further comprise, if necessary, additive(s) such as a moisture resistance enhancer, an adhesion force modifier, an infrared absorber, an antioxidant, a light stabilizer, a fluorescent whitener, a crystal nucleator and/or a dispersant.

The thickness of the interlayer film for laminated glass is not particularly limited, and is preferably 0.2 to 3.0 mm.

In a case where the interlayer film for laminated glass has a multiple-layer structure, the thickness of the first resin layer is preferably 20 to 250 μm. The respective thicknesses of the second and third resin layers are not particularly limited, and are each preferably 50 μm to 1.5 mm. The thickness of the fourth resin layer is not particularly limited, and is preferably 50 μm to 1.5 mm. In a case where the thickness of the first resin layer is changed as described below, the thickness of, for example, a portion of each of the resin layers, where the first resin layer has the maximum thickness, may be in the above range.

Each of the glass members (first and second glass members 151A and 151B) for use in the laminated glass may be a glass plate. The glass plate may be either inorganic glass or organic glass, and inorganic glass is preferable. The inorganic glass is not particularly limited, and examples thereof include clear glass, clear float glass, float plate glass, reinforced glass, colored glass, polished plate glass, figured glass, meshed plate glass, wired plate glass, ultraviolet absorption plate glass, infrared reflection plate glass, infrared absorption plate glass and green glass.

The organic glass used is one generally called resin glass and is not particularly limited, and examples thereof include organic glass formed from, for example, a polycarbonate plate, a polymethyl methacrylate plate or a polyester plate.

The respective thicknesses of the glass members are not particularly limited, and are each preferably 0.5 to 5 mm, more preferably 0.7 to 3 mm.

As described above, the first resin layer comprising a light diffusion particle may be formed on the entire surface of the interlayer film for laminated glass, or may be formed on a partial region thereof. For example, in a case where the interlayer film comprises the first to third resin layers as in FIGS. 28 and 29, the first resin layer may be provided on a partial region of the interlayer film for laminated glass and no first resin layer may be provided on other regions. In other words, a portion having two layers of the second and third resin layers 155 and 156 and a portion having three layers of the first to third resin layers 154 to 156 may be provided in the interlayer film in the configuration illustrated in FIG. 28. A portion having three layers of the second to fourth resin layers 155 to 157 and a portion having four layers of the first to fourth resin layers 154 to 157 may be provided in the interlayer film in the configuration illustrated in FIG. 29.

The interlayer film may have one of a region where the thickness of the first resin layer is constant, and a region where the thickness is gradually changed (for example, a region where the thickness is gradually decreased from the region where the thickness is constant), may have only one thereof, or may have both the region where the thickness is constant and the region where the thickness is gradually changed. The interlayer film preferably has at least the region where the thickness is constant in order to stabilize the contrast of an image.

The above image display system can send various messages and display various images toward the vehicle exterior and/or the vehicle interior, by a simple configuration. The image display system can be combined with a touch sensor and thus enhanced in usability.

EXAMPLES

The present invention is described in more detail with reference to Examples, but the present invention is not limited to such Examples at all.

Various physical properties were here measured and evaluated as follows.

[Total Light Transmittance (TvD)]

The total light transmittance (TvD) was measured according to JIS R3106 (2019). Specifically, the laminated glass was in parallel with and in close contact with the opening of an integrating sphere so that all penetrating light rays were received by the integrating sphere, and the spectral transmittance was measured with a spectrophotometer ("U-4100" manufactured by Hitachi High-Tech Science Corporation). The total light transmittance was calculated from the spectral transmittance obtained.

[Projection Ability]

One surface of each laminated glass obtained in Examples and Comparative Examples was irradiated with light by a DLP projector (trade name "EB-1780W" manufactured by Seiko Epson Corp.), and an image was produced on each laminated glass. The image produced was observed from other surface side of each laminated glass, and evaluated according to the following evaluation criteria. In Examples 1 to 8, light from a projector was made incident from the third resin layer side and an image was observed from the fourth resin layer side. In Comparative Example 2, and Examples 9 and 10, light from a projector was made incident from the third resin layer side and an image was observed from the second resin layer side.

0: no image recognizable.
1: something produced roughly recognizable.
2: image produced certainly recognizable, but slightly blurred.
3: image very clearly displayed in case of dark periphery.
4: image very clearly displayed even in case of light periphery.

Each component used in Examples and Comparative Examples is as follows.

(Polyvinyl Acetal Resin)

PVB 1: polyvinyl butyral resin obtained by acetalization of polyvinyl alcohol having an average degree of polymerization of 1700 by n-butyraldehyde. The amount of hydroxyl group, the degree of acetylation and the degree of butyralization are as described in Table 1.

PVB 2: polyvinyl butyral resin obtained by acetalization of polyvinyl alcohol having an average degree of polymerization of 2300 by n-butyraldehyde. The amount of hydroxyl group, the degree of acetylation and the degree of butyralization are as described in Table 1.

(Plasticizer)

3GO: triethylene glycol-di-2-ethylhexanoate (Light Diffusion Particle)

Calcium carbonate (1) ("Super #1500" manufactured by Maruo Calcium Co., Ltd., median size 4 μm)

Calcium carbonate (2) ("Super #2000" manufactured by Maruo Calcium Co., Ltd., median size 2 μm)

Silica ("Nipsil E170" manufactured by Tosoh Silica Corporation, average particle size 3 μm)

Titanium oxide ("CR-50" manufactured by Ishihara Sangyo Kaisha, Ltd., average particle size 0.25 μm)

(Colorant)

CB: carbon black (Pigment Black 7)

Example 1

(Production of Interlayer Film)

A resin composition for a first resin layer was obtained by kneading 100 parts by mass of PVB 2 as a polyvinyl acetal resin, 60 parts by mass of 3GO as a plasticizer and calcium carbonate (1) as a light diffusion particle in a co-extruder. The calcium carbonate (1) was here added so that the content based on the total amount of the first resin layer was 8.0% by mass. Each resin composition for second and third resin layers was also obtained by kneading 100 parts by mass of PVB 1 as a polyvinyl acetal resin and 40 parts by mass of 3GO as a plasticizer in a co-extruder. A resin composition for a fourth resin layer was obtained by kneading 100 parts by mass of PVB 1 as a polyvinyl acetal resin, 40 parts by mass of 3GO as a plasticizer and carbon black as a colorant in another extruder. The carbon black was here added so that the content based on the total amount of the fourth resin layer was 0.2% by mass.

The obtained resin compositions for first to third layers were co-extruded by the co-extruder, to thereby obtain a laminate of second resin layer/first resin layer/third resin layer, and the resin composition for a fourth resin layer was extruded onto the laminate from still another extruder, to thereby obtain an interlayer film having a layer structure of fourth resin layer (colored resin layer)/second resin layer/first resin layer/third resin layer.

(Production of Laminated Glass)

Two sheets of clear glass (10 cm length×10 cm width×2.5 mm thickness, visible light transmittance 90.4%, manufactured by Central Glass Co., Ltd.) according to JIS R3202 (2011) were prepared, and the interlayer film produced was sandwiched between the two sheets of clear glass, to thereby obtain a laminate. The laminate was placed in a rubber bag, subjected to degassing at a degree of vacuum of 2.6 kPa for 20 minutes, thereafter transferred into an oven with being subjected to degassing, furthermore retained at 90° C. for 30 minutes and pressed in vacuum, and temporarily compression bonded. The laminate temporarily compression bonded was compression bonded in an autoclave in conditions of 135° C. and a pressure of 1.2 MPa for 20 minutes, to thereby obtain laminated glass composed of glass plate/fourth resin layer/second resin layer/first resin layer/third resin layer/glass plate.

Examples 2 to 11

The procedures the same as in Example 1 were performed except that the type of each polyvinyl acetal resin for use in each resin composition, the type of each light diffusion particle, the amount of compounding of each plasticizer, the amount of compounding of each light diffusion particle, the thickness of each resin layer and the amount of compounding of each colorant were changed as described in Table 1.

Comparative Example 1

A resin composition for a first resin layer was obtained by kneading 100 parts by mass of PVB 1 as a polyvinyl acetal resin, 40 parts by mass of 3GO as a plasticizer and calcium carbonate (1) as a light diffusion particle in an extruder. The calcium carbonate was here added so that the content based on the total amount of the first resin layer was 3.0% by mass. The obtained resin composition for a first resin layer was extruded by the extruder, to obtain an interlayer film composed of a single layer of a first resin layer having a thickness of 800 μm. Thereafter, laminated glass was produced by the same method as in Example 1, and laminated glass composed of glass plate/first resin layer/glass plate was obtained.

Comparative Example 2

(Production of Interlayer Film)

A resin composition for a first resin layer was obtained by kneading 100 parts by mass of PVB 1 as a polyvinyl acetal resin, 40 parts by mass of 3GO as a plasticizer and calcium carbonate as a light diffusion particle in a co-extruder. The calcium carbonate was here added so that the content based on the total amount of the first resin layer was 8.0% by mass. Each resin composition for second and third resin layers was also obtained by kneading 100 parts by mass of PVB 1 as a polyvinyl acetal resin and 40 parts by mass of 3GO as a plasticizer in a co-extruder.

The obtained resin compositions for first to third layers were co-extruded by the co-extruder, to thereby obtain an interlayer film having a three-layer structure of second resin layer/first resin layer/third resin layer. Thereafter, laminated glass was produced by the same method as in Example 1, and laminated glass composed of glass plate/second resin layer/first resin layer/third resin layer/glass plate was obtained.

Example 12

(Production of Interlayer Film)

A resin composition for a first resin layer was obtained by kneading 100 parts by mass of PVB 2 as a polyvinyl acetal resin, 60 parts by mass of 3GO as a plasticizer and calcium carbonate (1) as a light diffusion particle in a co-extruder. The calcium carbonate was here added so that the content based on the total amount of the first resin layer was 16.0% by mass. A resin composition for a second resin layer was obtained by kneading 100 parts by mass of PVB 1 as a polyvinyl acetal resin, 40 parts by mass of 3GO as a plasticizer and carbon black as a colorant in a co-extruder. The carbon black was here added so that the content based on the total amount of the second resin layer was 0.1% by mass. Furthermore, a resin composition for a third resin layer was obtained by kneading 100 parts by mass of PVB 1 as a polyvinyl acetal resin and 40 parts by mass of 3GO as a plasticizer in a co-extruder.

The obtained resin compositions for first to third layers were co-extruded by the co-extruder, to thereby obtain an interlayer film having a three-layer structure of second resin layer/first resin layer/third resin layer. Thereafter, laminated glass was produced by the same method as in Example 1, and laminated glass composed of glass plate/second resin layer/first resin layer/third resin layer/glass plate was obtained.

Example 13

(Production of Interlayer Film)

A resin composition for a first resin layer was obtained by kneading 100 parts by mass of PVB 1 as a polyvinyl acetal resin, 40 parts by mass of 3GO as a plasticizer, calcium carbonate (1) as a light diffusion particle and carbon black as a colorant in a co-extruder. The calcium carbonate was here added so that the content based on the total amount of the first resin layer was 16.0% by mass, and the carbon black was here added so that the content based on the total amount of the first resin layer was 0.1% by mass. Each resin composition for second and third resin layers was also obtained by kneading 100 parts by mass of PVB 1 as a polyvinyl acetal resin and 40 parts by mass of 3GO as a plasticizer in a co-extruder. Thereafter, laminated glass was produced by the same method as in Example 9, and laminated glass composed of glass plate/second resin layer/first resin layer/third resin layer/glass plate was obtained.

Example 14

A resin composition for a first resin layer was obtained by kneading 100 parts by mass of PVB 1 as a polyvinyl acetal resin, 40 parts by mass of 3GO as a plasticizer, calcium carbonate (1) as a light diffusion particle and carbon black as a colorant in an extruder. The calcium carbonate (1) was here added so that the content based on the total amount of the first resin layer was 2.0% by mass, and the carbon black was here added so that the content based on the total amount of the first resin layer was 0.1% by mass. The obtained resin composition for a first resin layer was extruded by the extruder, to thereby obtain an interlayer film composed of a single layer of a first resin layer. Thereafter, laminated glass was produced in the procedures the same as in Example 1.

Example 15

(Production of Interlayer Film)

A resin composition for a first resin layer was obtained by kneading 100 parts by mass of PVB 1 as a polyvinyl acetal resin, 40 parts by mass of 3GO as a plasticizer and calcium carbonate as a light diffusion particle in a co-extruder. The calcium carbonate was here added so that the content based on the total amount of the first resin layer was 16.0% by mass. Each resin composition for second and third resin layers was also obtained by kneading 100 parts by mass of PVB 1 as a polyvinyl acetal resin and 40 parts by mass of 3GO as a plasticizer in a co-extruder. The obtained resin compositions for first to third layers were co-extruded by the co-extruder, to thereby an interlayer film having a layer structure of second resin layer/first resin layer/third resin layer.

(Production of Laminated Glass)

Privacy glass (visible light transmittance 19%, glass colored by a colorant) as a first glass member, and clear glass (10 cm length×10 cm width×2.5 mm thickness, manufactured by Central Glass Co., Ltd.) according to JIS R3202 (2011), as a second glass member were prepared, and the interlayer film produced was sandwiched between the two sheets of such clear glass, to thereby obtain a laminate. A layer structure of first glass member/second resin layer/first resin layer/third resin layer/second glass member was here provided. Thereafter, laminated glass was produced by the same method as in Example 1.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| First resin layer | Polyvinyl acetal resin | Type of PVB | PVB 2 | PVB 1 | PVB 2 | PVB 2 | PVB 2 | PVB 2 | PVB 2 |
|  |  | Average degree of polymerization of PVA | 2300 | 1700 | 2300 | 2300 | 2300 | 2300 | 2300 |
|  |  | Amount [% by mol] of hydroxyl group | 23 | 30 | 23 | 23 | 23 | 23 | 23 |
|  |  | Degree [% by mol] of acetylation | 12.5 | 1 | 12.5 | 12.5 | 12.5 | 12.5 | 12.5 |
|  |  | Degree [% by mol] of butyralization | 64.5 | 69 | 64.5 | 64.5 | 64.5 | 64.5 | 64.5 |
|  | Plasticizer | Type | 3GO | 3GO | 3GO | 3GO | 3GO | 3GO | 3GO |
|  |  | Content [phr] | 60 | 40 | 80 | 60 | 60 | 60 | 60 |
|  | Light diffusion particle | Type | Calcium carbonate (1) | Calcium carbonate (1) | Calcium carbonate (1) | Calcium carbonate (1) | Calcium carbonate (1) | Calcium carbonate (1) | Calcium carbonate (1) |
|  |  | Content [C] [% by weight] | 8.0 | 16.0 | 24.0 | 26.7 | 30.0 | 24.0 | 48.0 |
|  | Thickness (T) [μm] |  | 200 | 150 | 100 | 90 | 80 | 100 | 50 |
|  | C × T |  | 1600 | 2400 | 2400 | 2400 | 2400 | 2400 | 2400 |
| Second and third resin layers | Polyvinyl acetal resin | Type of PVB | PVB 1 | PVB 1 | PVB 1 | PVB 1 | PVB 1 | PVB 1 | PVB 1 |
|  |  | Average degree of polymerization of PVA | 1700 | 1700 | 1700 | 1700 | 1700 | 1700 | 1700 |
|  |  | Amount [% by mol] of hydroxyl group | 30 | 30 | 30 | 30 | 30 | 30 | 30 |
|  |  | Degree [% by mol] of acetylation | 1 | 1 | 1 | 1 | 1 | 1 | 1 |
|  |  | Degree [% by mol] of butyralization | 69 | 69 | 69 | 69 | 69 | 69 | 69 |
|  | Plasticizer | Type | 3GO | 3GO | 3GO | 3GO | 3GO | 3GO | 3GO |
|  |  | Content [phr] | 40 | 40 | 36 | 40 | 40 | 40 | 40 |
|  | Thickness [μm] |  | 300 | 325 | 350 | 355 | 360 | 350 | 375 |
| Fourth resin layer | Polyvinyl acetal resin | Type of PVB | PVB 1 | PVB 1 | PVB 1 | PVB 1 | PVB 1 | PVB 1 | PVB 1 |
|  |  | Average degree of polymerization of PVA | 1700 | 1700 | 1700 | 1700 | 1700 | 1700 | 1700 |
|  |  | Amount [% by mol] of hydroxyl group | 30 | 30 | 30 | 30 | 30 | 30 | 30 |
|  |  | Degree [% by mol] of acetylation | 1 | 1 | 1 | 1 | 1 | 1 | 1 |
|  |  | Degree [% by mol] of butyralization | 69 | 69 | 69 | 69 | 69 | 69 | 69 |
|  | Plasticizer | Type | 3GO | 3GO | 3GO | 3GO | 3GO | 3GO | 3GO |
|  |  | Content [phr] | 40 | 40 | 36 | 40 | 40 | 40 | 40 |
|  | Colorant | Type | CB | CB | CB | CB | CB | CB | CB |
|  |  | Content (C) [% by weight] | 0.2 | 0.1 | 0.1 | 0.1 | 0.1 | 0.1 | 0.1 |
|  | Thickness [μm] |  | 800 | 400 | 400 | 400 | 400 | 400 | 400 |
| Entire interlayer film | Content [% by weight] of light diffusion particle |  | 1.0 | 2.0 | 2.0 | 2.0 | 2.0 | 2.0 | 2.0 |
| Physical properties | Total light transmittance (TvD) [%] |  | 20 | 25 | 31 | 30 | 30 | 29 | 34 |
| Evaluation | Projection ability |  | 3 | 3 | 4 | 4 | 4 | 4 | 3 |

TABLE 1-continued

| | | | Ex. 8 | Ex. 9 | Ex. 10 | Ex. 11 | Comp. Ex. 1 | Comp. Ex. 2 |
|---|---|---|---|---|---|---|---|---|
| First resin layer | Polyvinyl acetal resin | Type of PVB | PVB 2 | PVB 1 | PVB 1 | PVB 1 | PVB 1 | PVB 1 |
| | | Average degree of polymerization of PVA | 2300 | 1700 | 1700 | 1700 | 1700 | 1700 |
| | | Amount [% by mol] of hydroxyl group | 23 | 30 | 30 | 30 | 30 | 30 |
| | | Degree [% by mol] of acetylation | 12.5 | 1 | 1 | 1 | 1 | 1 |
| | | Degree [% by mol] of butyralization | 64.5 | 69 | 69 | 69 | 69 | 69 |
| | Plasticizer | Type | 3GO | 3GO | 3GO | 3GO | 3GO | 3GO |
| | | Content [phr] | 60 | 40 | 40 | 40 | 40 | 40 |
| | Light diffusion particle | Type | Calcium carbonate (1) | Silica | Titanium oxide | Calcium carbonate (2) | Calcium carbonate (1) | Calcium carbonate (1) |
| | | Content [C] [% by weight] | 32.0 | 70.0 | 30.0 | 32.0 | 3.0 | 8.0 |
| | Thickness (T) [μm] | | 100 | 50 | 100 | 100 | 800 | 200 |
| | C × T | | 3200 | 3500 | 3000 | 3200 | 2400 | 1600 |
| Second and third resin layers | Polyvinyl acetal resin | Type of PVB | PVB 1 | PVB 1 | PVB 1 | PVB 1 | — | PVB 1 |
| | | Average degree of polymerization of PVA | 1700 | 1700 | 1700 | 1700 | | 1700 |
| | | Amount [% by mol] of hydroxyl group | 30 | 30 | 30 | 30 | | 30 |
| | | Degree [% by mol] of acetylation | 1 | 1 | 1 | 1 | | 1 |
| | | Degree [% by mol] of butyralization | 69 | 69 | 69 | 69 | | 69 |
| | Plasticizer | Type | 3GO | 3GO | 3GO | 3GO | | 3GO |
| | | Content [phr] | 40 | 40 | 40 | 40 | | 40 |
| | Thickness [μm] | | 150 | 175 | 150 | 150 | | 300 |
| Fourth resin layer | Polyvinyl acetal resin | Type of PVB | PVB 1 | PVB 1 | PVB 1 | PVB 1 | — | — |
| | | Average degree of polymerization of PVA | 1700 | 1700 | 1700 | 1700 | | |
| | | Amount [% by mol] of hydroxyl group | 30 | 30 | 30 | 30 | | |
| | | Degree [% by mol] of acetylation | 1 | 1 | 1 | 1 | | |
| | | Degree [% by mol] of butyralization | 69 | 69 | 69 | 69 | | |
| | Plasticizer | Type | 3GO | 3GO | 3GO | 3GO | | |
| | | Content [phr] | 40 | 40 | 40 | 40 | | |
| | Colorant | Type | CB | CB | CB | CB | | |
| | | Content (C) [% by weight] | 0.1 | 0.1 | 0.1 | 0.1 | | |
| | Thickness [μm] | | 400 | 400 | 400 | 400 | | |
| Entire interlayer film | Content [% by weight] of light diffusion particle | | 4.0 | 4.4 | 3.8 | 4.0 | 3.0 | 2.0 |
| Physical properties | Total light transmittance (TvD) [%] | | 22 | 50 | 39 | 25 | 52 | 62 |
| Evaluation | Projection ability | | 3 | 3 | 3 | 3 | 1 | 2 |

TABLE 2

| | | | Example 12 | Example 13 | Example 14 |
|---|---|---|---|---|---|
| First resin layer | Polyvinyl acetal resin | Type of PVB | PVB 2 | PVB 1 | PVB 1 |
| | | Average degree of polymerization of PVA | 2300 | 1700 | 1700 |
| | | Amount [% by mol] of hydroxyl group | 23 | 30 | 30 |
| | | Degree [% by mol] of acetylation | 12.5 | 1 | 1 |
| | | Degree [% by mol] of butyralization | 64.5 | 69 | 69 |
| | Plasticizer | Type | 3GO | 3GO | 3GO |
| | | Content [phr] | 60 | 40 | 40 |

TABLE 2-continued

|  |  |  | Example 12 | Example 13 | Example 14 |
|---|---|---|---|---|---|
|  | Light diffusion particle | Type | Calcium carbonate (1) | Calcium carbonate (1) | Calcium carbonate (1) |
|  |  | Content (C) [% by weight] | 16.0 | 16.0 | 2.0 |
|  | Colorant | Type | — | CB | CB |
|  |  | Content [wt %] |  | 0.1 | 0.1 |
|  |  | Thickness (T) [μm] | 100 | 100 | 800 |
|  |  | C×T | 1600 | 1600 | 1600 |
| Second resin layer | Polyvinyl acetal resin | Type of PVB | PVB 1 | PVB 1 | — |
|  |  | Average degree of polymerization of PVA | 1700 | 1700 | — |
|  |  | Amount [% by moll] of hydroxyl group | 30 | 30 | — |
|  |  | Degree [% by mol] of acetylation | 1 | 1 | — |
|  |  | Degree [% by mol] of butyralization | 69 | 69 | — |
|  | Plasticizer | Type | 3GO | 3GO | — |
|  |  | Content [phr] | 40 | 40 | — |
|  | Colorant | Type | CB | — | — |
|  |  | Content (C) [% by weight] | 0.1 |  | — |
|  |  | Thickness [μm] | 350 | 350 | — |
| Third resin layer | Polyvinyl acetal resin | Type of PVB | PVB 1 | PVB 1 | — |
|  |  | Average degree of polymerization of PVA | 1700 | 1700 | — |
|  |  | Amount [% by mol] of hydroxyl group | 30 | 30 | — |
|  |  | Degree [% by mol] of acetylation | 1 | 1 | — |
|  |  | Degree [% by mol] of butyralization | 69 | 69 | — |
|  | Plasticizer | Type | 3GO | 3GO | — |
|  |  | Content [phr] | 40 | 40 | — |
|  |  | Thickness [μm] | 350 | 350 | — |
| Entire interlayer film | Content [% by weight] of light diffusion particle |  | 2.0 | 2.0 | 2.0 |
| Physical properties | Total light transmittance (TvD) [%] |  | 27 | 28 | 25 |
| Evaluation | Projection ability |  | 4 | 4 | 3 |

TABLE 3

|  |  |  | Example 15 |
|---|---|---|---|
| First resin layer | Polyvinyl acetal resin | Type of PVB | PVB 1 |
|  |  | Average degree of polymerization of PVA | 1700 |
|  |  | Amount [% by mol] of hydroxyl group | 30 |
|  |  | Degree [% by mol] of acetylation | 1 |
|  |  | Degree [% by mol] of butyralization | 69 |
|  | Plasticizer | Type | 3GO |
|  |  | Content [phr] | 40 |
|  | Light diffusion particle | Type | Calcium carbonate (1) |
|  |  | Content (C) [% by weight] | 16.0 |
|  | Colorant | Type | — |
|  |  | Content [wt %] |  |
|  |  | Thickness (T) [μm] | 100 |
|  |  | C×T | 1600 |
| Second and third resin layers | Polyvinyl acetal resin | Type of PVB | PVB 1 |
|  |  | Average degree of polymerization of PVA | 1700 |
|  |  | Amount [% by mol] of hydroxyl group | 30 |
|  |  | Degree [% by mol] of acetylation | 1 |
|  |  | Degree [% by mol] of butyralization | 69 |
|  | Plasticizer | Type | 3GO |
|  |  | Content [phr] | 40 |
|  |  | Thickness [μm] | 350 |
| Entire interlayer film | Content [% by weight] of light diffusion particle |  | 2.0 |
| First glass | Type |  | Privacy glass |
| Second glass | Type |  | Clear glass |
| Physical properties | Total light transmittance (TvD) [%] |  | 20 |
| Evaluation | Projection ability |  | 3 |

* Content of plasticizer in each Table: content (parts by mass) based on 100 parts by mass of polyvinyl acetal resin in each resin layer.
* Content of light diffusion particle in each Table: concentration (% by mass) of each light diffusion particle in first resin layer and entire interlayer film.
* Concentration of colorant in each Table: concentration (% by mass) of each colorant in resin layer comprising such colorant.

As described above, the interlayer film of each of Examples, comprising a first resin layer comprising a resin and a light diffusion particle and allowing any resin layer in the interlayer film for laminated glass to comprise a colorant, thus was favorable in projection ability, and could allow for display of an image at a high contrast when used in an image display screen. On the contrary, the interlayer film for laminated glass of each of Comparative Examples, comprising no resin layer comprising a colorant in the interlayer film, thus could not allow for display of an image at a high contrast when used in an image display screen.

REFERENCE SIGNS LIST 11 first resin layer
12 second resin layer
13 third resin layer
10, 16, 17, 18, 19 interlayer film for laminated glass
21, 22 glass member
25, 26, 27, 28, 31, 35, 36 laminated glass
30 image display system
32 light source apparatus
34 colored layer
OB observer

The invention claimed is:

1. An interlayer film for laminated glass, comprising at least one resin layer,
wherein the interlayer film comprises a first resin layer comprising a resin and a light diffusion particle, and any resin layer in the interlayer film for laminated glass comprises a colorant,
wherein a concentration of the light diffusion particle in the first resin layer is 15% by mass or more,
wherein the haze of a laminated glass produced by using two sheets of clear glass according to JIS R3202 (2011) is 55% or more, and
wherein a relationship according to the following expression (1):

$$500 \leq C \times T \leq 3600 \qquad (1)$$

is satisfied, wherein a concentration of the light diffusion particle in the first resin layer is C (% by mass) and a thickness of the first resin layer is T (μm).

2. The interlayer film for laminated glass according to claim 1, comprising a resin layer other than the first resin layer, comprising a resin and the colorant.

3. The interlayer film for laminated glass according to claim 2, wherein the first resin layer is placed at a side on which light from a light source apparatus is incident, as compared with the resin layer other than the first resin layer.

4. The interlayer film for laminated glass according to claim 1, wherein the first resin layer comprises a resin, a light diffusion particle and a colorant.

5. The interlayer film for laminated glass according to claim 1, wherein a total light transmittance according to JIS R3106 (2019) of laminated glass in which the interlayer film is sandwiched between two sheets of clear glass according to JIS R3202 (2011), is less than 70%.

6. The interlayer film for laminated glass according to claim 1, wherein the first resin layer has a thickness of 150 μm or less.

7. The interlayer film for laminated glass according to claim 1, wherein a relationship according to the following expression (2) is satisfied $$1000 \leq C \times T \leq 3600 \qquad (2).$$

8. The interlayer film for laminated glass according to claim 1, wherein the light diffusion particle comprises calcium carbonate.

9. The interlayer film for laminated glass according to claim 1, comprising:
a second resin layer comprising a resin and a third resin layer comprising a resin, wherein
the first resin layer is placed between the second and third resin layers.

10. The interlayer film for laminated glass according to claim 9, wherein any of the first, second and third resin layers comprises a colorant.

11. The interlayer film for laminated glass according to claim 9, further comprising:
a fourth resin layer comprising a resin, wherein
the fourth resin layer is placed on an outer side of a laminated structure comprising the first, second and third resin layers, and the fourth resin layer comprises a colorant.

12. The interlayer film for laminated glass according to claim 1, for use in an image display screen.

13. The interlayer film for laminated glass according to claim 12, for use in a rear-projection image display screen.

14. The interlayer film for laminated glass according to claim 1, wherein
(i) the first resin layer comprises a resin, the light diffusion particle and the colorant or
(ii) the interlayer film for laminated glass comprises a resin layer other than the first resin layer, comprising a resin and the colorant and having a thickness larger than that of the first resin layer, the thickness being 50 μm or more.

15. A laminated glass comprising paired glass members and the interlayer film for laminated glass according to claim 1, wherein the interlayer film for laminated glass is placed between the paired glass members.

16. An image display system comprising the laminated glass according to claim 15, and a light source apparatus for light irradiation on one surface of the laminated glass.

17. A laminated glass comprising paired glass members and an interlayer film for laminated glass, the interlayer film being placed between the paired glass members and comprising at least one resin layer, comprising a first resin layer comprising a resin and a light diffusion particle,
a concentration of the light diffusion particle in the first resin layer being 15% by mass or more,
at least any of the paired glass members being colored by a colorant,
wherein the haze of the laminated glass is 55% or more, and
wherein a relationship according to the following expression (1):

$$500 \leq C \times T \leq 3600 \qquad (1)$$

is satisfied, wherein a concentration of the light diffusion particle in the first resin layer is C (% by mass) and a thickness of the first resin layer is T (μm).

18. The laminated glass according to claim 17, wherein at least any of the paired glass members contains the colorant, or has on its surface, a colored layer comprising the colorant.

* * * * *